United States Patent [19]

Childress et al.

[11] Patent Number: 4,905,234

[45] Date of Patent: Feb. 27, 1990

[54] APPARATUS AND METHOD FOR TRANSMITTING DIGITAL DATA OVER A RADIO COMMUNICATIONS CHANNEL

[75] Inventors: Jeffrey S. Childress; Nancy L. Hall; Houston H. Hughes, III, all of Lynchburg, Va.

[73] Assignee: General Electric Company, Lynchburg, Va.

[21] Appl. No.: 56,923

[22] Filed: Jun. 3, 1987

[51] Int. Cl.$^4$ ............................................. H04J 3/24

[52] U.S. Cl. .................................. 370/94.1; 371/33

[58] Field of Search ............... 370/60, 94, 89, 95, 370/110.1; 455/63, 67; 371/33, 32

[56] References Cited

U.S. PATENT DOCUMENTS

| | | | |
|---|---|---|---|
| 3,292,178 | 3/1966 | Magnuski | 455/38 |
| 3,458,664 | 7/1969 | Adlhoch et al. | 379/63 |
| 3,571,519 | 3/1971 | Tsimbidis | 379/63 |
| 3,696,210 | 10/1972 | Peterson et al. | 370/13 |
| 3,801,956 | 4/1974 | Braun et al. | 364/715.11 |
| 3,906,166 | 9/1975 | Cooper et al. | 379/60 |
| 3,936,616 | 2/1976 | DiGianfilippo | 379/63 |
| 3,970,801 | 7/1976 | Ross et al. | 379/63 |
| 4,001,693 | 1/1977 | Stackhouse et al. | 455/51 |
| 4,010,327 | 2/1977 | Kobrinetz et al. | 379/58 |
| 4,012,597 | 3/1977 | Lynk, Jr. et al. | 455/53 |
| 4,022,973 | 5/1977 | Stackhouse | 375/114 |
| 4,027,243 | 5/1977 | Stackhouse | 375/114 |
| 4,029,901 | 6/1977 | Campbell | 379/58 |
| 4,128,740 | 12/1978 | Graziano | 455/33 |
| 4,131,849 | 12/1978 | Freeburg et al. | 375/5 |
| 4,184,118 | 1/1980 | Cannalte et al. | 370/77 |
| 4,231,114 | 10/1980 | Dolikian | 455/49 |
| 4,267,596 | 1/1981 | Craiglow | 370/29 |
| 4,304,001 | 12/1981 | Cope | 371/32 |
| 4,309,772 | 1/1982 | Kloker et al. | 375/26 |
| 4,312,070 | 1/1982 | Coombes et al. | 371/40 |
| 4,312,074 | 1/1982 | Pautler et al. | 375/96 |
| 4,322,576 | 3/1982 | Miller | 370/59 |
| 4,326,264 | 4/1982 | Cohen et al. | 368/500 |
| 4,339,823 | 7/1982 | Predina et al. | 375/20 |
| 4,347,625 | 8/1982 | Williams | 455/17 |
| 4,360,927 | 11/1982 | Bowen et al. | 455/17 |
| 4,369,443 | 1/1983 | Giallanza et al. | 340/825.17 |
| 4,382,298 | 5/1983 | Evans | 371/6 |
| 4,400,585 | 8/1983 | Kamen et al. | 455/34 |
| 4,409,687 | 10/1983 | Berti et al. | 455/7 |
| 4,418,425 | 11/1983 | Fennel, Jr. et al. | 455/27 |
| 4,422,171 | 12/1983 | Worthley et al. | 371/32 |
| 4,430,742 | 2/1984 | Milleker et al. | 375/5 |
| 4,430,755 | 2/1984 | Nadir et al. | 455/77 |
| 4,433,256 | 2/1984 | Dolikian | 307/358 |
| 4,434,323 | 2/1984 | Levine et al. | 128/22.17 |
| 4,439,859 | 3/1984 | Donnan | 371/32 |
| 4,450,573 | 5/1984 | Noble | 375/104 |
| 4,485,486 | 11/1984 | Webb et al. | 455/33 |
| 4,578,815 | 3/1986 | Persinotti | 455/15 |
| 4,698,805 | 10/1987 | Sasuta et al. | 370/97 |
| 4,712,214 | 12/1987 | Meltzer et al. | 371/32 |

OTHER PUBLICATIONS

Federal Information Processing Standards, Pub. No. 46, Data Encryption Standard, U.S. Dept. of Comm., NTIS, (5285 Port Royal Rd., Springfield, Va.) 22161
"Voice and Data Transmission", Arrendondo, Teggeler and Smith, Bell Systems Technology Journal, vol. 58, No. 1, Jan. 1978, pp. 97–122.

*Primary Examiner*—Joseph A. Orsino
*Assistant Examiner*—Frank M. Scutch, III
*Attorney, Agent, or Firm*—Nixon & Vanderhye

[57] ABSTRACT

A digital radio RF signalling protocol communicates either digitized voice or digital data signals and indicates the type of information being communicated to the receiver. Multiple repeats of control signals are provided for fade protection and to ensure correct receipt even under adverse communications channel conditions. When the destination transceiver receives a transmitted digital data burst from the transmitter, the destination transceiver transmits a responsive acknowledge message and may specify in the acknowledge message which portions of the received message were received incorrectly and should be retransmitted by the originating transceiver. The originating transceiver determines the contents of subsequently-transmitted data bursts based upon the information it receives from the destination transceiver by way of the acknowledge message. As deleterious phenomena (e.g., noise and/or fading) degrade communications channel quality, the acknowledge message handshaking causes the originating transceiver to repeat incorrectly received data packets until the destination transceiver finally receives those data packets correctly.

20 Claims, 30 Drawing Sheets

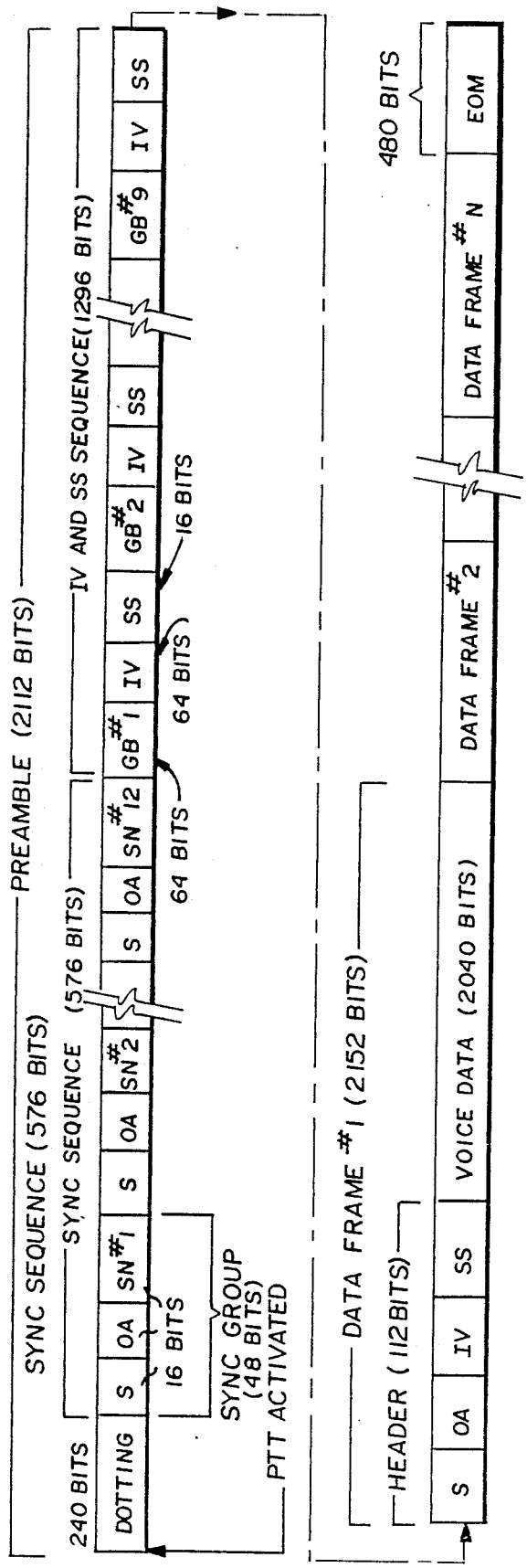
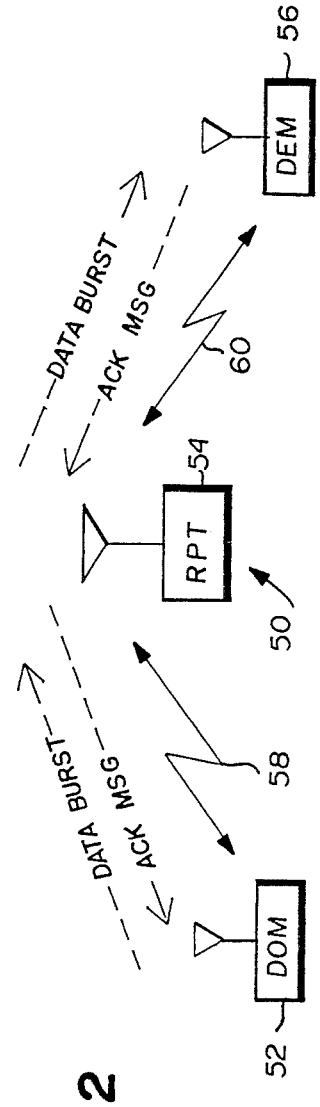
FIG. 1 PRIOR ART
FIG. 2

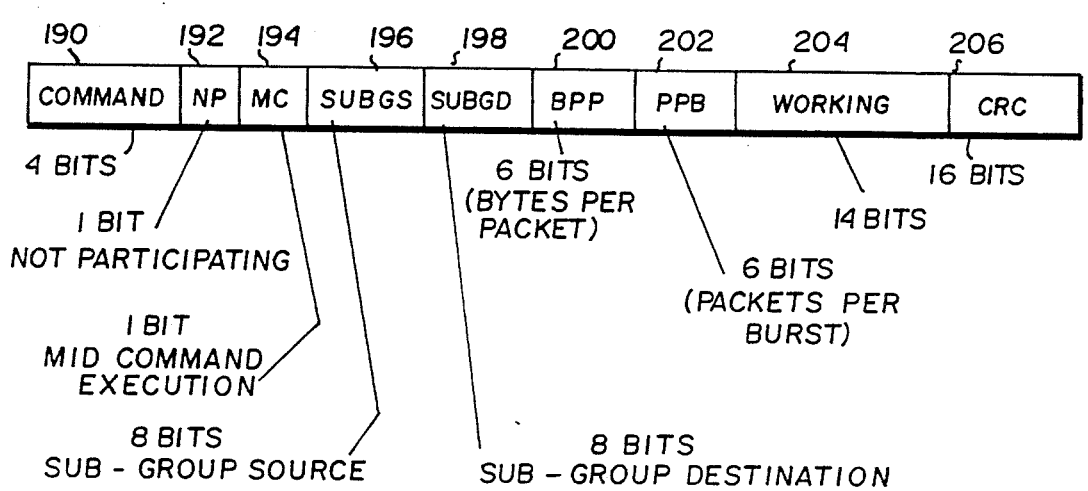
FIG. 5a GUARD BAND
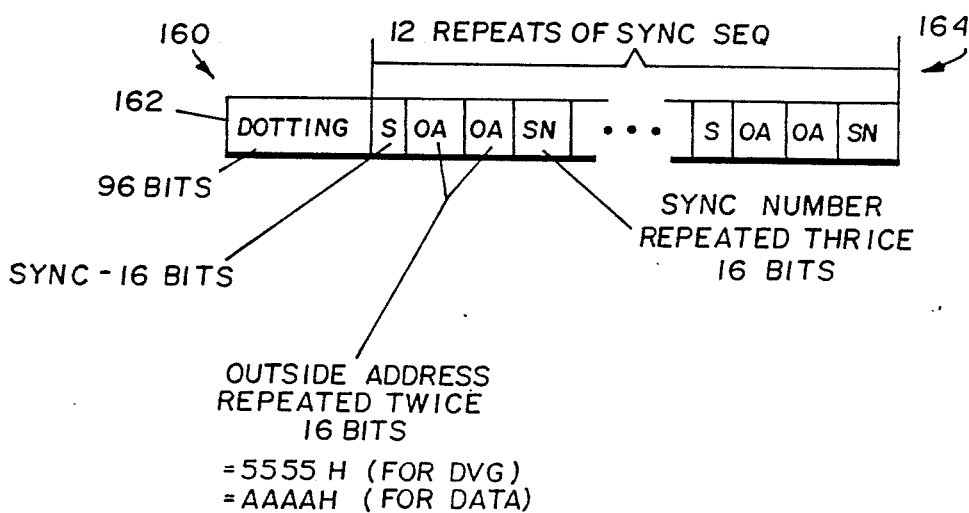
FIG. 6 SUBPREAMBLE

ACKNOWLEDGE

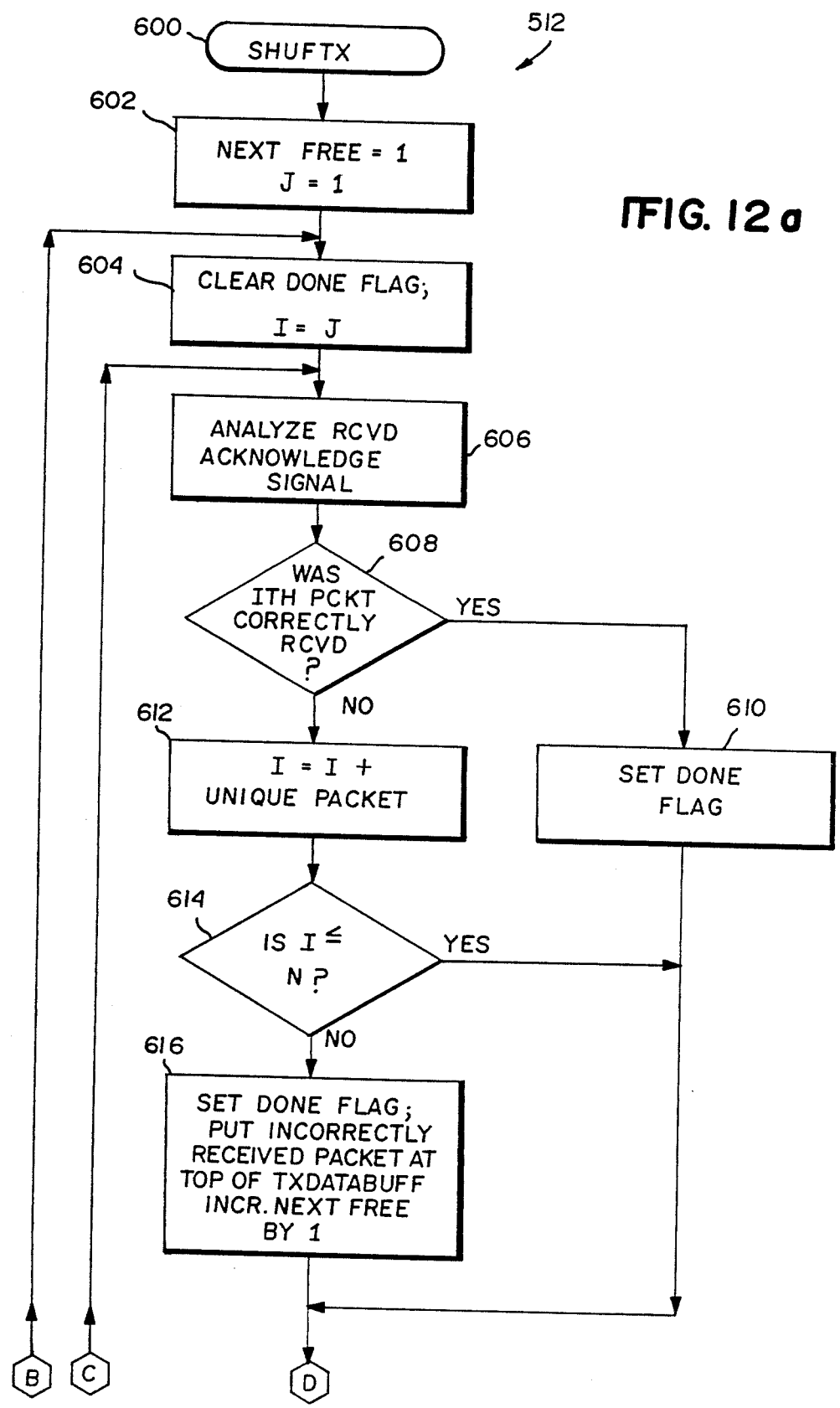

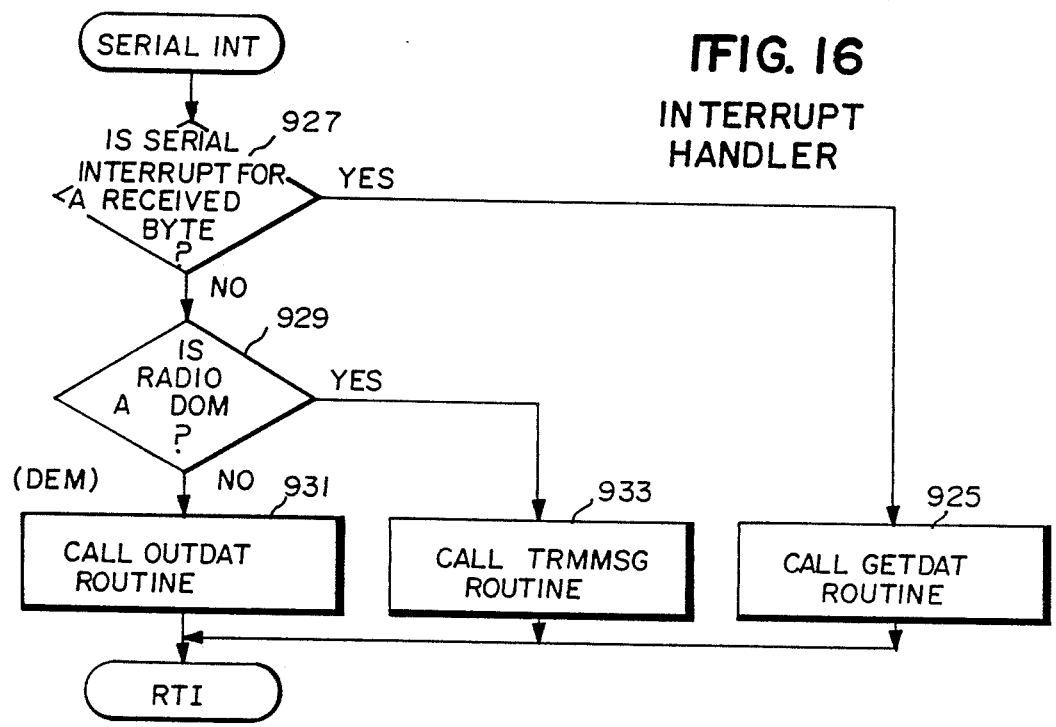
FIG. 16 INTERRUPT HANDLER
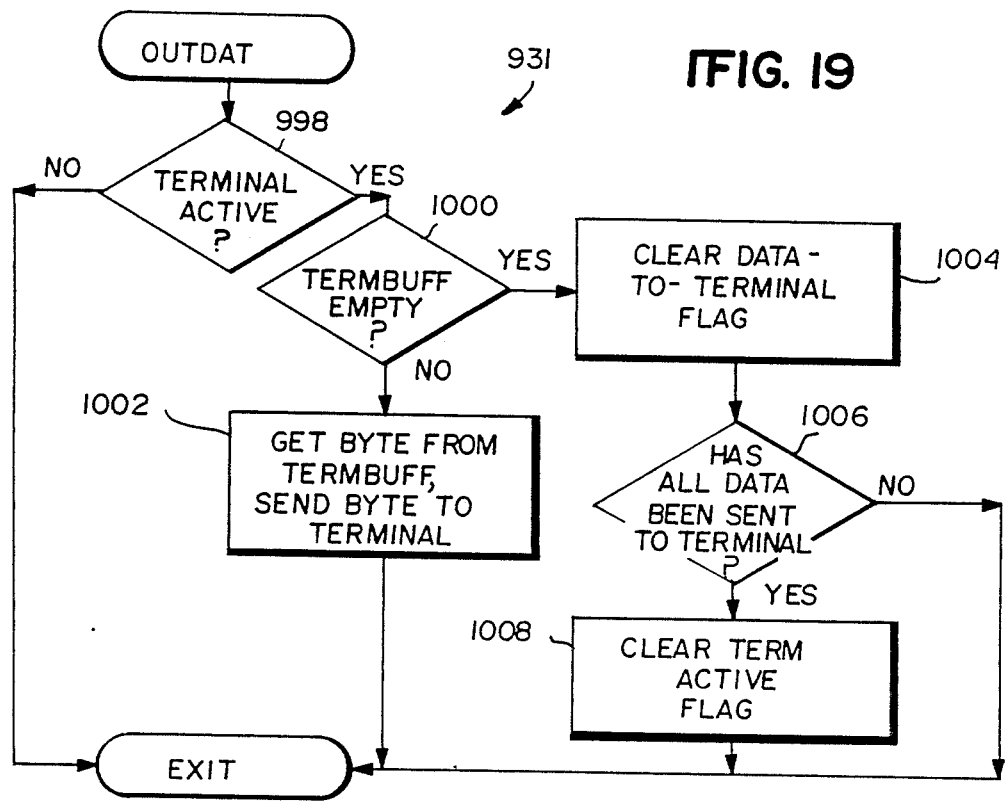
FIG. 19

APPARATUS AND METHOD FOR TRANSMITTING DIGITAL DATA OVER A RADIO COMMUNICATIONS CHANNEL

CROSS REFERENCES TO RELATED APPLICATIONS

This application is related to commonly-assigned U.S. application Ser. No. 661,597 filed Oct. 17, 1984 entitled "Cryptographic Digital Signal Transceiver Method and Apparatus"; and to commonly-assigned U.S. application Ser. No. 661,733 filed Oct. 17, 1984 entitled "Method and Apparatus for Transmitting Cryptographically Encoded Digital Voice Data Over A Radio Communications Channel", now issued as U.S. Pat. Nos. 4,817,146 and 4,757,536, respectively. The disclosures of these two copending patent applications are hereby incorporated herein by reference.

FIELD OF THE INVENTION

The present invention relates to digital radio frequency communications systems, and more particularly, to a communications protocol for transmitting and receiving digital signals over a radio frequency communications channel.

BACKGROUND AND SUMMARY OF THE INVENTION

Communicating digital control and message data signals over radio communications channels is already well known in the art. See, for example, the following (by no means exhaustive) list of prior-issued United States Patents:

U.S. Pat. No. 4,027,243 to Stackhouse et al (1977)
U.S. Pat. No. 4,369,443 to Giallanza et al (1983)
U.S. Pat. No. 4,434,323 to Levine et al (1984)
U.S. Pat. No. 4,322,576 to Miller (1982)
U.S. Pat. No. 4,267,592 to Craiglow (1981)
U.S. Pat. No. 3,801,956 to Braun et al (1974)
U.S. Pat. No. 4,418,425 to Fennel, Jr. et al (1983)

Commonly-assigned U.S. Pat. No. 4,027,243 to Stackhouse et al describes a digital message generator for a digitally controlled radio transmitter and receiver in a radio communications system. Provisions are made in this communications system for acquiring bit synchronization as well as word synchronization in each of a steady succession of digital command messages transmitted between radio station sites.

Commonly-assigned U.S. patent application Ser. No. 661,733 of Szczutkowski et al filed Oct. 17, 1984 describes a format of control and encoded voice digital signals which provides selective signalling capability, late entry, and word and cryptographic synchronization recovery—as well as fade and noise protection—in the context of a digital voice privacy radio communications system. Prior art FIG. 1 shows the preferred time sequence of digital signals transmitted and received by the communications system described in the Szczutkowski patent application. While additional details relating to these digital signal sequences may be learned from the specification of application of Ser. No. 661,733, the sequence shown in FIG. 1 will now be briefly described.

The sequence of digital signals shown in FIG. 1 includes a preamble followed by one or more data frames. The preamble contains data providing bit/frame synchronization, repeater addressing, cryptographic synchronization and selective signalling control. Data frames carry their own synchronization data and also contain digitized, encrypted voice or other data signals.

The signalling format shown in prior art FIG. 1 repetitively transmits certain information both in the preamble portion and at regular intervals within the encrypted voice data stream to permit a receiver to initially synchronize with a transmitter despite the usual Raleigh fading which may be expected on radio frequencies communications channels and also to permit "late entry" (in the event that the preamble is "missed" or unsuccessively decoded) and/or recovery of synchronization (in the event that synchronization initially acquired from the preamble is subsequently lost before the end of a message).

In the signalling protocol shown in FIG. 1, initial frame synchronization, ongoing frame synchronization, repeater addressing, cryptographic synchronization and selective signalling signals are all repetitively transmitted in the relatively long preamble portion for fade protection, and are also repetitively retransmitted at regular intervals within the subsequent encrypted voice data stream. Due to the placement of and repetitions of the various control fields within the FIG. 1 protocol, the protocol provides a very high probability of correct initial synchronization and addressing functions.

The preamble portion of the FIG. 1 signalling protocol preferably includes: (a) a dotting pattern; (b) a synchronization sequence including a repeated group of synchronization signals; and (c) an initialization vector (IV) and selective signalling (SS) sequence (which includes repeated selective signalling, initialization vector and guardband (GB) data signals).

Each data frame of the FIG. 1 protocol includes a "header" portion, a message portion, and an end of message portion. The header portion includes versions of the synchronization sequence and the IV and SS sequence transmitted within the preamble portion. The message portion includes digital signals to be communicated (e.g., encrypted voice data). The transmitted message terminates in an end of message (EOM) word including a synchronization field and a dotting pattern.

The dotting sequence in the FIG. 1 preamble portion is preferably an alternating 1,0 pattern of digital signals (e.g., 10101010...) continued for 240 bits (25 milliseconds at 9600 baud). This dotting pattern allows circuits within the receiver of the communications system to quickly obtain bit synchronization.

The synchronization sequence occurring within the preamble portion after the dotting pattern includes three repeated fields: a 16 bit synchronization word "S" (preferably an 11 bit Barker code such as 11100010010 and 5 bits of "fill" or dotting), an 8 bit "outside address" (OA) repeated once in complimented form to complete a second 16 bit field; and a 5 bit synchronization number (SN) repeated three times (with the second repeat being in complimented form) plus one final bit of odd parity code so as to complete the third 16 bit field.

The repeated IV and SS sequence following the synchronization sequence includes a 64 bit guardband (GB), a 64 bit initialization vector (IV), and a 16 bit selective signalling address (SS). In the prior art FIG. 1 protocol, the 64 bit guardband GB provides fade protection (and is not used to carry useful intelligence), and the 64 bit IV field establishes cryptographic synchronization in accordance with the conventional DES (described, for example, in "Federal Information Processing Standards" publication no. 46, Data Encryption Standard, U.S. Department of Commerce, NTIS, 5285 Port Royal Road, Springfield, Va. 22161). The 16 bit selective signalling field SS provides group and individual selective signalling capability within a radio communication network (i.e., "addresses" specifying particular individual or groups of receivers are transmitted in this field). The IV, GB and SS fields are repeated nine times in the FIG. 1 protocol.

Following the preamble are successive data frames each of which preferably includes a subpreamble ("header") portion and successive bits of digital data signals (e.g., encrypted voice data). The header includes a single repeat of the synchronization word S, the outside address field OA, the initialization vector IV and the selective signalling address SS. Enough information is provided in each header portion so as to allow for late entry into an ongoing message or conversation and/or so as to reestablish lost frame or cryptographic synchronization (e.g., as might occur from temporary loss of signal due to fading or multipath interference conditions or the like on a typical radio frequency communications channel). A synchronization maintenance control function in the receiver monitors the ongoing received data frame header—and can reestablish bit synchronization, frame synchronization, cryptographic synchronization and selective signalling control from the header portion alone.

An end of message (EOM) signal is provided at the end of a message transmission to alert receivers that the message is terminated.

The FIG. 1 signalling protocol is highly successful, and permits extremely reliable communication of digital signals over a radio (or other) communications channel subject to fading, noise and other phenomenon at a sufficient data rate and with very low error probability. However, further improvements are possible.

For example, although the FIG. 1 signalling protocol is designed to communicate encrypted digitized voice data (although it is by no means limited to communicating this type of information), it would be desirable to selectively communicate digitized voice data or digital information provided by a purely digital signal source such as a data terminal—and to provide signalling control signals within the communications protocol to signify to the receiver what type of message information is being communicated. There exists a great demand for radio transceivers which can convey not only voice information but also digital information produced by a data terminal or computer. While the FIG. 1 protocol is not limited to communicating voice data (virtually any type of digital data could be conveyed within the message data frames), a transmitted indicator signal indicating the type of data being transmitted would permit receivers to treat received digital information in the appropriate manner (e.g., convert the data to analog audio signals for application to a loudspeaker, or preserve the data in digital form to be displayed on a data terminal or stored in a computer memory).

Further improvement in error-free transmission at high data rates is also possible. An effective data rate of 9600 baud on an error free channel is desired. This effective data rate should degrade to no less than 2400 baud on a 1.0% BER channel with no RF fading. The probability of receiving a message of 9600 bits incorrectly on a channel with 1.0% BER and no fading should be no greater than 0.0001, and with typical fading on the channel, this probability should increase to no more than 0.01.

The signalling protocol should also demonstrate some form of adaptivity to deleterious phenomenon present on the communications channel (e.g., noise and/or fading). While numerous repetitions of the same data may be necessary to ensure accurate reception when the communications channel is subject to noise and/or fading, such repetitions decrease the effective data rate and may not be necessary when communicating signals over an optimal channel having little or no fading and noise. If the receiver has trouble receiving a particular data packet, then the transmitter should somehow adapt and repeat the packet. Data packets should be repeated more often as the bit error rate of the communications channel increases—without significantly increasing the "overhead" traffic on the channel used for communicating control signals rather than useful data signals.

Moreover, it would be desirable for such an adaptive signal format to be compatible with the prior signalling format shown in FIG. 1 (and thus, with existing communications equipment such as repeaters and mobile transceivers designed to communicate using that protocol).

BRIEF DESCRIPTION OF THE DRAWINGS

These and other features of the present invention will be better and more completely understood by studying the following detailed description of presently preferred embodiments together with the appended drawings, of which:

FIG. 1 is a schematic timing diagram of a prior digital signalling format;

FIG. 2 is a schematic diagram of the presently preferred exemplary embodiment of a communications system 50 of the present invention;

FIG. 5A is a schematic diagram of an exemplary format of the guardband field shown in FIG. 5;

FIG. 6 is a schematic diagram of an exemplary subpreamble portion of the signalling format shown in FIG. 4;

FIGS. 12A-12B together show exemplary program control steps of a routine SHUFTX called by the XDOM routine shown in FIGS. 11A-11B;

FIG. 16 is a schematic flow chart of exemplary program control steps of a serial interrupt routine performed in response to s serial "interrupt" received by the transceiver control microprocessor shown in FIG. 3;

FIG. 19 is a schematic flow chart of exemplary program control steps of a routine OUTDAT called by the serial interrupt routine shown in FIG. 16;

BRIEF DESCRIPTION OF A PRESENTLY PREFERRED EXEMPLARY EMBODIMENT

Overall System

Figure 3:
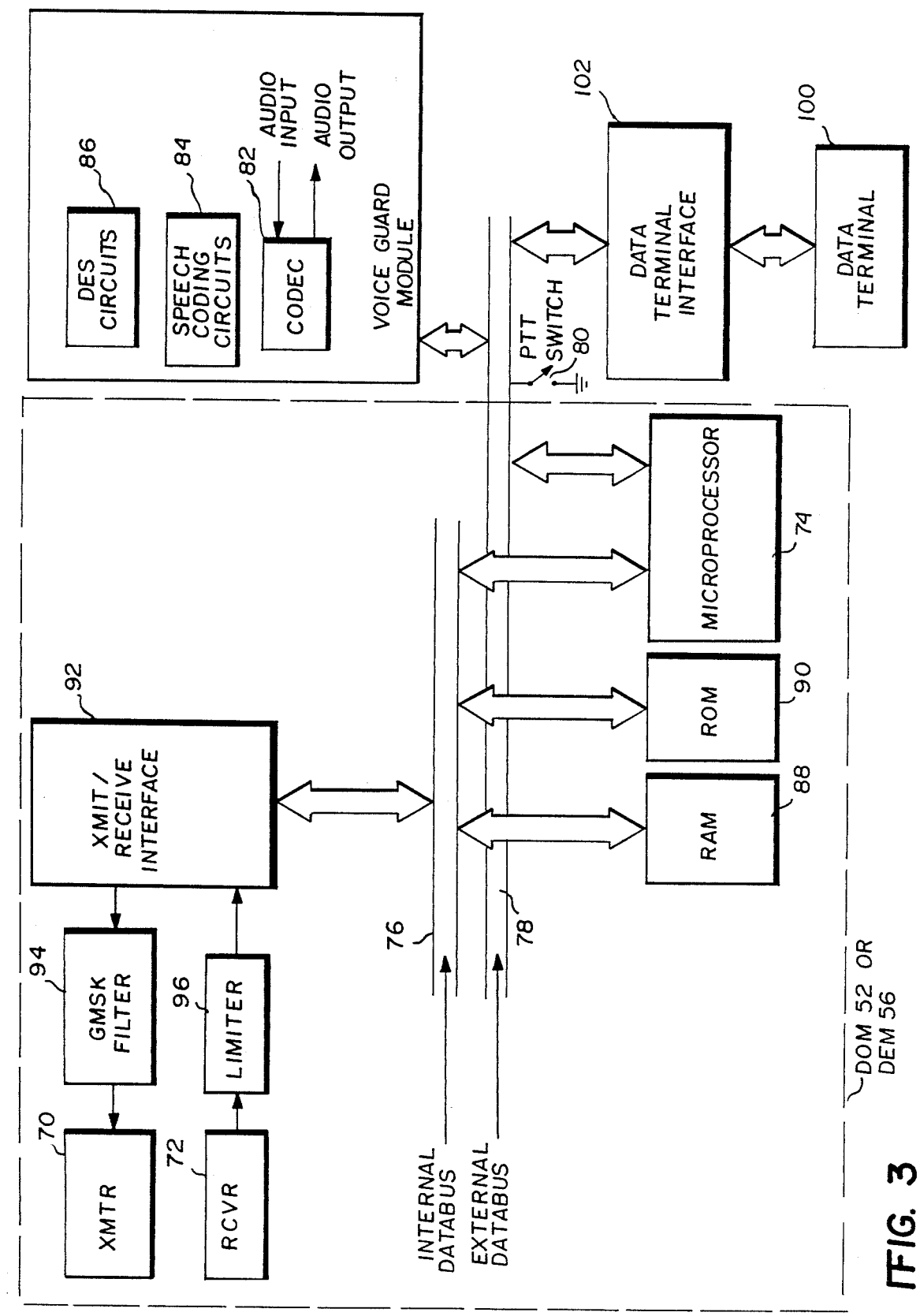
FIG. 3 is a schematic block diagram of exemplary communications transceivers shown in FIG. 2.

FIG. 2 is a schematic diagram of a presently preferred exemplary embodiment of a digital radio communications system 50 in accordance with the present invention. Communications system 50 includes a data originating mobile digital radio communications transceiver (hereafter "DOM") 52, a repeating radio communications transceiver ("repeater") 54, and a destination digital radio communications transceiver (hereafter "DEM") 56.

DOM 52 transmits digital data through repeater 52 (operating on one or more predetermined radio frequency communications channels) to DEM 56. Upon receipt of a transmitted data burst, DEM 56 transmits to DOM 52 an acknowledge signal which acknowledges receipt of the data and specifies whether the data has been correctly received.

The DOM 52 originates digital data, formats this digital data into a predetermined signalling format, and modulates a radio frequency carrier signal with the digital data so formatted to produce RF "data bursts." These radio frequency data bursts are transmitted by DOM 52 to repeater 54 via RF communications link 58 (the communications link is a selected RF communications channel in the preferred embodiment). Repeater 54 receives, detects, regenerates and retransmits the data bursts over radio frequency communications link 60 (preferably another selected RF communications channel) to DEM (destination mobile) 56. DEM 56 receives the regenerated, retransmitted RF data bursts and demodulates them to extract the digital data signals they carry.

Each data burst transmitted by DOM 52, repeated by repeater 54 and received by DEM 56 contains N (preferably 16 or 32) data "packets" each of which contain M (preferably 64 or 128) bits of digital signal information. Each packet in a data burst can be unique, or packets may be duplicates of one another in the preferred embodiment, depending upon several different factors (as will be explained).

Following the transmission of a data burst from DOM 52 (via repeater 54) to DEM 56, the DEM responds in the preferred embodiment by transmitting an "acknowledge" message consisting of a bit map with 1 bit corresponding to each packet in the data burst, which specifies which packets in the data burst transmitted by DOM 52 were correctly received and how many new packets can be accepted by DEM in the next transmission. This acknowledge message is received by repeater 54 (via RF link 60), detected, regenerated and retransmitted by the repeater, and received (via link 58) by DOM 52. The received acknowledge message at least partially determines which data packets the DOM 52 transmits in the next successive data burst.

In the preferred embodiment, DEM 56 acknowledges every data burst it receives by transmitting an acknowledge message. The transfer of a data burst in the preferred embodiment includes: (1) a transmission from DOM 52 to DEM 56; and (2) a responsive (handshaking) transmission from the DEM to the DOM.

The first data burst in a message transmitted by DOM 52 includes some special information (e.g., an "outside address" and an "initialization vector") used to initialize repeater 54 and DEM 56 and to synchronize the DOM, the repeater and the DEM. After DOM 52 transmits this initial information, it transmits a data burst containing N data packets. After transmitting the first data burst, DOM 52 waits for receipt of an acknowledge message transmitted by DEM 56. Based upon the contents of the received acknowledge message, DOM 52 may retransmit another data burst containing some or all of the data packets already transmitted—or it may transmit a new data burst containing N previously-untransmitted data packets. This process continues until the entire digital message to be transmitted has been correctly received and acknowledged by DEM.

Radio Transceivers

In the preferred embodiment, DOM 52 and DEM 56 are identical, and each have the architecture shown in FIG. 3, a schematic block diagram of a preferred digital radio communications transceiver (this transceiver can act as a DOM or a DEM as controlled by the user). The structure and operation of DOM 52 and DEM 56 will now be described in connection with that FIG. 3.

The transceiver shown in FIG. 3 includes the usual radio frequency transmitter 70 and radio frequency receiver 72 (or any other communication channel transmitter and receiver such as, for example, the transmit lines and receive lines of a conventional wire line modem). As indicated in FIG. 3, the transceiver may be in communication with one or more repeaters or other transceivers or base station(s) over a radio frequency or other form of communication channel.

The transceiver shown in FIG. 3 can operate in either a "clear" mode or a "private" mode. In the "private" mode, data to be transmitted is first encrypted using the Data Encryption Standard (see NTIS FIPS Pub. 46)—and similarly, received data is decrypted using DES before it is outputted by the transceiver. In particular, the microprocessor circuitry takes conventional input signals (e.g., from a microphone or audio amplifier or the like) and converts those to a stream of cryptographically encoded digital signals input at the modulator of transmitter 70. On the receive side, a stream of digital signals produced at the detector output of receiver 72 is ultimately decoded and converted into output signals before being passed on to the usual receiver audio output circuitry (e.g., audio amplifiers, loudspeaker and the like).

The overall architecture of the microprocessor control system shown in FIG. 3 is generally conventional. The heart of the system is a control microprocessor 74 (e.g., an Intel 8031 integrated circuit chip) which communicates with the remainder of the digital circuitry via internal data bus 76 and external data bus 78. The usual push-to-talk (PTT) switch 80 may be considered as one wire in the control bus 78 if desired. The system may include a conventional codec 82 (e.g., an Intel 2916 integrated chip) and conventional speech coding circuits 84 in the form of a suitably programmed digital signal processor (DSP) (e.g., NEC 7720 integrated circuit chip) for converting audio signals to/from digital/analog form in accordance with known speech digitization and processing algorithms.

In the FIG. 3 transceiver, a hybrid subband coding technique may be employed in accordance with the invention claimed in copending U.S. patent application Ser. No. 661,598 filed Oct. 17, 1984. The Data Encryption Standard is implemented via DES circuits 86 (e.g., MC 6859 integrated circuit chip) and a conventional DES key memory 88. Suitable conventional ROM circuit 90 (e.g., 4 kilobytes) are also provided to physically embody the program control structure pertinent to the system shown in FIG. 3.

The transmit/receive interface circuits 92 are sometimes referred to as "modem" circuits and may also be of conventional design. They preferably include bit restoration circuits of the type described in commonly-assigned U.S. Pat. No. 4,382,298 to Evans. Reference may also be had to commonly-assigned U.S. Pat. No. 4,027,245 to Stackhouse et al for digital transmit/receive mode interface circuits suitable for use with radio frequency transmitters and receivers such as transmitter 70 and receiver 72 and for a hard-wired Barker code sync word detector.

A conventional Gaussian Minimum Shift Key (GMSK) filter 94 (e.g., a fourth order lowpass Bessel filter with a cutoff frequency of about 7 kilohertz measured at the 3 dB points) is preferably included to process a stream of digital output signals before they are passed on to the modulator of transmitter 70 as will be appreciated by those skilled in the art.

The output of receiver 72 (e.g., from an FM discriminator) is also preferably passed through a conventional limiter circuit 96 to eliminate DC bias effects that otherwise would be present in the output of the receiver discriminator. For example, limiter 96 may utilize a simple comparator to compare the instantaneous incoming signal from receiver 12 with a running averaged value over some previous relatively short time interval as should also be appreciated by those skilled in the art.

In addition to transmitting and receiving voice information, the transceiver shown in FIG. 3 is also capable of transmitting and receiving digital data signals produced by a data terminal 100. Data terminal 100 is preferably a conventional digital data terminal including a keyboard (or other) input device and a display (or other) output device. Data terminal 100 is connected to a data terminal interface 102 which interfaces the data terminal with bus 76 and transceiver control bus 78.

An operator using the FIG. 3 transceiver has a choice: He/she can either speak into a microphone to transmit voice and listen to the loud speaker producing audio corresponding to received voice signals; or he/she can input text (or other digital messages) via the keyboard of data terminal 100 and read received digital text messages on the display associated with the data terminal (or control the data terminal to process the received signals in other ways).

The FIG. 3 transceiver is capable of differentiating between digital information produced by and/or to be routed to data terminal 100, and audio information produced by the microphone and/or to be routed to the audio output circuits. In addition, the FIG. 3 transceiver can encrypt digital data originating at the data terminal 100 before transmitting the data and decrypted received data before applying the received data to terminal 100.

The manner in which a transceiver similar to the FIG. 3 transceiver is used for transmitting and receiving voice signals is described in detail in copending commonly-assigned U.S. patent application Ser. No. 661,733 to Szczutkowski et al filed Oct. 17, 1984. In accordance with the present invention, the FIG. 3 transceiver uses a signalling protocol which is compatible with that shown in FIG. 1 to transmit digital data produced by data terminal 100 and to receive digital data to be displayed or otherwise handled by the data terminal.

Signalling Protocol

Figure 4:
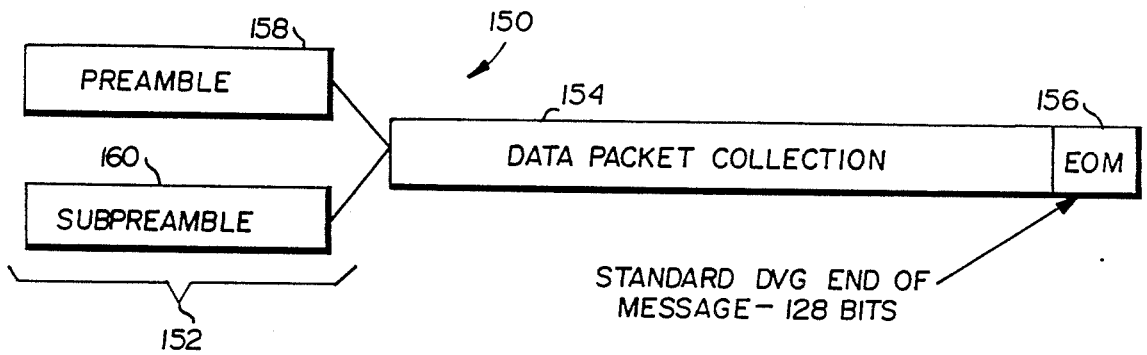
FIG. 4 is a schematic diagram of the presently preferred exemplary embodiment of a data burst signalling format in accordance with the present invention.

FIG. 4 is a schematic diagram of the overall format of a digital data burst 150 transmitted by DOM 52 in accordance with the presently preferred exemplary embodiment of the present invention. Burst 150 includes three portions: (a) a header portion 152; (b) a data packet collection portion 154; and (c) an end of message (EOM) portion 156.

Header portion 152 includes signals used for bit, frame and cryptographic synchronization, selective addressing and the like (as will be explained in detail shortly). Data packet collection 154 includes "packets" of digital signals representing the message being conveyed. End of message portion 156 includes signals indicating the end of data burst 150.

Header portion 152 in the preferred embodiment includes either a preamble 158, or a subpreamble 160. Since data burst 150 has a predefined length, many data bursts 150 may be needed to transmit a single message of digital data (messages can have any length), each data burst containing only a portion of the message. Repeater 54 and DEM 56 must be initialized and synchronized with DOM 52 before the message is transmitted—and preamble 158 contains signals needed to establish bit synchronization, frame synchronization and cryptographic synchronization between DOM 52, repeater 54 and DEM 56 (as well as to selectively address individual or groups of DEMs and to perform other functions as well).

To increase effective bit rate, preamble 158 is transmitted only at the beginning of a message transmission (e.g., at the beginning of the first-transmitted data burst 150 containing the first portion of the message), although it may also be transmitted in one or more later data bursts if needed (e.g., to indicate a change in data format occurring in the middle of a message transmission). The subpreamble 160 contains some of the same initialization information contained within preamble 158, but is much shorter than the preamble (so that effective data rate can be maximized). Subpreamble 160 is transmitted at the beginning of each data burst 150 subsequent to the initial burst in the preferred embodiment.

Figure 5:
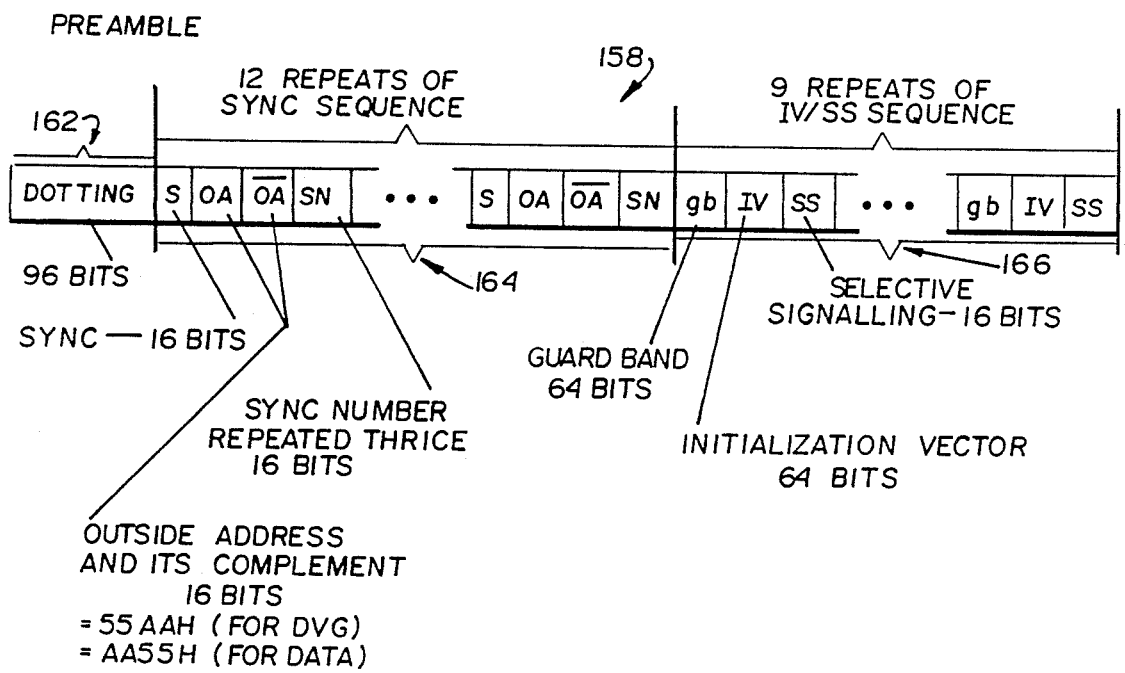
FIG. 5 is a schematic diagram of an exemplary format of the preamble portion of the signalling format shown in FIG. 4.

FIG. 5 is a schematic diagram of preamble portion 158, which includes the following signals: (a) a dotting sequence 162; (b) a synchronization sequence 164; and (c) an IV/SS sequence 166. In the preferred embodiment, the synchronization sequence 164 and the IV/SS sequence 166 are each repeated multiple times in preamble 158 to assure proper recognition and provide fade protection.

Dotting sequence 162 (96 bits of "dotting" pattern, e.g., 101010 . . . ) allows repeater 54 and DEM 56 to efficiently establish bit synchronization with DOM 52.

Synchronization sequence 164 includes a synchronization word S, an "outside address" word OA, and a synchronization number word SN.

In the preferred embodiment, synchronization word S is a 16 bit long digital word used to establish synchronization, and in particular, is an 11 bit Barker code such as 11100010010 preceded by 5 bits of fill or "dotting" (e.g., 10101).

Outside address word OA is 8 bits long in the preferred embodiment—and is repeated in complemented form immediately after being transmitted in original form, for a total length of 16 bits. In the preferred embodiment, this outside address word OA indicates whether the message being transmitted contains digital data or digitized voice. That is, in the presently preferred embodiment, the digital value contained within outside address word OA is set to "55AAH" if the message contains digitized voice, and is set to "AA55H" if the message contains digital data.

Synchronization word SN contains the number of the repetition of the "group" (of synchronization word S and outside address word OA) the synchronization word SN is associated with. This group is repeated 12 times in synchronization sequence 164 (with synchronization word SN indicating the number of each repetition) in the preferred embodiment. Synchronization word SN provides fade protection and also helps DEM 56 to determine if it has received preamble 158 correctly.

IV/SS sequence 166 in the preferred embodiment includes: (a) a guardband field gb; (b) an initialization vector (IV); and (c) a selective signalling word SS. The IV contains decryption information, and word SS continue selective addressing signals. In one implementation, the guardband field contains only dotting or other filler and is used to provide fade protection during transmission of the IV/SS sequence. In another presently preferred implementation, however, the guardband field (or in addition to) rather than the outside address field OA is used to carry information which permits repeater 54 and DEM 56 to distinguish between a digital data message and a digital voice message.

In the preferred embodiment, instructions can be passed from DOM 52 to DEM 56, and from the DEM back to the DOM, via the guardband within the IV/SS signalling sequence of preamble 158. FIG. 5A shows the preferred format for the guardband.

In the preferred embodiment, the guardband contains command, selective addressing, format control, error checking, and other information. More particularly, the guardband includes the following fields: A 4 bit command field 190, a 1 bit NP (not participating) field 192, a 1 bit MC (mid command execution) field 194, an 8 bit SUBGS (subgroup source) field 196, an 8 bit SUBGD (subgroup destination) field 198, a 6 bit BPP (bytes per packet) field 200, a 6 bit PPB (packets per burst) field 202, a 14 bit working field 204, and a 16 bit CRC (error checking) field 206.

The SUBGS and SUBGD fields 196, 198 are used in connection with the SS field to provide selective addressing. In the preferred embodiment, the SS field is used to designate a group of radio transceivers, while the SUBGS and SUBGD fields designate a subset of that group—the SUBGD field specifying a subset of the group to receive the message (i.e., DEMs intended to receive the message), and the SUBGS field specifying the subset which the transceiver originating the message (i.e., the DOM) is a member of.

In the preferred embodiment, the number N of data packets per data burst 150 is preset for any given message as is the number M of bytes per data packets. In the preferred embodiment these preset numbers N and M are not fixed, but instead can be varied as desired depending upon a number of different factors (e.g., message length or message content). In the preferred embodiment, the BPP field 200 indicates the number of bytes per packet (M), and the PPB field 202 indicates the number of packets per data burst (N).

The working field 204 of the guardband contains a maximum of 14 bits used to carry parameters associated with the command(s) indicated by the command field 190. The CRC field 206 contains conventional CRC error checking information protecting the entire guardband.

The NP and MC fields (190, 192 are single bit control fields used to convey specific control information. The NP bit when set indicates to the receiving transceiver that the current data burst 150 contains no data packets. A set MC bit drives a receiving transceiver to change formats in the middle of a message to those specified by other guardband fields.

Referring once again to FIG. 5, the initialization vector (IV) within IV/SS sequence 166 contains the conventional 64 bit long initialization vector required by the Data Encryption Standard, and is used to establish cryptographic synchronization between DOM 52, repeater 54 and DEM 56. Selective signalling word SS is 16 bits long in the preferred embodiment and may be used (in configuration with guardband fields 196, 198) for selective calling of individuals or groups using the same DES cryptographic key.

The SS field (along with the SUBGS and SUBGD fields 196 and 198 within the guard band) provides truly selective signalling capabilities within a cryptographic communications network. The 16 bit SS field and the SUBGD field may represent, for example, a user group with individual addresses designating particular users, so that users with the same cryptographic key may nevertheless have the ability to further limit their calls to reception by individual or groups of transceivers within their particular network. The SS field and the SUBGD field may also be encrypted to facilitate selective signalling within a group of users having the same DES key while providing no information to a user with a different key (or to an eavesdropper).

The group of words including the guardband, the initialization vector and the SS word are preferably repeated nine times to provide fade protection. As mentioned previously, a "5-out-of-9" vote is utilized in the preferred embodiment for analyzing the nine times repeated IV/SS data sequence 166. For example, at the receiver, each of the nine sequential GB/IV/SS data fields is voted bit-by-bit on at least a 5-out-of-9 basis. If at least 5 of the 9 versions of this received group of signals do not match exactly, the DEM 56 concludes that it has incorrectly received preamble 158 and requires the DOM 52 to retransmit. If at least 5 versions are "voted on" (i.e., found to match), the voted results are stored and used as the correct IV/SS vectors for cryptographic synchronization and selective signalling purposes.

FIG. 6 is a schematic diagram of an exemplary subpreamble portion 160 shown in FIG. 4. The subpreamble portion 160 includes a dotting portion 162 and a synchronization sequence 164, but not an IV/SS sequence 166. In subpreamble 160, outside address OA of synchronization sequence portion 164 is repeated in uncomplimented form (compare the complemented repeated outside address OA in the synchronization sequence 164 of preamble 158). DOM 52, repeater 54, and DEM 56 use this feature to distinguish between preamble 158 and subpreamble 160 (i.e., if a transceiver receives a synchronization sequence portion 164 in which the repeated outside address OA is identical to the first occurrence of the outside address word, then the synchronization sequence portion is part of a subpreamble 160; on the other hand, if a transceiver receives the outside address word followed by its compliment, a preamble 158 is being received).

Figure 7:
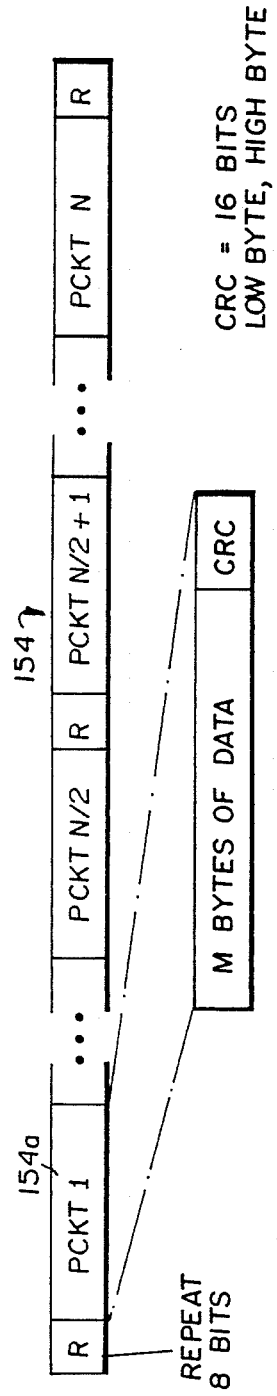
FIG. 7 is a schematic diagram of an exemplary data packet collection portion of the data burst signalling format shown in FIG. 4.

FIG. 7 is a schematic diagram a data packet collection portion 154 shown in FIG. 4. Data packet collection portion 154 includes N data packets 154a, where N is an integer multiple of 8 in the preferred embodiment. In the preferred embodiment, each data burst 150 contains the same number N of data packets 154a, and each data packet 154a contains the same number M bits of data (although the guardband shown in FIG. 5A can be used to specify N and M for different message transmissions).

During any particular transmission of a data burst 150, data packets 154a could all be different—or some data packets could be repeats of others. At the beginning, the middle and the end of data packet collection 154, a "repeat" (R) byte is transmitted which indicates if the data burst 150 is, in toto, a repeat of an earlier-transmitted data burst. For example, DOM 52 repeats the last-transmitted data burst 150 if it fails to receive a proper acknowledgement from DEM 56 (and transmits this literal data burst repeat with the contents of repeat field R indicating the transmitted burst is a repeat). DOM 52 also repeats the last-transmitted data packet if errors in a received acknowledge message prevent the DOM from determining which data packets to send next.

Each data packet 154a includes M bytes of data followed by a 16 bit cyclical redundancy check (CRC) field (or other desired error detection field). The total number of bits in data packet collection 154 is equal to $24 + (M*8 + 16) * N$, where $M + 8$ is a number of bits in each data packet 154a, N is the number of data packets in each collection 154, 16 is the number of bits in each CRC field, and 24 is the combined length of the three repeat fields R. The time it takes to transmit data packet collection 154 is thus $$time = (24 + (M*8 + 16).N)/9600$$

for a data transmission rate of 9600 baud.

Command Handling

Referring once again to FIG. 5A, command field 190 of the preamble guardband contains (or may contain) a command the receiving transceiver is to execute. A command to control transceivers 52, 56 may be issued by inputting the command into data terminal 100 and/or by transmitting the command in the guardband of a preamble 158 preceding a data burst 150 (the data burst may but need not carry data packets) or an acknowledge burst 170. A slightly different command format is used for commands inputted via data terminal 100 (these commands are formatted so as to be user friendly) versus commands provided via the guardband (which must be bit efficient). The terminal command format will now be discussed (the guardband formats being simply straight-forward decimal-to-binary conversions of the terminal formats).

The command interface is broken down into six commands. The commands indicate the type of data (ASCII or binary) to be transferred or control the data flow (set the format or stop the current function). Each command is preceded by a control character to reset the command parse buffer allowing for a new command to be entered. The commands are shown below:

| Name | Code Number | Description |
|---|---|---|
| XFERA | 0 | Transfer ASCII bytes until the STOP command is received |
| XFERB | 1 | Transfer a fixed number of binary bytes (0 to 2047 bytes) |
| XFERLA | 2 | Transfer ASCII data one line at a time (0 to 255 bytes per line) until a STOP command is received |
| FORMAT | 3 | Specify data format: bytes/ packet, packets/burst, and voting |
| STOP | 4 | Terminate current command (except XFERB) |
| NULL | No Number | Cancel current data entry - used in XFERB to abort data on the current entry, reset command parse buffer |
| RETRANSMIT | No Number | Resend last data message (between MDI and MDT) |
| ACKNOWLEDGE | No Number | Acknowledge command line |
| NOACK | No Number | No Acknowledge command line (retransmit) |
| XON/XOFF | No Number | Controls data flow during XFERA an XFERLA modes of operation |

A complete description of each of these commands follows.

A. XFERA - CONTINUOUS ASCII TRANSFER

The format for this message is:

<D>0tgggg<CR>(note: D="EOT")

where t,g=call type:
  0 - use radio settings
  1 - call multiple units on group 'gggg' with no acknowledges
  2 - call individual 'gggg' with acks
  gggg=group ID to call (0 to 2047) or individual ID to call (0 to 4095)

This command is used to transfer continuous ASCII data from the mobile data terminal (MDT) to the specified unit. The data will continue until a STOP command is received.

EXAMPLE: <D>021234<CR>

The above example is used to set-up continuous ASCII data from the MDT to the unit with Individual (or Logical) ID 1234.

B. XFERB - FIXED LENGTH BINARY TRANSFER

The format for this message is:

<D>1tggggnnnn<CR> where t,g,n='0','1','2', . . . , '9' t=call type:
  0 - use radio settings
  1 - call multiple units on group 'gggg' with no acknowledges
  2 - call individual 'gggg' with acks
  gggg=group ID to call (0 to 2047) or individual ID to call (0 to 4095)
  nnnn=number of binary bytes to transfer (0 to 2047)

This command is used to transfer a fixed number of BINARY data byte from the MDT to the specified units(s). Since the data is binary, no control commands are recognizable so the process cannot be interrupted until all the bytes have been received.

EXAMPLE: <D>0212340135<CR>

The above example is used to set-up for 135 bytes of binary data from the MDT to the unit with Individual (or Logical) ID 1234.

C. XFERLA - ASCII LINE-BY-LINE TRANSFER

The format for this message is:

<D>2tgggg<CR> where t,g='0','1'.'2', . . . ,'9'
  t=call type:
    0 - use radio settings
    1=call multiple units on group 'gggg' with no acknowledges
    2 - call individual 'gggg' with acks
  gggg=group ID to call (0 to 2047) or individual ID to call (0 to 4095)

This command is used to transfer line by line data from the MDT to the specified unit(s). A line may contain up to 255 bytes. A complete line can be terminated by sending the NULL command sequence. The XFERLA sequence can be terminated by sending the STOP command sequence.

When in the XFERLA mode, all <LF> are ignored by the MDI. Lines are delineated by a <CR>.

EXAMPLE: <D>221234<CR>

The above example is used to set-up line-by-line ASCII data from the MDT to the unit with Individual (or Logical) ID 1234.

D. FORMAT

The format for this message is:

<D>3vxxyy<CR> where v,x,y='0'c'1','2', . . . , '9'
  xx=bytes per packet
  yy=packets per burst
  v=voting:
    0 - no voting
    1 - ⅔ voting This command is used to specify the data format used in the data transfer.

EXAMPLE: <D>301632<CR>

The above example is used to specify the data format for the next command as 16 bytes per packet and 32 packets per burst with no voting.

E. STOP COMMAND

The format for this message is:

<D>4<CR>

This command is used to stop execution of all current commands except the XFERB.

EXAMPLE: <D>4<CR>

F. NULL COMMAND

The format for this message is:

<D><CR>(<CR> is optional)

This command is used in the XFERLA mode to terminate an input line. The line is cleared when the <D><CR> (both characters) sequence is received.

When entering a command, a <D> causes the command parse buffer to be cleared, allowing a new command to be entered. Therefore, if an error is made on the input command line, it can be cleared by sending <D> and sending the correct command. If a <D><CR> is received (e.g., from a terminal) a <CR><LF> will be echoed back to cause the unit to go to the next line.

G. RETRANSMIT

The format for this message is:

<DZ RTR<G><CR>

This command is used to request that a data message be retransmitted in either direction. When a terminal is used, this message would leave "RTR" at the end of the line as a visual indicator to re-enter the data and would also sound the terminal bell. For the intelligent MDT the sequence request the data be retransmitted automatically and can be used in either direction.

H. ACKNOWLEDGE

The format for this message is:

<F><LF><CR> (Note: F="ACK")

This message is used to acknowledge a command line. If a terminal is used, the message will reset the terminal cursor to the start of the next line. If a MDT is used, the command is simply an acknowledge that the two units are now ready to transfer another command or data.

I. NOACKNOWLEDGE

The format for this message is:

<U>RTR<CR> (Note: U="NAK")

This message is used to no-acknowledge a command line. If a terminal is used, the message will display an RTR at the end of the command line and move the cursor to the start of the current line (i.e., no <LF>). If an MDT is used, it will automatically retransmit the command line.

J. XON/XOFF

The format for this data is:

<S>OR <Q> (Note: or "DC1"/"DC3")

These control commands are accepted/issued when the MDI is in an ASCII data transfer mode. They are used to stop and start data transfers when the internal buffers are full. In the binary transfer mode (XFERB), the modem controls—CTS, RTS—are the only way to temporarily stop the data transfer.

Acknowledge Message Handshaking

Figure 8:
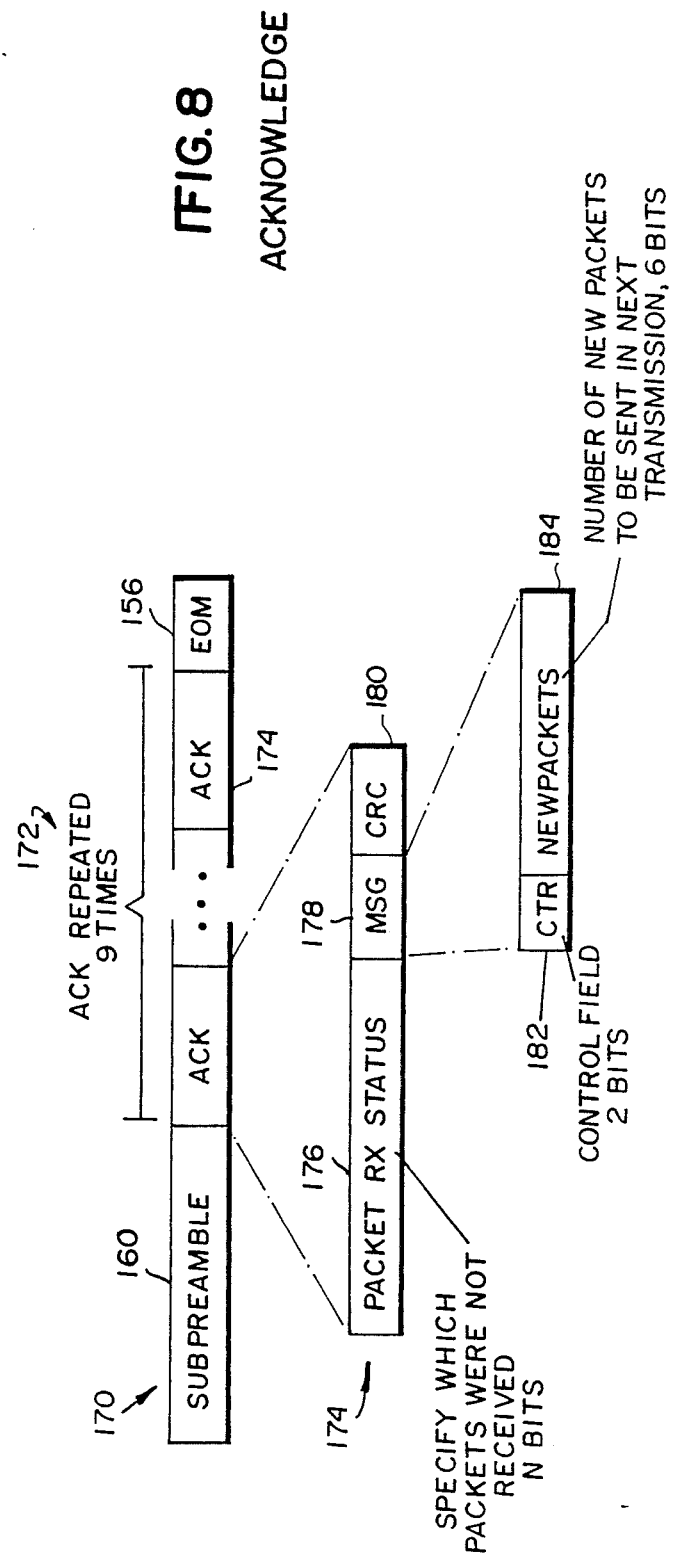
FIG. 8 is a schematic diagram of an exemplary acknowledgment message transmitted by a transceiver in accordance with the present invention in response to receipt of the data burst shown in FIG. 4.

FIG. 8 is a schematic diagram of an exemplary acknowledge message 170 transmitted in the preferred embodiment by DEM 56 to DOM 52 upon receipt of data burst 150. After DOM 52 has transmitted a data burst 150 to DEM 56, the DEM responds with an acknowledge message 170. If no acknowledge message 170 is received by DOM 52 (by the time a predefined timeout period has expired), DOM 52 retransmits the last-transmitted data burst 150. A repeated data burst 150 is marked by setting the contents of repeat field R (see FIG. 7) to a predetermined value. If, on the other hand, acknowledge message 170 is received correctly by DOM 52, the DOM uses the contents of the acknowledge message to construct the next data burst 150 to be transmitted.

The acknowledge message 170 transmitted by DEM 56 includes two important pieces of information: (1) Which of data packets 154a in the last-transmitted data burst 150 were received correctly or incorrectly by the DEM; and (2) How many (new) data packets can be accepted by the DEM in the data burst 150 next to be transmitted.

Acknowledge message 170 includes a subpreamble portion 160 (as shown in FIG. 6); an acknowledge sequence 172; and an end of message portion 156. Acknowledge sequence 172 includes a repeated acknowledge data burst 174 (in the preferred embodiment this acknowledge data burs is repeated 9 times). Each acknowledge data burst 174 includes a status field 176, a message field 178, and an error checking (CRC) field 180. Each message field 178 includes a control field 182 and a "NEWPACKET" field 184. In the preferred embodiment, the total number of bits in acknowledge message 170 is 1016+9.N (where N is the number of bits in status field 176). NOTE: Status field 176 is a bit map of N bits—1 bit for each data packet. The state of the bit indicates whether the packet was received correctly or not. By using the bit map, no overhead associated with transmitting packet numbers is incurred. Also, DOM does not send a packet number with each packet.

Acknowledge message 170 indicates which data packets 154a in the last-transmitted data burst 150 were correctly or incorrectly received, and also specifies how many not-previously-transmitted data packets can be accepted in the next transmission. DOM 52 generally transmits data packets 154a sequentially in an order predetermined by data terminal 100. For example, if a textual message including a plurality of individual characters is input to data terminal 100 for transmission to DEM 56, DOM 52 attempts to transmit those characters in the same order they were inputted. Likewise, DEM 56 expects to receive a sequence of data packets 154a containing characters ordered in the same way they were inputted to data terminal 100 (so that the contents of these data packets can be displayed or otherwise processed in the order they are received).

Sometimes, however, noise, fading or other phenomenon present on communication link 58 and/or communication link 60 causes DEM 56 to incorrectly receive some of the transmitted data packets 154a. Instead of sending a data stream with embedded "gaps" to terminal 100, DEM 56 transmits an acknowledge message 170 requesting DOM 52 to retransmit incorrectly received packets and meanwhile stores the correct, received data packets in a buffer until DOM retransmits the incorrectly received packets and the DEM correctly receives them. Once DEM 56 correctly receives the retransmitted packets, it processes them in their correct order with respect to the earlier-transmitted correctly received (and already stored) packets.

DEM 56 preferably processes received packets 154a in blocks (the length of these blocks in the preferred embodiment is a multiple of the number of packets 154a transmitted in each data burst 150 plus a few extra). In the preferred embodiment, DEM 56 accumulates a block of data (containing, e.g., 18 packets) and presents this block of data to data terminal 100.

New packet field 184 within acknowledge message 170 indicates to DOM 52 how many additional "new" packets DEM 56 requires to finish "building" a full block of data.

As can be seen from the transmission formats set forth in FIGS. 4–9, all critical data (including acknowledge sequence 172 or acknowledge messages 174) transmitted in the preferred embodiment is checked using conventional cyclical redundancy checking algorithm in order to guarantee data integrity. The majority of transmission errors occur within data packets 154 since they are large relative to the rest of the transmission. Recovery from these errors occurs quite smoothly in the preferred embodiment of the present invention. Errors occurring within the control fields pose a somewhat greater problem, even though they occur less often.

In the preferred embodiment, the total number N of data packets within each data burst 150 is transmitted within the preamble guardband of the initial data burst (e.g., as a parameter of the transmitted XFERA command).

If the number of different data packets to be sent in a given data burst 150 is less than N (where N is the number of data packets within the data burst), then the packets being sent are repeated in the preferred embodiment from lowest to highest order over and over until all N data packets in the outgoing data burst have been filled.

When DEM 56 acknowledges the receipt of a data burst 150, it notifies DOM 52 which packets were correctly or incorrectly received (according to conventional error checking using the CRC codes within the data burst). In addition, DEM 56 notifies DOM 52 how many packets the DEM can accept in the next transmission.

For example, if a total of 16 data packets 154 (P1–P16) are to be transmitted, DOM 52 initially communicates the value 16 to DEM 56, and then transmits a data burst 150 containing all 16 data packets (assuming in this example that N, the number of data packets within each data burst, is 16). When DEM 56 receives the transmitted data burst, the DEM determines if any transmission errors have occurred by analyzing the received embedded CRC code on each data packet in a conventional manner.

Suppose DEM 56 discovers a transmission error in the third packet transmitted (P3) but receives all of the other data packets correctly. The acknowledge message 170 transmitted by DEM 56 to DOM 52 indicates (in status field 176) that the third packet was not correctly received and that the other data packets were correctly received. Acknowledge message 170 also indicates (in new packet field 184) that DOM 52 should transmit no new data packets (since all sixteen data packets of the message have already been transmitted at least once).

DOM 52 transmits the next data burst 150 in response to received acknowledge message 170. This next data burst 150 includes not just one, but 16 data packets 154a (since in the preferred embodiment, all data bursts 150 have the same number of data packets for a given transmission). Each one of the 16 data packet fields 154a within this data burst 150 contain the third data packet P3 (so that the data burst repeats packet P3 16 times).

DEM 56 analyzes the CRC fields within received data burst 150 to determine whether at least one of the 16 received P3 data packets was received correctly. If at least one P3 data packet was received correctly, DEM 56 transmits an acknowledge message 170 having a status field 176 specifying that packet P3 was received correctly and a new packet field 184 specifying that no new packets are expected—and the message transfer is complete.

As another example, suppose that a message contains a total of 19 different data packets P1–P19. Initially, DOM 52 informs DEM 56 that 19 unique data packets 164 will be transmitted, and then begins transmitting data burst 150. Assuming that each data burst 150 contains 16 data packets 154a, at least two data bursts will be required to transmit the entire message.

DOM 52 transmits first data burst 150 containing data packets P1–P16. Suppose that DEM 56 incorrectly receives packets P1 and P7, but correctly receives the remainder of the first 16 packets. DEM 56 transmits an acknowledge message 170 including a receive status field 176 indicating that packets P1 and P7 were incorrectly received.

As mentioned previously, data terminal 100 expects to receive data packets in sequential order. Since DEM 56 incorrectly received packet P1 and DEM data terminal 100 expects to receive packet P1 first, it is not yet possible for the DEM to communicate any data packets to its data terminal.

Suppose DEM 56 is capable of buffering only 17 data packets at a time. DEM 56 can accept only three data packets in the next data burst 150 (since it needs packets P1 and P7 before it can communicate the contents of its buffer to DEM data terminal 100). Therefore, it is capable of storing only one new data packet (previously untransmitted data packet P17 in addition to the data packets that have already been correctly received and the data packets P1 and P7 it still needs). Accordingly, the NEWPACKET field 184 of acknowledge message 170 notifies DOM 52 that DEM 56 can only receive one new data packet in the next data burst 150.

In response to acknowledge message 170, DOM 52 transmits a data burst 150 containing only three different data packets: P1, P7 and P17. This group of three data packets is repeated as many times as is necessary to completely fill the 16 data packets 154 within data burst 150. As a result, the second data burst transmitted by DOM 52 contains the following data packets:

P1 P7 P17 P1 P7 P17 P1 P7 P17 P1 . . . P1

Suppose now that DEM 56 correctly receives packets P7 and P17, but incorrectly receives all 7 occurrences of packet P1 (this is statistically unlikely, but possible if the communications channel is subject to heavy fading). In the next acknowledge message 170 transmitted by DEM 56 to DOM 52, status field 176 indicates that packet P1 is still needed, and new packet field 184 indicates that the DEM can accept no new packets). Both DOM and DEM therefore know that only 1 data packet will be sent P1 repeated 16 times.

The next data burst 150 transmitted from DOM 52 to DEM 56 includes data packet P1 repeated 16 times.

DEM 56 need only receive one of these 16 occurrences of packet P1 correctly to complete the block of data stored in its data buffer and communicate that data block to DEM data terminal 100—and it is extremely likely that the DEM will correctly receive at least one of these 16 repeats of packet P1. Assuming that at least one occurrence of packet P1 is correctly received, DEM 56 communicates packets P1-P17 to DEM data terminal 100 and transmits an acknowledge message 170 to DOM 52 indicating in status field 176 that packet P1 was correctly received and indicating in new packet field 184 that DEM 56 is ready to receive two additional packets (since there are only two packets P18 and P19 remaining in the 19 packet message).

The next data burst 150 transmitted by DOM 52 to DEM 56 includes the following packets:

P18 P19 P18 P19 ... P18 P19

If DEM 56 correctly receives at least one occurrence of each of these packets, it transmits an acknowledge message 170 to DOM 52 indicating that both packets were correctly received and that no more packets will be accepted (the entire message has now been transmitted and correctly received). DOM 52 also keeps track of the number of packets which have been correctly received, and therefore determines independently that the message exchange is complete.

If DOM 52 must repeat an entire data burst 150 (e.g., because DEM 56 fails to receive any of the 16 data packets correctly or DOM 52 fails to receive acknowledge message 170 after a predetermined timeout period), DOM 52 retransmits the data burst and sets the repeat word R (see FIG. 7) to indicate that the burst is a literal repeat of a previously-transmitted burst.

Sometimes, DOM 52 receives acknowledge message 170, but is unable to successfully perform 5-of-9 voting on the acknowledge field 174 (this field is voted on as well as processed using conventional error checking routines and embedded CRC codes to determine correct reception). In this case, DOM 52 cannot accurately determine which data packets 154a in the last-transmitted data burst 150 were correctly received by DEM 56. Accordingly, DOM 52 simply repeats the entire last-transmitted data burst 150 and indicates that the data burst is a repeat via the repeat fields. If at any time a data burst 150 is repeated and the message is encrypted, the initialization vector (IV) used for the original data burst is also used for the repeated data burst.

If DEM 56 fails to correctly receive control fields within any data burst 150 (e.g., the initial data burst including preamble 158), it can request DOM 52 to repeat the entire data burst. If DEM 56 requires DOM 52 to repeat the initial data burst, DOM 52 retransmits preamble 158 along with all data packets 154 (if any) contained within the first data burst. If DEM 56 fails to receive the first data burst 150 altogether, it will not transmit an acknowledge message 170 and DOM 52 will time-out waiting for a response. Any time DOM 52 times out waiting for a response, it simply retransmits the last-transmitted burst (marking the repeat fields to indicate the burst is a repeat). In the preferred embodiment, DOM 52 "gives up" after it has transmitted a particular data burst 150 three times and fails to receive any acknowledge message 170.

Errors occurring in the preamble 158 or subpreamble 160 of a data burst 150 could prevent correct reception of the data burst (or the acknowledge message 170 if the acknowledge message subpreamble 160 includes errors). If DOM 52 receives an acknowledge message 170 and fails to correctly receive subpreamble 160, it simply times out and retransmits the last-transmitted data packet. If DEM 56 fails to correctly receive a data packet preamble 158 or subpreamble 160, it does not transmit an acknowledge message 170 in response to the data burst, and DOM 52 again times out and retransmits the last-transmitted data burst 150.

Exemplary Data Structures

Figure 9:
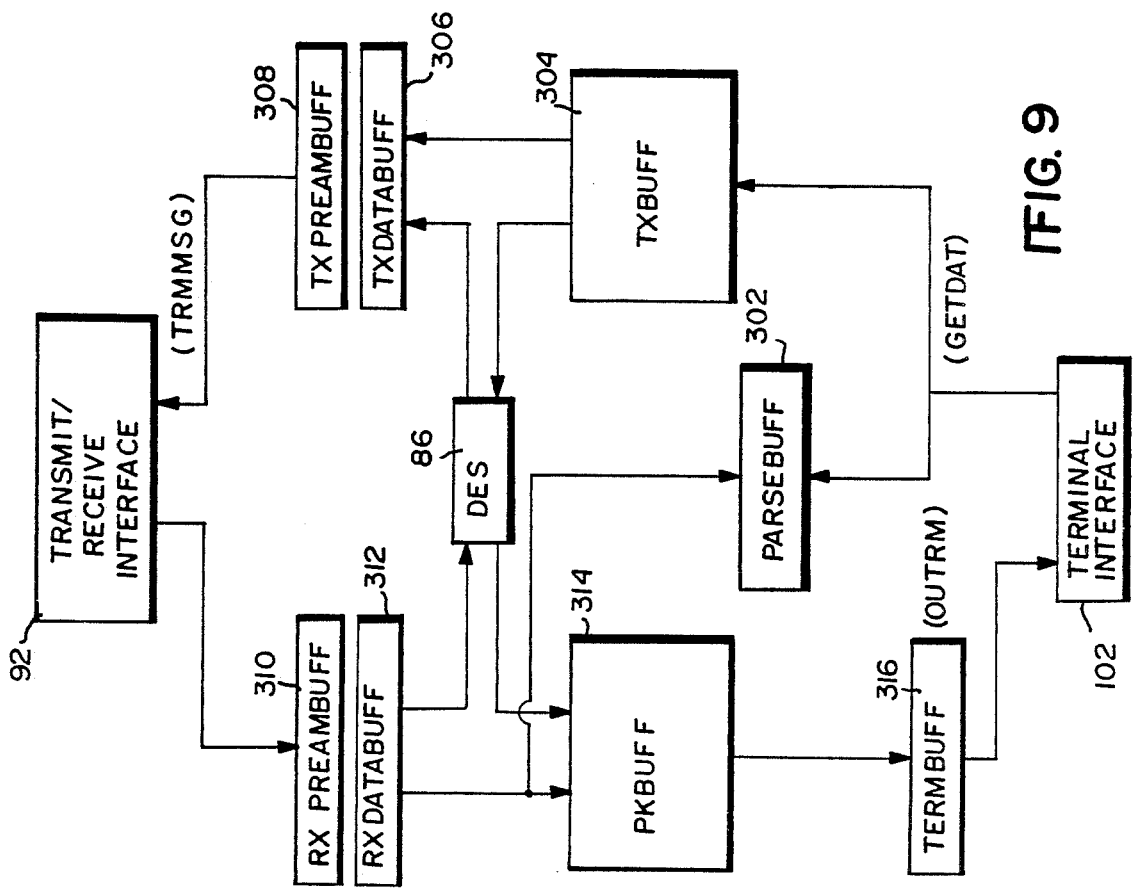
FIG. 9 is a schematic block diagram of exemplary buffers used by the transceiver shown in FIG. 3 to process the signals shown in FIGS. 4–8.

FIG. 9 is a schematic diagram of exemplary data storage (buffering) structures used by the preferred embodiment to transfer digital data between transmit/receive interface 92 and terminal interface 102. In the preferred embodiment, the data structures shown in FIG. 9 are implemented, for the most part, by storing data in an external random access memory. In the preferred embodiment, all but transmit/receive interface 92, DES circuit 86 and terminal interface 102 shown in FIG. 9 schematic block diagram are data structures within a random access memory rather than hard-wired, individual registers and register files (although it will be understood that the FIG. 9 circuit could be implemented using hard-wired registers if desired).

Data to be transmitted is inputted to terminal 100 in the preferred embodiment, and is passed on to terminal interface 102. Commands inputted to terminal interface 102 are loaded into a command buffer called PARSEBUFF 302 for decoding by control microprocessor 74. Digital data, on the other hand, is loaded into a first in and first out (FIFO) register file TXBUFF 304. TXBUFF 304 stores several packets of digital information (and preferably is large enough to store the entire message).

The register TXDATABUFF 306 stores N (16 in the preferred embodiment) data packets 154 to be transmitted. These data packets are either directly loaded into TXDATABUFF 306 from the "top" of TXBUFF 304 (if no encryption is required), or alternatively, are encrypted by DES circuits 86 before being loaded into TXDATABUFF. Another register, TXPREAMBUFF 308, stores a preamble 158 (or subpreamble 160) to be transmitted as the "header" portion of the to-be-transmitted data burst 150. Control microprocessor 74 executes interrupt driven routines to format the contents of TXPREAMBUFF 308 before transmitting each data burst, as will be explained.

The contents of TXPREAMBUFF 308, and then the contents of TXDATABUFF 306, are passed on to transmit/receive interface 92 (e.g., a byte at a time over data bus 76) for further signal processing, filtering, and transmission by transmitter 70.

In the receive mode, transmit/receive interface 92 receives bytes of data and loads the received bytes into either RXPREAMBUFF 310 (for header information) or RXDATABUFF 312 (for digital data). Once header information has been loaded into register 310, microprocessor 74 decodes the header information and analyzes it. Digital data stored in RXDATABUFF 312 is loaded, (a data packet at a time) into a first-in-first-out (FIFO) register file 314 called PKBUFF (which stores 18 data packets in the preferred embodiment). Data in RXDATABUFF is checked for being correctly received, a packet at a time. If a packet is correctly received, it is placed in PKBUFF, consecutively. If a packet is incorrectly received, a space is reserved for it in PKBUFF. Once an entire block of 18 data packets is stored in PKBUFF 314, data packets are transferred via output register in TERMBUFF 316 to terminal interface 102 for display (or other processing) by terminal 100.

The transfer, manipulations, and processing of data by microprocessor 74 and the blocks shown in FIG. 9 will now be discussed in connection with flow charts showing exemplary microprocessor program control steps.

Figure 10:
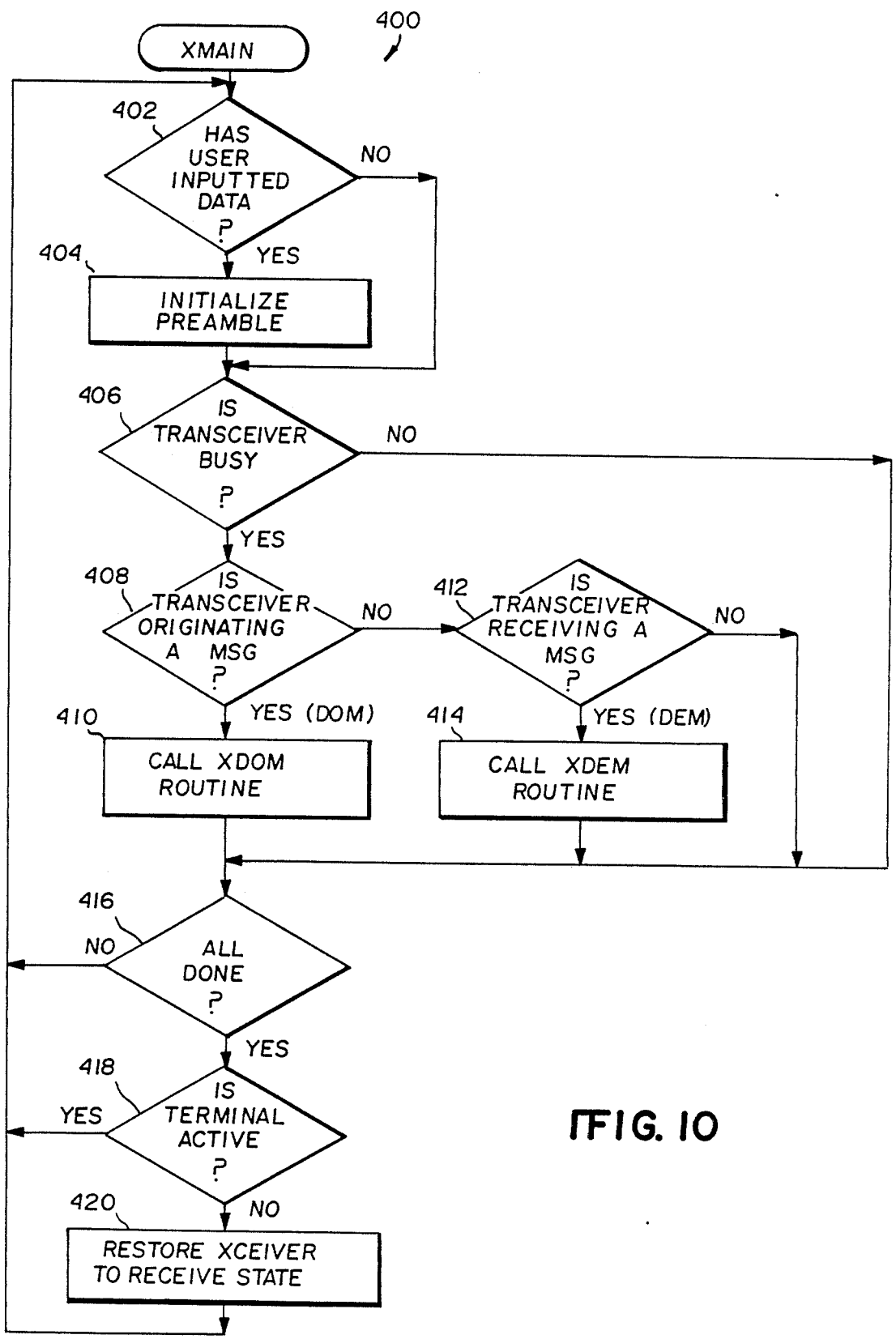
FIG. 10 is a schematic flow chart of an exemplary program control routine XMAIN performed by the transceiver control microprocessor shown in FIG. 3.

The procedure XMAIN shown in FIG. 10 is the main "executive" program which oversees the general operation of transceivers 52, 58 and monitors the status of the transceivers. This routine is executed in a continuous loop, with microprocessor I/0 being serviced by interrupt driven routines (shown in FIGS. 16-28).

Decision block 402 of FIG. 10 determines whether the user has recently inputted data via the display terminal 100. As mentioned previously, a user can input data by striking desired keys of the data terminal keyboard indicating a transfer command and then depressing the transmit (carriage return) key—the depression of the transmit key causing the inputted command data to be transferred to the microprocessor via a serial I/O link (interface 102) and stored in the buffer PARSEBUFF 302, and also causing a flag within the microprocessor to be set.

If the user has recently inputted data to be transmitted, calculations are performed to initialize the message preamble 158 stored in TXPREAMBUFF 308 (block 404). In this step, the number of bytes in the message to be sent is counted, flags are set, etc.—and the various other fields of the preamble are loaded into TXPREAMBUFF 308 (this process is actually performed over time by timer interrupt driven routines, as will be explained). For example, in block 404, a flag indicating radio is a DOM is set. Otherwise, radio default state is a DEM. Because the steps performed by block 404 are required only once for each message to be transmitted, they are bypassed if no new user message has been inputted.

Decision block 406 determines whether the transceiver is busy either receiving or transmitting a data burst 150. In the preferred embodiment, block 406 tests the value of a "busy" flag set by block 404 or other routines. If the flag is set (indicating that a message is to be or is being sent or that a message is being received), blocks 408-414 are executed. The "busy" flag indicates that the radio is in the process of transferring a data message between DOM and DEM. If the flag is not set (indicating that no message is being transmitted or received), program control skips to block 416.

If decision block 406 determines that a message is being transmitted or received, decision block 408 tests another flag to determine whether the transceiver is acing as a data originating mobile, or "DOM" 52. The message could be either a data burst or an acknowledgement as the DOM transmits messages and receives ACK while a DEM receives a data burst and transmits ACK (in an RF sense of transmit and receive). If the transceiver is originating a message, a routine XDOM is called (block 410)—this XDOM routine performs the steps which cause data to be transmitted. Otherwise, a decision block 412 determines if the transceiver is acting as a destination mobile, or "DEM" 56). If the transceiver is receiving a message, a routine XDEM (which performs steps to receive data and process the received data) is called (block 414). If the transceiver is not originating or receiving a message, program control is transferred to block 416.

Block 416 tests whether the flag ALL DONE is set (indicating that the transceiver was but no longer is busy). ALL DONE, when set, indicates if radio is finished with the transmit or receive of entire message, for both DOM or DEM (i.e., all data packets correctly received by DEM). If this flag is not set, program control returns to block 402. If the ALL DONE flag is set, block 418 determines whether data terminal 100 is active. If the terminal is active, program control returns to block 402. On the other hand, block 420 returns the transceiver to the receive state if the ALL DONE flag is set and the terminal 100 is found to be inactive by block 418. Block 420 also sets up transceiver to once again allow a message from the terminal and clears DOM flag.

Routine XDOM (block 410) (shown in detail in FIGS. 11A-11B) controls the transceiver to transmit a message. This XDOM routine causes the transceiver to transmit a data burst 150 containing some or all of the digital data inputted by the user via data terminal 100. This data burst may contain all "new" (i.e., not previously transmitted) packets of data, all "old" packets (which must be retransmitted because they were incorrectly received by the DEM), or a combination of new and old packets.

Figure 11A:
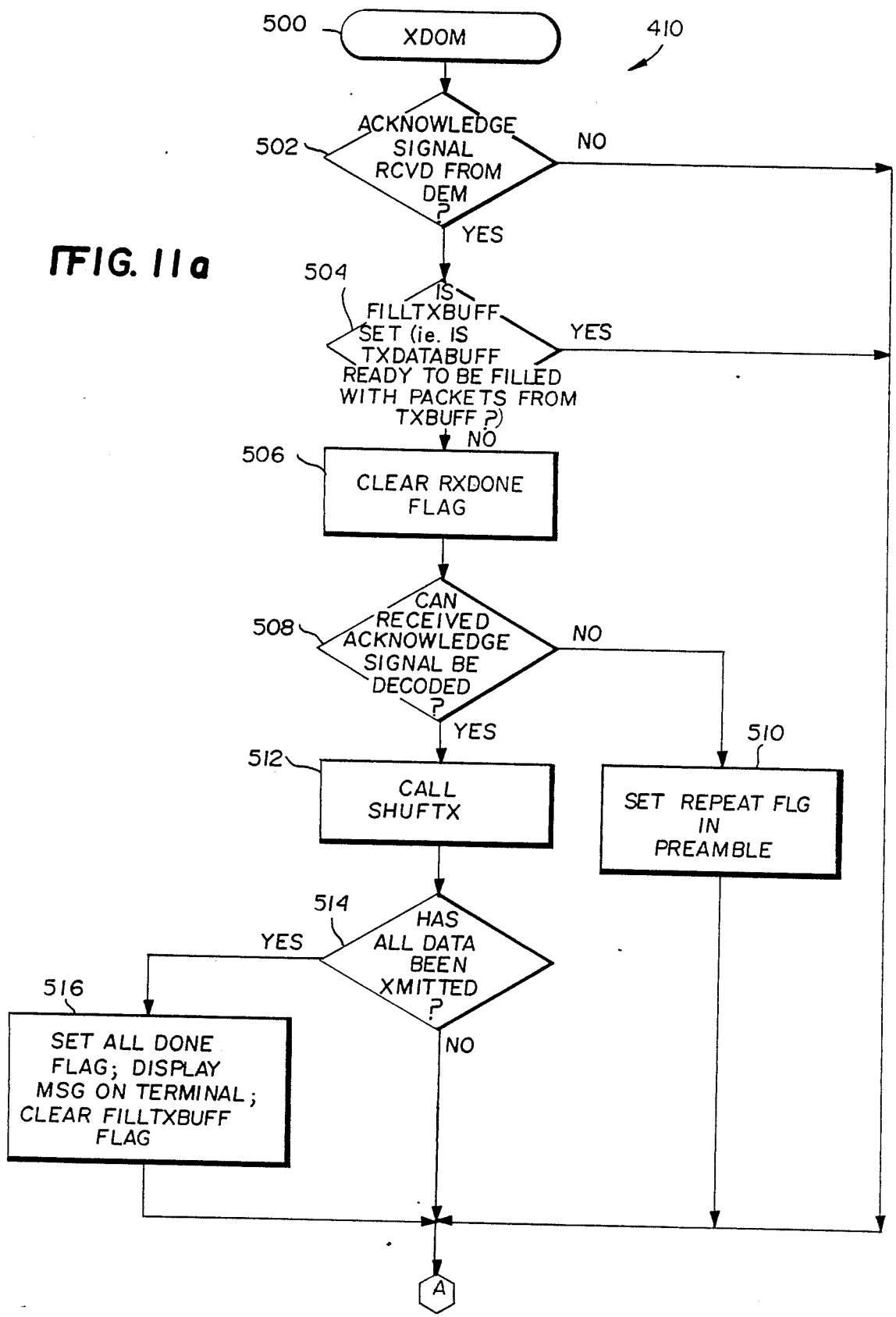
FIGS. 11A–11B together are a schematic flow chart of an exemplary program control routine XDOM performed by the transceiver control microprocessor shown in FIG. 3 when the transceiver is originating a digital data message.
Figure 11B:
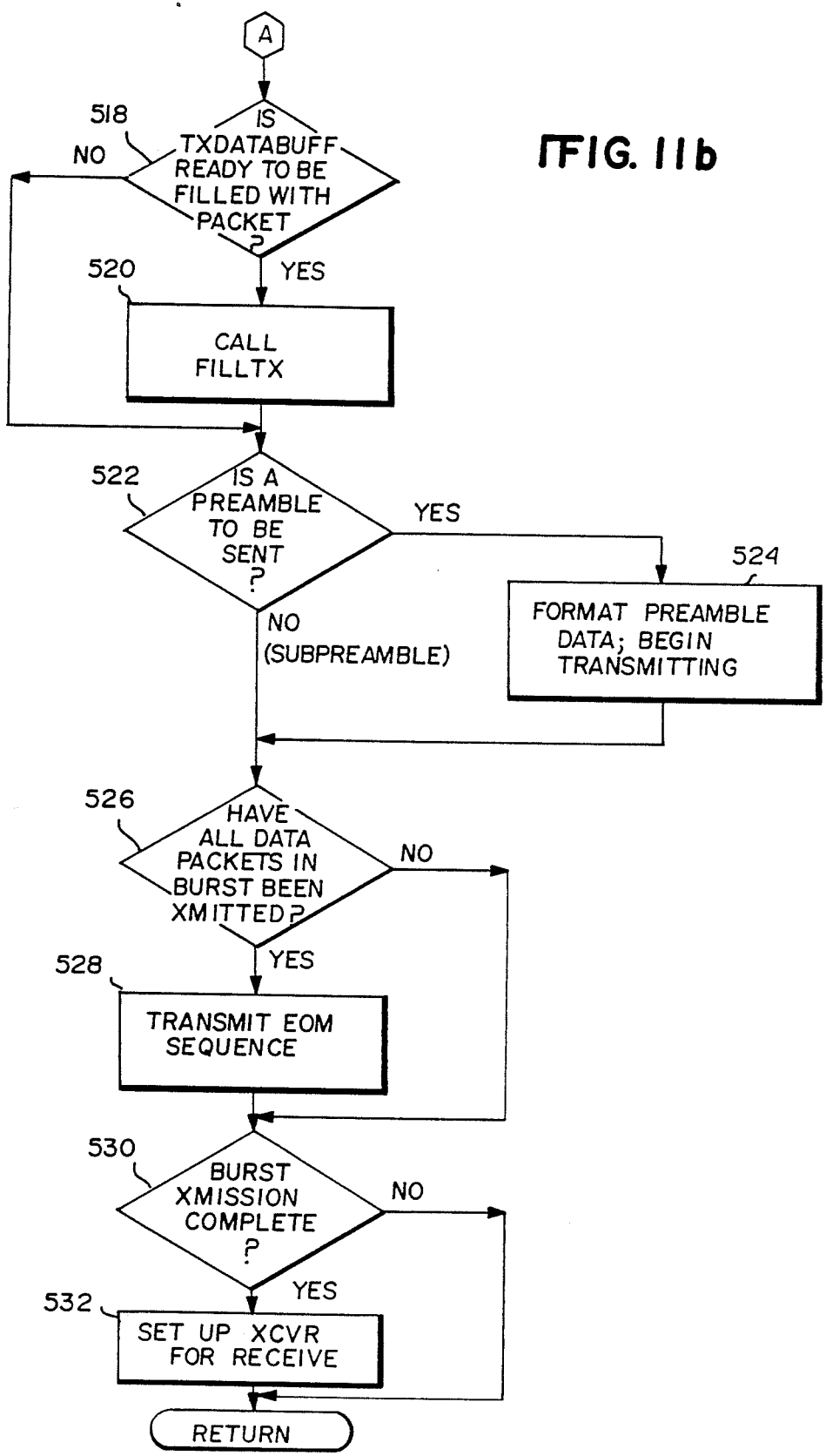

The XDOM routine determines if there are any new data packets (stored in TXBUFF 304) which are part of the message being transmitted and have not yet been transmitted. The XDOM routine also determines (in response to receipt of an acknowledge message 170) whether XDEM 56 (i.e., the destination mobile transceiver) has successfully received the data packets of the data burst last transmitted, and controls DOM 52 to retransmit any packets which have not been successfully received (thus providing a function which adapts to degraded transmission channel performance). A detailed flowchart of this routine is shown in FIGS. 11A-11B.

Decision block 502 checks to see whether an acknowledge message 170 has yet been received from DEM 56. As discussed previously, the DEM 56 transmits an acknowledge message 170 in response to each data burst 150 transmitted by the DOM—this acknowledge message 170 indicating which data packets within the burst were successfully received and which packets were not successfully received. A flag called RXDONE is set by the microprocessor within the DOM when this acknowledge message 170 has been received. Decision block 502 simply tests the value of this flag. If no acknowledge message 170 has been received, control steps jumps to block 518 (FIG. 11B) where DOM 52 processes data packets to be transmitted.

As the acknowledge message 170 is received, the DOM uses conventional error checking techniques (e.g., cyclical redundancy checks on the CRC fields contained in acknowledge message 170) to determine if the received acknowledge message is "valid"—meaning that its content can be understood by DOM. As each acknowledge sequence 174 is received, its validity is checked. Large amounts of noise on the RF channel might, for example, so corrupt the acknowledge message 170 received by the DOM that the DOM cannot decode the received message to determine which data packets have to be resent. Another flag, called VALID ACK, is set by DOM 52 if the error checking function performed on a received acknowledge sequence 174 indicates that the signal can successfully be decoded to yield useful information (flag VALID ACK is not set otherwise). Any one of the nine acknowledgement sequences can be received correctly.

If decision block 502 determines that an acknowledge sequence 174 has been received, decision block 504 determines whether the transmit buffer TXDATABUFF must be filled with data from TXBUFF. In block 502, the flag FILLTXBUFF, if set, indicates TXDATABUFF needs to be filled with new packets from TXBUFF. If not set, an acknowledge must be analyzed and possibly shuffle the packets in TXDATABUFF. When set, a call to SHUFTX is not needed. When not set, a call to SHUFTX must be done. FILLTXBUFF flag is set mainly for first pass through XDOM to initially fill TXDATABUFF for the first data burst.

If TXDATABUFF must be loaded, block 506 clears the RXDONE flag (which was determined by block 502 to be set). Decision block 508 then determines whether the received acknowledge message 170 can be used to provide useful information by testing the value of the VALID ACK flag.

If the acknowledge message 170 cannot be decoded to produce useful information regarding receive status, there is no way to tell whether DEM received the data packets in the last-transmitted data burst 150 correctly and therefore, the entire data burst contained in TXDATABUFF must be repeated. Block 510 simply sets the REPEAT fields in the data burst preamble to indicate that the burst is an exact repeat of the last-transmitted burst.

Figure 12B:
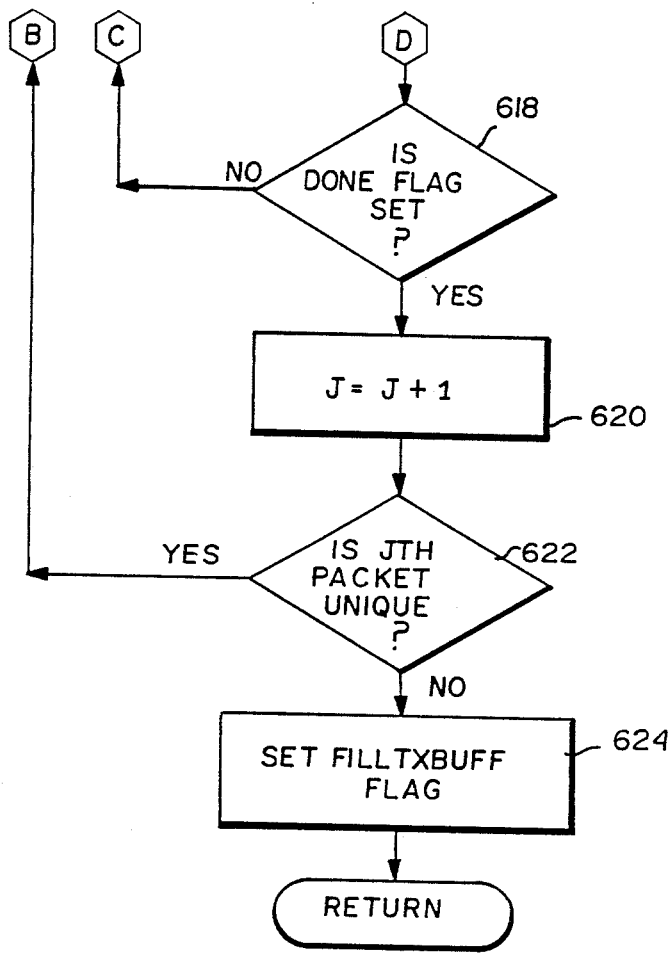

If block 508 determines that the acknowledge signal can be decoded, a routine SHUFTX is called (block 512). The SHUFTX routine analyzes the acknowledge signal to determine which data packets in the last burst were incorrectly received by DEM, and "shuffles" these incorrectly received packets to the "top" of the TXDATABUFF so that they will be retransmitted as part of the next data burst. A flowchart of this routine is shown in FIGS. 12A-12B.

Briefly, the routine SHUFTX must determine whether each unique packet transmitted in the last burst was correctly received at least once. As mentioned above, a given packet may be repeated several times in the same burst—and DEM need only receive one occurrence of the packet correctly to correctly receive the packet (since it discards all incorrectly received packets).

The routine SHUFTX includes outer and inner nested loops. The outer loop is controlled by a loop counter J, which is used to keep track of whether all unique packets in the last transmission have been tested for correct reception. The inner, nested loop is controlled by another loop counter I—which is used to keep track of whether all occurrences of a packet transmitted several times in the last transmission have been tested for correct reception.

The first step in the routine SHUFTX is performed by block 602, which initializes a pointer called NEXT FREE and sets outer loop counter J to the value 1. Block 604 then clears a "DONE" flag and sets the value of inner loop counter I equal to the value of J.

Block 606 then determines from the received PACKET RX STATUS field 176 (stored in RXDATABUFF 312) whether the Ith packet in the last-transmitted burst was correctly received. In the preferred embodiment, the acknowledge signal (which is PACKET RX STATUS field 176) is analyzed all at one time, and its contents are stored in a table called CRCMAP (which in the preferred embodiment includes a bit for each of the 16 packets in a burst, this bit being set if the corresponding packet was correctly received and is otherwise unset).

Block 606 in the preferred embodiment retrieves the information about reception status for the Ith packet in the last-transmitted burst from the table CRCMAP. If this retrieved bit is set, the corresponding packet does not need to be retransmitted and the done flag is set (block 610). Otherwise, the SHUFTX routine determines whether the incorrectly received packet might have been transmitted more than once in the last transmission and correctly received at least once by DEM 56 (blocks 612-616).

Block 612 increments the value of loop counter I by the number of unique packets in the last transmission in order to locate the next occurrence (if there is one) of the packet determined by decision block 608 to have been incorrectly received. Decision block 614 then determines whether the new value of I is greater than N, the total number of packets in each data burst. If I>N (where N is the number of packets in each burst—16 in the preferred embodiment), then there are no remaining occurrences of the packet to check, and the packet must be retransmitted. In this case, block 616 sets the DONE flag, transfers the Jth packet to the "top" of TXDATABUFF, and then increments NEXTFREE (the pointer into TXDATABUFF) by 1 so that this pointer now points to the next free location in TXDATABUFF.

If decision block 614 determines that the incorrectly received packet was transmitted more than once and that an additional occurrence of the incorrectly received packet may not yet have been checked to determine whether it was correctly received, program control returns to block 606 to analyze the acknowledge signal with respect to another occurrence of the incorrectly received packet (since the done flag has not yet been set, the result of the test of decision block 618 is false). Otherwise, program control proceeds to block 620, which increments the value of J by one (in preparation for examining the receive status of another unique packet transmitted in the last data burst).

Decision block 622 determines whether the receive status of all unique packets in the last data burst have been checked (preferably by comparing the value of J with the number of unique packets in the last data burst). If all unique packets have now been checked, the flag FILLTXBUFF is set (block 624) to indicate that the TXDATABUFF buffer 306 is ready to be filled with new packets from TXBUFF—and program control returns to block 514 shown in FIGS. 11A-11B.

Program control returns to block 604 to check the receive status of the next (Jth) packet if decision block 622 determines there still are unique packets which have not yet been checked.

Referring now once again to FIGS. 11A-11B, after program control returns from routine SHUFTX a decision block 514 determines whether there is any additional data in the present message which has not yet been transmitted (e.g., by testing the value of a pointer which points into TXBUFF 304 and which is incremented as packets are transferred from that buffer to TXDATABUFF 306. If all data has been transmitted, a flag called ALL DONE is set, the terminal is controlled to display a message to the user that his message has been successfully transmitted, and the flag FILLTX-BUFF is cleared (block 516).

Figure 13:
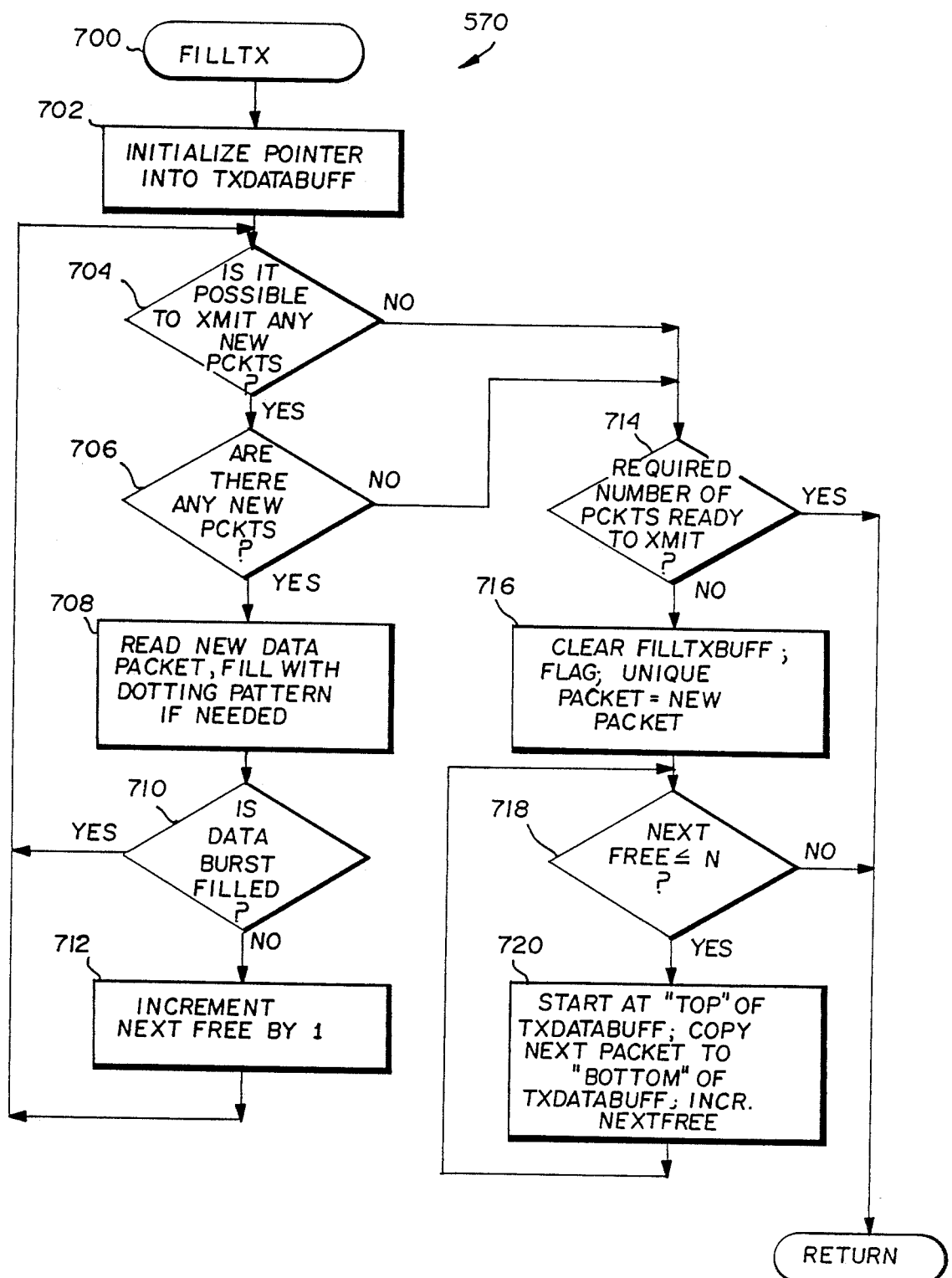
FIG. 13 is a schematic flow chart of exemplary program control steps of a routine FILLTX called by the XDOM routine shown in FIGS. 11A-11B.

Decision block 518 then determines whether TXDATABUFF is full (e.g., by testing FILLTXBUFF flag). If TXDATABUFF is not full, a routine called FILLTX is called to load packets of data from the TXBUFF register file 304 in to TXDATABUFF 306 for transmission (block 520). A flowchart of the FILLTX routine is shown in FIG. 13.

Routine FILLTX first sets up its own pointer which points into the TXDATABUFF 306 (block 702). Decision block 704 then determines whether it is possible to transmit any as-yet-untransmitted (i.e., "new") data packets in the next data burst. In the preferred embodiment, block 702 compares the value of pointer NEXTFREE, which points to the next free location in the TXDATABUFF register file (and was set by the SHUFTX routine, block 616 of FIGS. 12A-12B). NEXTFREE is compared to NEWPACKET. NEW-PACKET was sent by DEM in the acknowledge message in the NEWPACKET field 184. Whenever NEXTFREE is less than or equal to NEWPACKET there remains at least one additional unique packet which must be loaded into TXDATABUFF 306 before the next data burst 150 can be transmitted.

If at least one new packet must be provided, the routine FILLTX attempts to fill the empty packet(s) with not-yet-transmitted data (e.g., with "new" data).

If decision block 704 determines that previously untransmitted packets can be transmitted in the next data burst, decision block 706 determines whether any new packets exist. If at least one new packet exists, one packet of new information is loaded from TXBUFF 304 into TXDATABUFF 306 (dotting pattern is used to fill up this packet in TXDATABUFF if there is insufficient new data to do so—since a user message can be of any arbitrary length and thus need not be on a 16 byte boundary).

Decision block 710 then determines whether the data burst stored in TXDATABUFF 306 is filled. If the burst is filled, program control is transferred back to block 704, which determines whether it is possible to transmit any additional as-yet-untransmitted (i.e., "new") data packets in the next databurst.

On the other hand, if TXDATABUFF 306 is not filled, the variable NEXTFREE is incremented by 1 (block 712), and program control returns to decision block 704.

If decision block 706 determines there are no new packets to transmit or block 704 determines that it is not possible to transmit any (or any additional) as-yet-untransmitted data packets in the next burst, decision block 714 determines whether the required number of packets (e.g., 16 in the preferred embodiment) are ready to transmit.

If at least 16 different packets are stored in TXDATABUFF 306 ready to transmit, no packets need to be repeated and control returns from the FILLTX routine to block 522 of FIGS. 11A-11B. If decision block 714, on the other hand, determines that an insufficient number of unique packets exist to form a full data burst, blocks 716-720 copy the different packets as many times as necessary to result in a number of packets equal to N (e.g., 16 in the preferred embodiment).

Block 716 first clears the FILLTXBUFF flag, and then sets a pointer UNIQUE PACKET to point to the last location in TXDATABUFF 306 filled with a data packet. (UNIQUE PACKET holds number of NEW-PACKETS DEM will accept.) Decision block 718 then compares the value of pointer NEXTFREE with the value N (the required number of packets). If NEXTFREE is less than or equal to N, block 720 copies the "top" packet stored in TXDATABUFF to the first empty location at the "bottom" of TXDATABUFF, and increments NEXTFREE by 1. Decision block 718 then checks whether any additional packets are needed. If still additional packets are needed, block 720 copies the next unique packet from the top of TXDATABUFF (if such a unique packet exists). This process continues until the number of packets stored in TXDATABUFF 306 is equal to N—each unique packet being copied x times before any packet is copied x+1 times.

When decision block 718 determines that no additional packets are needed to fill TXDATABUFF 306, program control returns to the routine XDOM beginning at block 522 of FIGS. 11A-11B.

Decision block 522 determines whether a preamble 158 or a subpreamble 160 is to be transmitted. A long preamble, it will be recalled, is transmitted at the beginning of each new message and also transmitted whenever the data format is to be changed. If a preamble 158 is to be sent, block 524 formats the data in register TXPREAMBUFF 308 appropriately to contain the preamble, and controls the transceiver to begin transmitting the data burst (which is now contained in TXPREAMBUFF 308 and TXDATABUFF 306).

Decision block 526 then determines whether the data in the data burst being transmitted has yet been sent. If the data transmission is not yet completed, program control returns to the execute routine XMAIN shown in FIG. 10. If all of the data packets have already been transmitted, block 528 controls the transceiver to begin transmitting the end of message (EOM) field 156.

Block 530 then tests whether the entire data burst has been transmitted. If burst transmission is complete, block 532 sets up the transceiver for the receive state. Otherwise, program control returns to XMAIN.

As mentioned previously, the FIG. 10 routine XMAIN calls routine XDEM when the transceiver acts as DEM 56 (i.e., to handle received data bursts). This XDEM routine is executed by DEM 56 (i.e., a transceiver acting as a destination mobile). The XDEM routine will now be described in connection with the flow charts set forth in FIGS. 14A-14B.

Decision block 802 first tests whether a header (preamble or subpreamble) has been received by DEM 58, stored in RXPREAMBUFF 310, but not yet analyzed. If a header has been received but not yet analyzed, decision block 804 determines whether the header is "valid" (e.g., by analyzing the CRC bytes and performing error checking). If the received header data is valid, decision block 806 tests whether the header is a preamble 158, and if it is, it extracts and analyzes the data from the preamble (block 808).

If a received valid header is a subpreamble 160, microprocessor 74 typically does not need the header contents (although interface 92 makes use of the subpreamble to reacquire lost synchronization, for example). Control is thus transferred to decision block 810.

Decision block 810 determines whether a data burst 150 has been received and is in RXDATABUFF (e.g., by determining if a complete data burst is in RXDATABUFF and must now be analyzed). If a burst is currently being received, no data can yet be loaded into register file PKBUFF 314 (since in the preferred embodiment, data is transferred into this register file only when a complete data burst is stored in RX DATABUFF 312). On the other hand, if a data burst is not currently being received i.e., RXDATABUFF has a data burst in it, it is necessary to analyze the contents of RX DATABUFF 312 for validity, and transfer valid data packets into register file PKBUFF 314. These tasks are performed by routine INPBFF, which is called by block 812 of FIG. 14A.

Figure 15A:
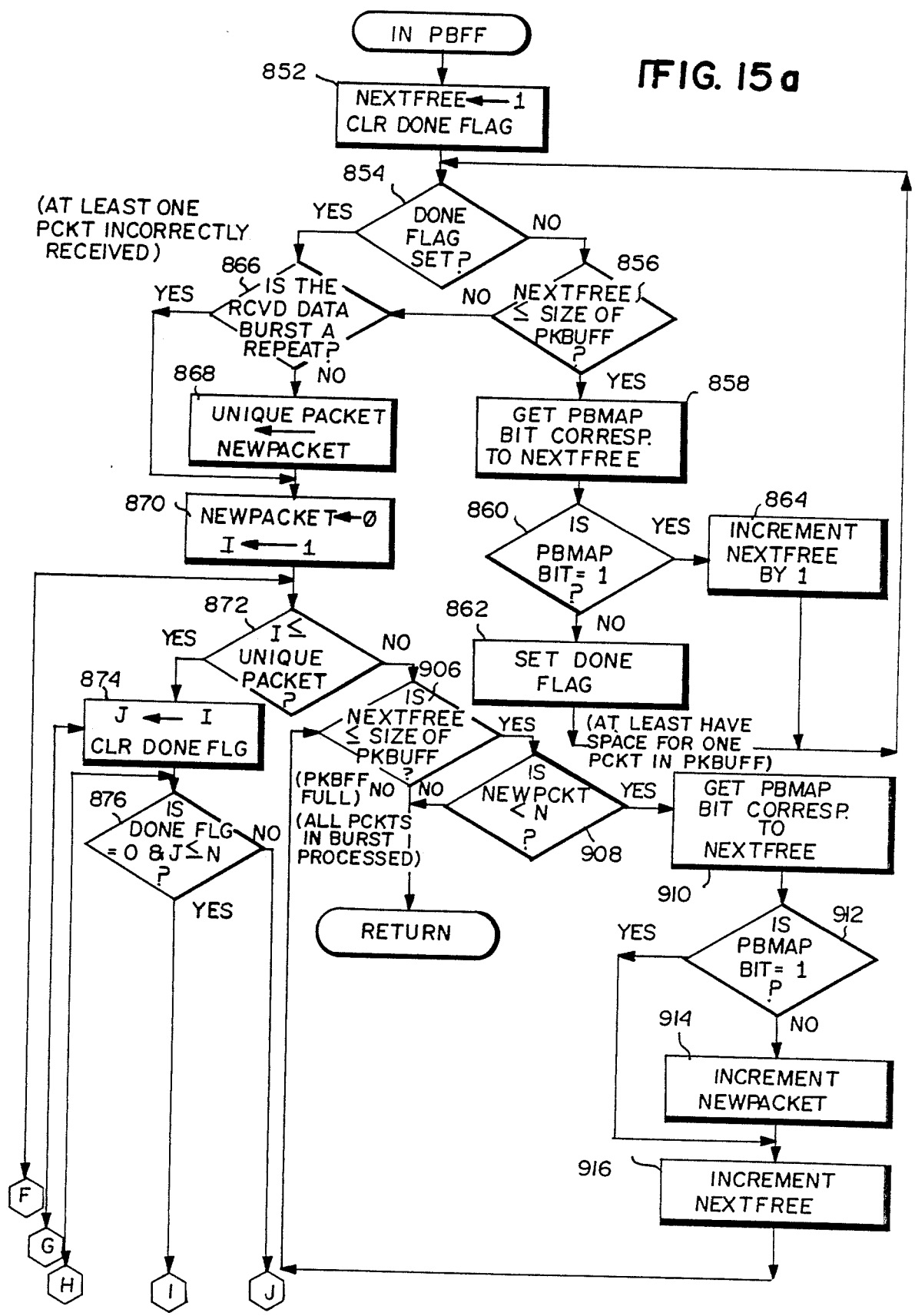
FIGS. 15A-15B together are a schematic flow chart of exemplary program control steps of a routine INPBFF called by the XDEM routine shown in FIGS. 14A-14B.
Figure 15B:
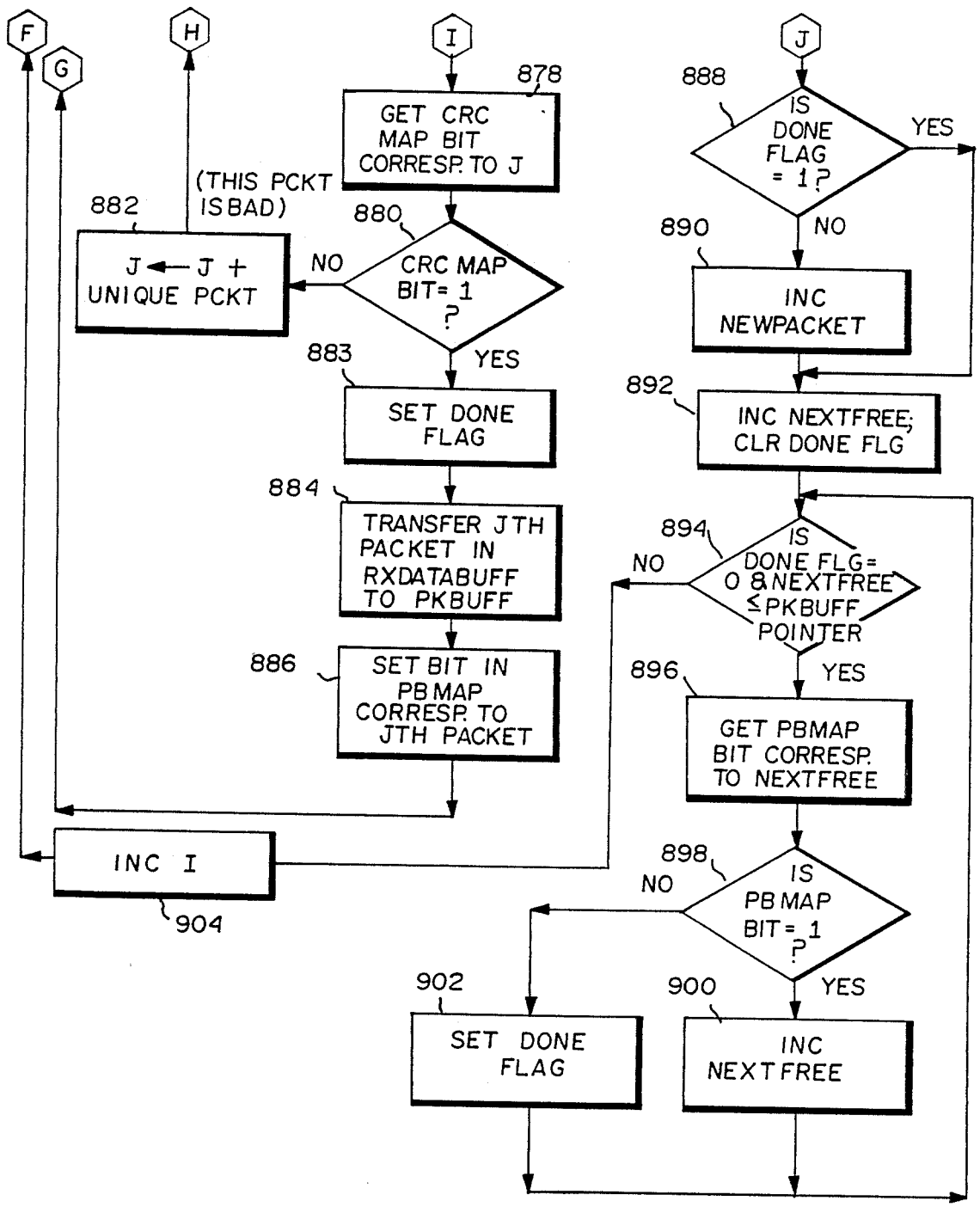

A flow chart INPBFF is set forth in FIGS. 15A–15B. A pointer NEXTFREE is initialized to the value of 1, and a flag called DONE is cleared (block 852). Decision block 854 then determines whether the DONE flag is set. If the DONE flag is not set, a data packet within RX DATABUFF 312 is analyzed by execution of blocks 856–864.

Pointer NEXTFREE is used to point into PKBUFF 314, NEXTFREE points to PKBUFF, and indicates the bit in PBMAP corresponding t the packet in PKBUFF. Decision block 856 compares the value of NEXTFREE to the size PKBUFF register file 314, size of PKBUFF is the number of data packets PKBUFF can hold to determine whether there is enough storage space within the register file to load into it a data packet contained within RX DATABUFF 312. If insufficient space exists within register file 314, program control is transferred to decision bloc 866. Block 858 gets the bit pointed to by NEXTFREE from the PBMAP. PBMAP is a bit map with 1 bit for every packet PKBUFF can hold. PBMAP keeps track of the correctly received packets which have been transferred from RXDATABUFF to PKBUFF.

When routine INPBFF is first called, it checks PBMAP to find the first location of an unreceived packet. DEM "knows" that the first packet in the current data burst from the DOM (if the packet was received correctly) should be placed in the first "empry" location in PKBUFF, which NEXTFREE is pointing to.

For block 860, if the PBMAP bit which corresponds to NEXTFREE=1, then that location in PKBUFF is already filled with a data packet, so NEXTFREE is incremented and the bit corresponding to NEXTFREE is retrieved from PBMAP. This process continues until NEXTFREE=the size of PKBUFF (i.e., the number of data packets PKBUFF can hold) or until a bit in PBMAP=0.

The DEM uses PBMAP to keep track of the valid packets that are placed in PKBUFF, and where in PKBUFF the packets are located, without using any packet numbers for the packets.

If the bit in PBMAP pointed to by NEXTFREE is zero, the DONE flag 862 is set to indicate that PKBUFF has space for at least 1 data packet, and the packet will go into the location pointed to by NEXTFREE. Otherwise, pointer NEXTFREE is incremented by 1 (block 864) and blocks 854–864 are executed again.

After blocks 856–864 are executed repeatedly until EITHER AN EMPTY LOCATION IN PKBUFF is found for a packet or NEXTFREE>PKBUFF size (i.e, all locations in PKBUFF have valid data packets), decision block 866 then tests whether the received data contained within RX DATABUFF 312 is a repeat (this test performed by simply testing the value of the REPEAT bytes within the received data burst). If the received data burst is not a repeat, the variable UNIQUE PACKET is set to the value of NEWPACKET. NEWPACKET is a pointer used to indicate the number of new previously untransmitted DATA PACKETS DEM can accept in the next data burst, unreceived data packets stored in RX DATABUFF Block 870 then clears NEWPACKET, and initializes the value of a loop counter I to 1. Loop counter I controls routine INPBFF to execute the sequence of steps contained within an outer loop of the routine once for each different (i.e., non-repeated) data packet contained within RX DATABUFF 312.

Decision block 872 then compares the value of loop counter I with UNIQUE PACKET. If I is less than or equal to UNIQUE PACKET, packets remain to be loaded from RX DATABUFF 312 into register file PKBUFF 314—and an inner loop counter J is initialized to the value of loop counter I and a flag called DONE is cleared (block 874). Loop counter J is used as a pointer into RX DATABUFF 312, and in particular points to repeats of an incorrectly-received data packet.

If the DONE flag was not set in 862, then PKBUFF has no room for any data packets. However, DONE flag set in 862 is checked in 854 and signals first check of PBMAP is finished. DONE flag checked in 876 checks another search instead—that a correctly received data packet was found. Otherwise, so long as J is less than or equal to N (the number of data packets stored in RX DATABUFF 312) (also tested for by decision block 876), the map bit result of the CRC test previously performed with respect to the Jth data packet is retrieved (block 878) and tested to see if it is set (block 880) in order to determine whether the Jth data packet was correctly received.

If the Jth CRC map bit is not set, the Jth data packet was incorrectly received, and in the preferred embodiment, it is next determined if this packet was repeated in the received transmission (since a later repetition of the same data packet might have been correctly received). Loop counter J is incremented by the value of the variable UNIQUE PACKET (block 882), so that it points to the next occurrence within RX DATABUFF 312 of the same data packet (if another occurrence exists). Decision block 876 then determines whether the new value of J is less than or equal to N (since if J is greater than N, there are no more occurrences of the same data packet to be tested, and an acknowledge message 170 must be sent by DEM 58 to DOM 52 requesting that this data packet be retransmitted).

If, on the other hand, decision block 880 determines that the Jth data packet was correctly received, the DONE flag is set (block 883), the Jth data packet is transferred from RX DATABUFF 312 to PKBUFF 314 (block 884) at the location in PKBUFF pointed to by NEXTFREE, and a bit corresponding to the Jth packet in a data structure called PBMAP is set (block 886) (this PBMAP data structure is used to indicate which valid data packets have been stored into register file PKBUFF 314).

If the DONE flag is set or J is greater than N, decision block 876 transfers program control to decision block 888. Decision block 888 tests the value of the DONE flag to determine whether it was set by block 883 (the DONE flag was cleared by block 874). If the DONE flag was set at decision block 883, the Jth data packet is valid (i.e., correctly received). If decision block 888 determines that the DONE flag is not set, then block 890 increments the variable NEW PACKET (used to indicate the number of previously-untransmitted data packets which can be accepted in the next data burst transmission).

Next, the pointer NEXTFREE is incremented, and the DONE flag is cleared once again (block 892). If NEXTFREE is less than or equal to PKBUFF size, then PBMAP can still be checked to determine if PKBUFF can accept any more data packets.

If all bits in PBMAP have not been checked, the PBMAP>bit corresponding to the pointer NEXTFREE is tested to determine whether it was set, indicating that the corresponding location in PKBUFF already is filled by a valid, previously received data packet. NEXTFREE is incremented if the PBMAP bit corresponding to NEXTFREE is set (block 900), so that blocks 894-898 can search for the next empty storage location in register file 314.

Once decision block 898 locates the next empty storage location in PKBUFF (as tested for by decision block 898), the DONE flag is set (block 902), and decision block 894 transfers program control to block 904—which increments loop counter I and returns program control back to decision block 872.

At some point, loop counter I incremented by block 904 so that it exceeds the number of unique packets transmitted in the last data burst (i.e., the variable I will either point beyond the last data packet storage location within RX DATABUFF 312, or it will point to a repeat of a data packet transmitted more than once). When decision block 872 determines that I exceeds UNIQUE PACKET, decision block 906 determines whether there are any more storage locations within register file PKBUFF 314 which must be checked to see if these locations are empty or contain previously received data packets.

Figure 14A:
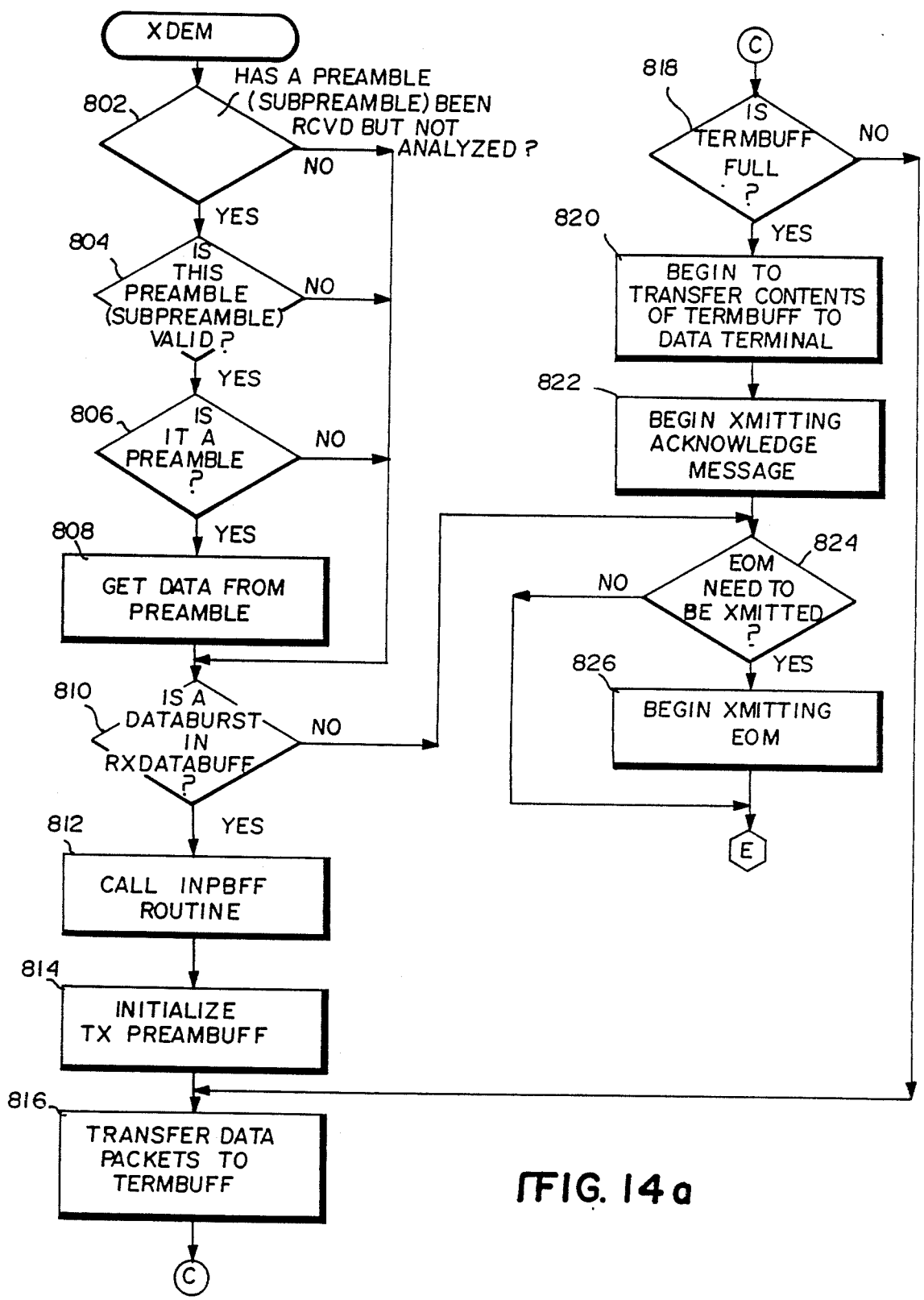
FIGS. 14A-14B together are a schematic flow chart of exemplary program control steps of a routine XDEM performed by the transceiver control microprocessor shown in FIG. 3 when the transceiver is the destination of a digital data message.
Figure 14B:
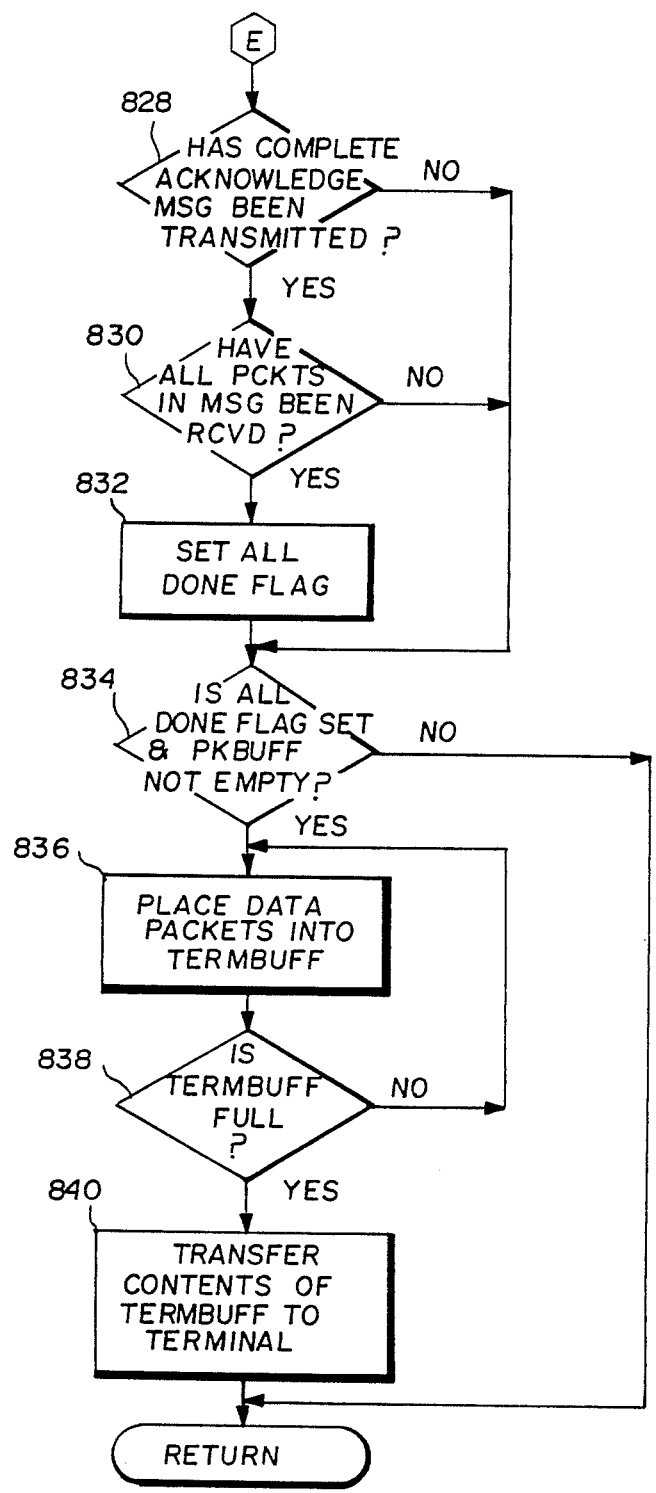

If all locations in PKBUFF have been checked by using PBMAP (i.e., NEXTFREE>PACKET BUFF SIZE), then routine INPBFF returns to block 814 of the XDEM routine shown in FIG. 14A. If all locations of PKBUFF have not been checked as to whether or not they contain data packets, then decision block 908 determines whether the value stored in NEWPACKET is less than the number N of packets within a data burst. If NEWPACKET is less than N, then blocks 910, 912 determine whether the data packet corresponding to pointer NEXTFREE is already stored in register file 314 (and if it is, NOT NEWPACKET is incremented at block 914). If the location is empty, then PKBUFF can accept a packet there—hence NEW PACKET is incremented. Pointer NEXTFREE is then incremented (block 916), and the test performed by decision blocks 906, 908 occurs again until all locations of PKBUFF have been checked. By this process, the number of new packets which can be accepted in the next data burst transmission is counted based on the number of packets already stored in PKBUFF register file 314. This number of new packets which can be accepted is returned to routine XDEM in variable NEWPACKET.

Referring once again to FIG. 14A, the contents of register TX PREAMBUFF 308 is initialized using the acknowledge message format shown in FIG. 8—with the contents of status field 176 being specified according to CRCMAP bits, and the contents of NEWPACKET field 184 being specified by the value stored in variable NEWPACKET (block 814). Then, it is determined whether any data packets stored in register file 314 can be transferred to output register TERMBUFF 316 while preserving the order of the received data packets, and if it is possible to do so, a data packet is loaded into the output register 316 for communication over data bus 76 to terminal interface 102 (blocks 816, 818, 820). Next, the acknowledge message 170 now stored in registers 306, 308 is transmitted via transmit/receive interface 92 (block 822).

If a data burst is not in RXDATABUFF(as tested for by decision block 810) or if an acknowledge message has been or is being transmitted (by block 822), then decision block 824 determines whether an end of message field needs to be transmitted at the end of an acknowledge message—and block 826 begins transmitting an end of message string if necessary.

Next, decision block 828 determines whether a complete acknowledge message 170 has been transmitted and if it has, decision block 830 determines whether all data packets for the entire message were correctly received. If a complete, valid data burst has been received, the ALL DONE flag is set (block 832). ALL DONE flag indicates that no more data packets should be sent by DOM. If the ALL DONE flag is set and the PKBUFF register file 314 is not empty (as tested for by decision block 834), data packets are transferred from the register PKBUFF file into output buffer TERMBUFF 316 until the output register is full (block 836, decision block 838), and the contents of the output register are transferred to TERMINAL INTERFACE 102. Routine XDEM then returns program control to routine XMAIN.

FIGS. 16-19 are schematic flow charts of serial interrupt-driven I/O routines used in the preferred embodiment to control the operation of the TERMINAL INTERFACE 102. These routines effect the transfer of data between data terminal 100 and the rest of the transceiver. FIG. 16 is a schematic diagram of the main serial interrupt handler routine.

It is necessary to transfer data from terminal interface 102 to PARSEBUFF 302 and TXBUFF register file 304—and to transfer data from the output buffer TERMBUFF 316 to the data terminal. The routine GETDAT called by the FIG. 16 interrupt routine block 925 (and shown in detail in FIG. 17) takes care of the transfer from data terminal interface 102 to register 302 and register file 304 upon receipt of a data byte (decision block 927). The serial interrupt occurs everytime the microprocessor 74 receives a byte over its serial port.

If the transceiver acts as DEM 58 (as tested for by block 929) it may be required to transfer data from output register TERMBUFF 306 to terminal 100 for display, storage or other purposes. The routine OUTDAT (block 931—shown in detail in FIG. 19) transfers bytes of information from TERMBUFF 316 over data bus 76 to data terminal interface 102.

The TRMMSG routine (block 933; see FIG. 18) is called by the FIG. 16 interrupt routine when transceiver is a DOM. It transfers 1 of 2 "canned" messages to data terminal interface 102 for display on terminal 100.

Figure 17:
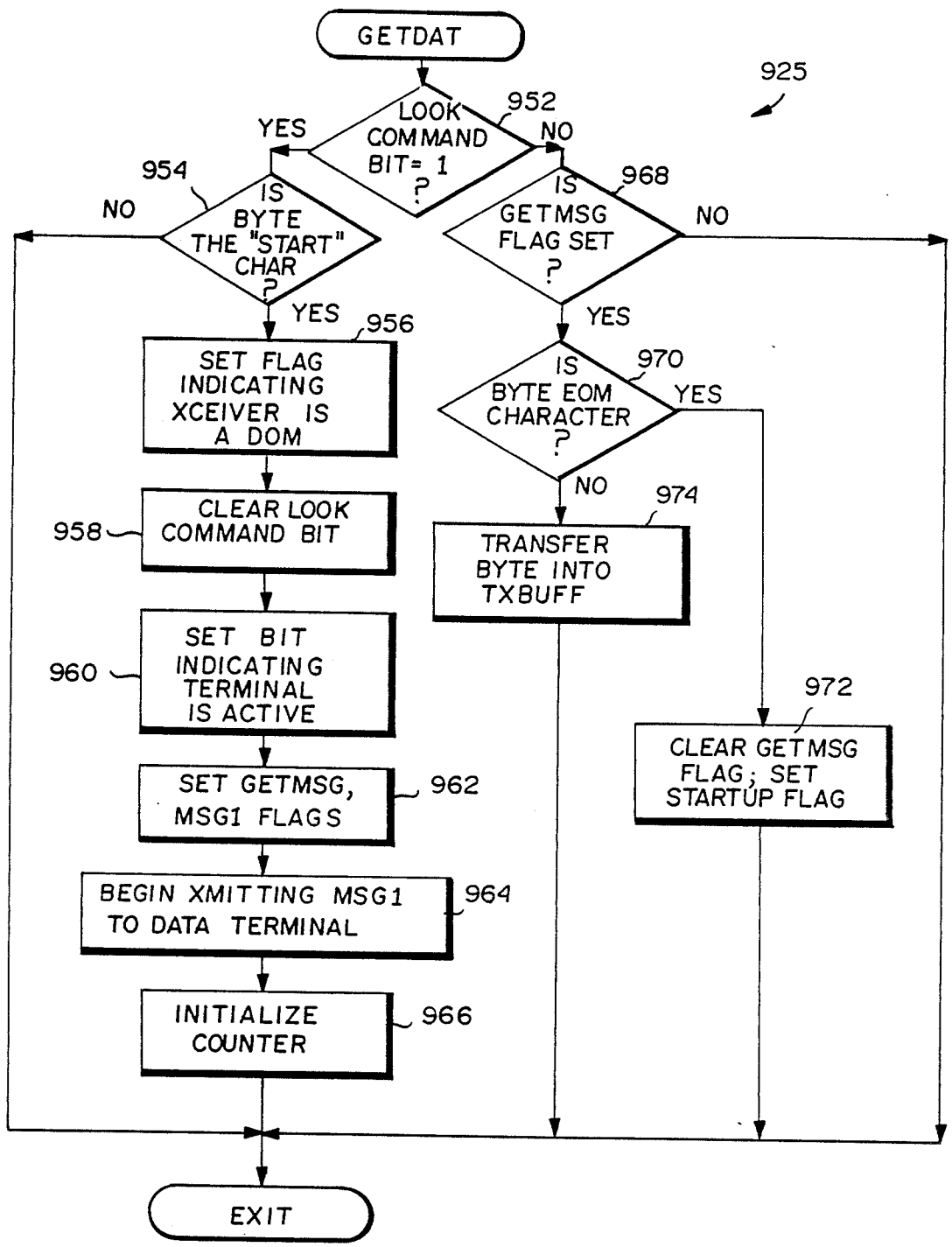
FIG. 17 is a schematic flow chart of exemplary program control steps of a routine GETDAT called by the serial interrupt routine shown in FIG. 16.
Figure 18:
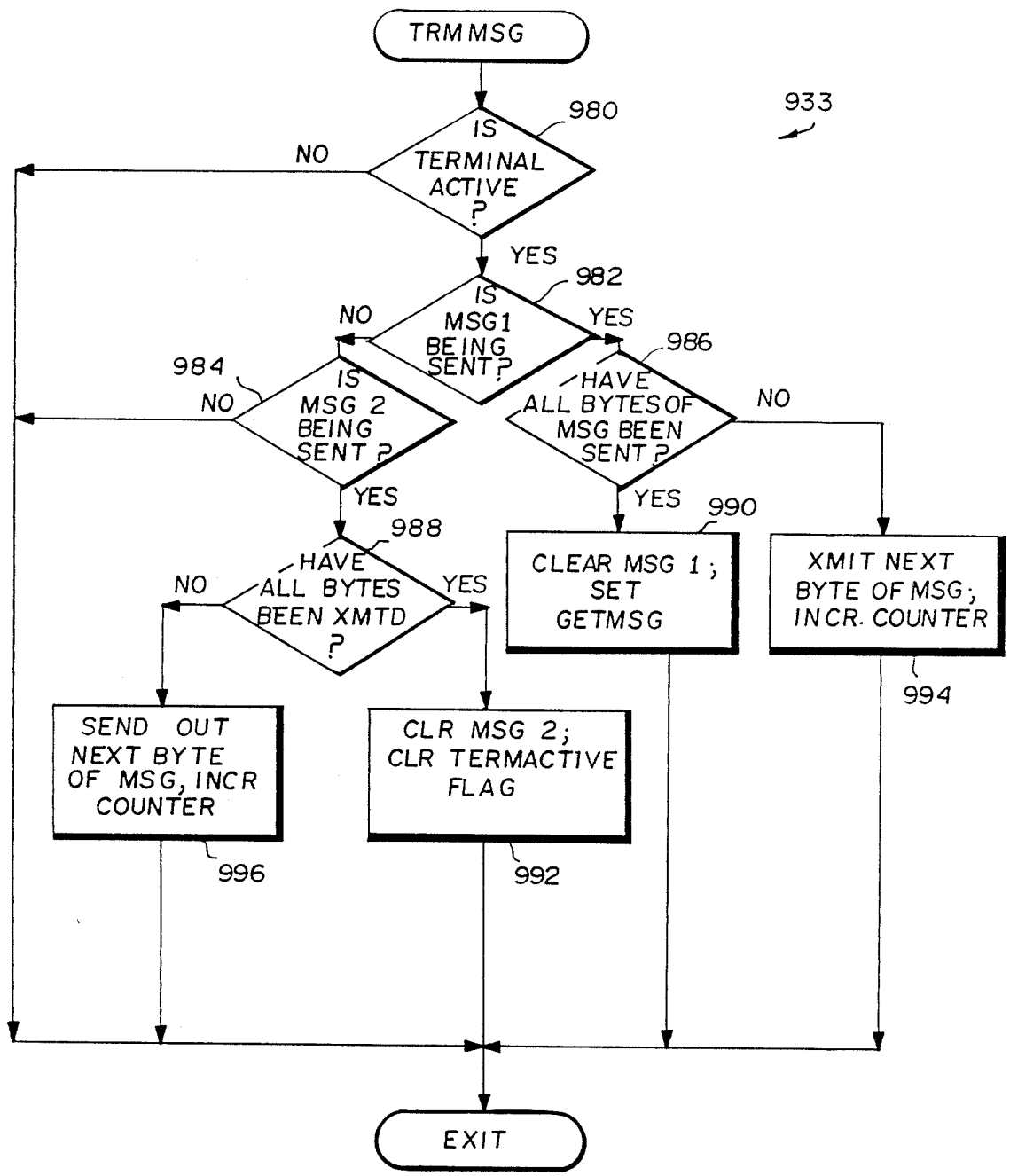
FIG. 18 is a schematic flow chart of exemplary program control steps of a routine TRMMSG called by the serial interrupt routine shown in FIG. 16.

Referring to FIG. 17, the routine GETDAT communicates data from terminal interface 102 (via a serial port of the microprocessor) to TXBUFF 304. A serial interrupt is to/from the microprocessor and the terminal interface 102. The serial interrupt, and routines GETDAT, OUTDAT, and TRMMSG describe the microprocessor side of operation. LOOK command bit is set whenever the transceiver is first initialized and the radio is restored in block 420 of FIG. 10. Decision block 952 tests the value of this LOOK command bit when an interrupt occurs.

If the LOOK command bit is set, then the beginning of a new line of text possibly is being received, and decision block 954 determines whether the first character received from data terminal 100 is the "start" character (the ESC character in the preferred embodiment). If the first character is not the "start" character, the interrupt is ignored—and it is assumed that the user mistakenly depressed a key.

If the byte received is the "start" character, then a flag is set indicating that the transceiver is acting as a DOM 52 (decision 956), and the LOOK command bit is cleared (block 958). In addition, a bit is set to indicate that data terminal 100 is active (block 960), and flags GETMSG and MSG 1 are both set to indicate (upon a later call to the FIG. 16 interrupt routine) that the microprocessor is sending a "canned" message for display on the data terminal. This message is not a data burst message. The steps involved in sending the MSG 1 data stream are begun (block 964), and a counter is initialized in preparation for counting the number of data bytes in the message (block 966).

If decision block 952 determines that a transceiver is not "looking" for a command character inputted via data terminal 100 (because the transceiver already recognizes that a message is being inputted, or because the interrupt was erroneously generated or generated due to another cause), a decision block 968 determines whether the GETMSG flag was previously set by block 962. If this flag was not previously set, then the interrupt is ignored. If this flag was previously set, then the interrupt is caused by yet another byte inputted via data terminal 100 which is to be added to a message to be transmitted, and decision block 970 tests whether the incoming byte is an "end of message" character (a carriage return in the preferred embodiment). If an end of message character is received, then the flag GETMSG is cleared and a flag called STARTUP is set to indicate that the entire message has been stored in TXBUFF 304 and is ready to be put into TXDATABUFF 306 (block 972). If the byte is not the end of message character, then the byte is transferred into register file TXBUFF 304 (block 974).

The TRMMSG routine handles the transfer of one of two "canned" messages from the DOM to data terminal 100, to be displayed on the terminal.

The DOM starts to send MSG 1 from block 964 of the GETDAT routine, after it has determined that the data terminal has a data message for the DOM to transmit to a DEM. MSG 1, when displayed on the terminal, tells the user to start entering the data message at the terminal.

The DOM starts to send MSG2 from block 516 in the XDOM routine, after it has determined that the DEM successfully received all data packets in the data message. Therefore, MSG 2 informs the user that the data message has been successfully received by the DEM.

If decision 980 determines that data terminal 100 is active, then it is determined whether MSG 1 is currently being transmitted (decision 982). If MSG 1 is not currently being transmitted, then decision block 984 determines if MSG 2 is being transmitted. If neither MSG 1 nor MSG 2 are being transmitted, then no bytes of a message need to be communicated from the DOM 52 to data terminal 100 and the routine TRMMSG is exited. On the other hand, if either MSG 1 or MSG 2 is being sent, then it is determined whether all bytes of the message being transmitted have already been transmitted (decision blocks 986, 988). If the currently-transmitted message has already been completely transmitted, then the appropriate flag (MSG 1 if message MSG 1 is being transmitted; MSG 2 if message MSG 2 is being transmitted) is cleared. If MSG 1 is finished, GETMSG flag is set (block 990). If MSG 2 is finished, TERMACTIVE flag is cleared, (block 992) to signal that the microprocessor's serial transmit port is no longer active. If MSG 1 has finished, the GETMSG flag is set to indicate that the DOM microprocessor is ready to accept the data message to place into TXBUFF 314, (block 990). On the other hand, if a message is currently being sent and bytes of the message remain to be transmitted, the next byte of the message is transferred from the DOM to the data terminal (blocks 994, 996).

The routine OUTDAT shown in FIG. 19 effects the transfer of data from TERMBUFF 316 to terminal interface 102 for display or other processing (e.g., storage) by data terminal 100. Routine OUTDAT first determines (block 998) whether data terminal 100 is active (e.g., by testing a flag). If the data terminal is not active, then no data needs to be sent to it, and the OUTDAT routine is exited. If data terminal 100 is active, then the contents of TERMBUFF 316 are tested to determine whether data to be communicated to data terminal 100 is stored in that buffer (decision block 1000). If TERMBUFF 316 is not empty, then a byte of data is retrieved from TERMBUFF and sent to data terminal interface 102 (block 1002). If TERMBUFF 316 is empty, on the other hand, then a flag indicating that data is being sent to the data terminal is cleared (block 1004) and it is then determined whether all data in from all packets the message has been sent to the data terminal (decision block 1006). If all data has been sent to the terminal, then the terminal active flag previously tested by decision block 998 is cleared to indicate that the data terminal is no longer active (block 1008). If all data has not been sent to the data terminal, the terminal active flag remains set, and TERMBUFF will be filled with more data packets on next pass through XDEM.

Control microprocessor 74 also has interrupts applied to it which are generated by transmit/receive interface 92 (sometimes called a "modem"). Transmit/receive interface 92 generates an interrupt signal whenever it receives a byte of data from receiver 72 and also whenever it has transferred a byte of data for transmission by transmitter 70. When microprocessor 74 receives an interrupt from transmit/receive interface 92, it executes the interrupt routine "modint" shown in FIG. 20.

Figure 20:
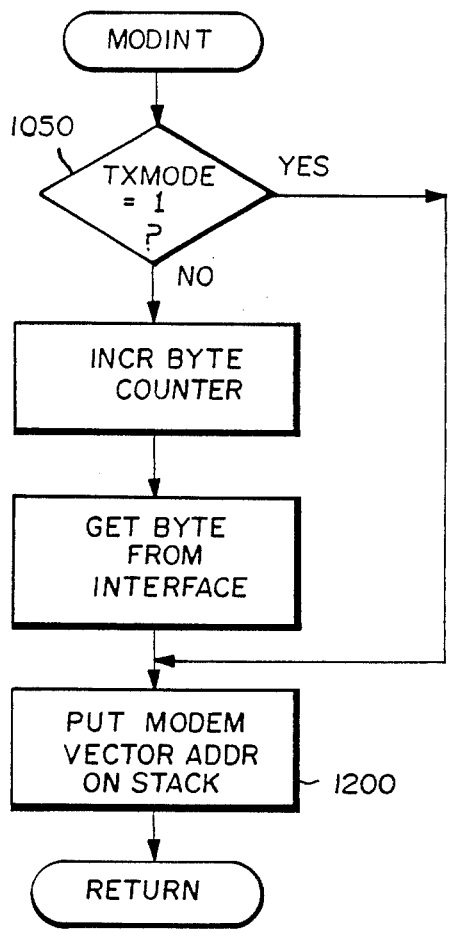
FIG. 20 is a schematic flow chart of exemplary program control steps of a oodem interrupt routine performed by the transceiver control microprocessor shown in FIG. 3 in response to an interrupt generated by the transmit/receive interface.

Microprocessor 74 first determines whether the transceiver is in the transmit or in the received mode (block 1050 shown in FIG. 20). After performing several additional tests, microprocessor 74 "pushes" modem vector address bytes onto an internal "stack" at 1200, these modem vector address bytes containing the address of the routine which is to handle the transfer of one byte to/from transmit/receive interface 92. Control microprocessor 74 then executes a return (not a return from interrupt) so the control automatically vectors to and executes the appropriate routine the address of which is specified on the internal stack. a return from interrupt occurs after the handling routine has finished.

All handler routines either transfer one byte to the modem chip or receive one byte from the modem chip. Any additional processing on the byte received or transmitted may also occur in the particular handler. Then the handler routine performs a RETURN FROM INTERRUPT. Thus a handler routine may be executed many times before a different handler routine takes over.

The use of the vector address is a coding technique to jump to a specific routine without using a CALL command. Those familiar with 8031 microprocessor code will recognize this technique.

Since the transmission or reception of data occurs in a specific order (i.e., dotting, preamble or subpreamble, data packets, EOM) when one section is finished the next section to process is known, and the vector address is set up in the preceding routine.

Figure 20A:
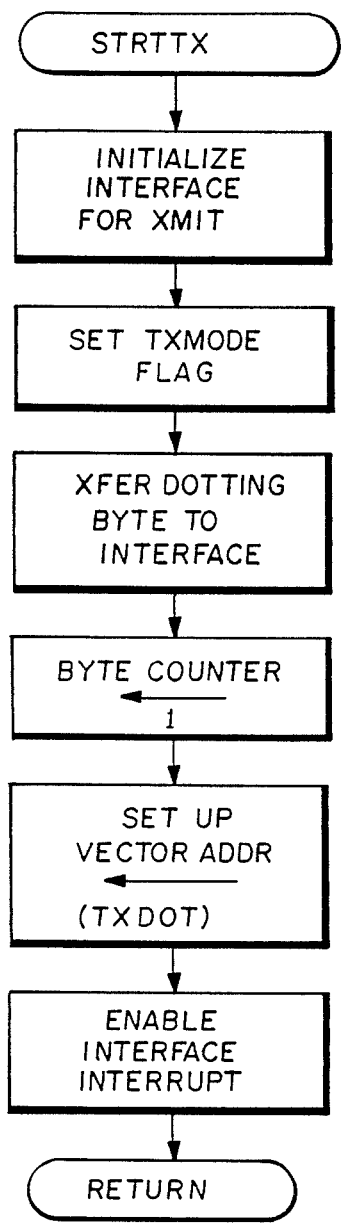
FIG. 20A is a flow chart of interrupt routine STRTTX.
Figure 20B:
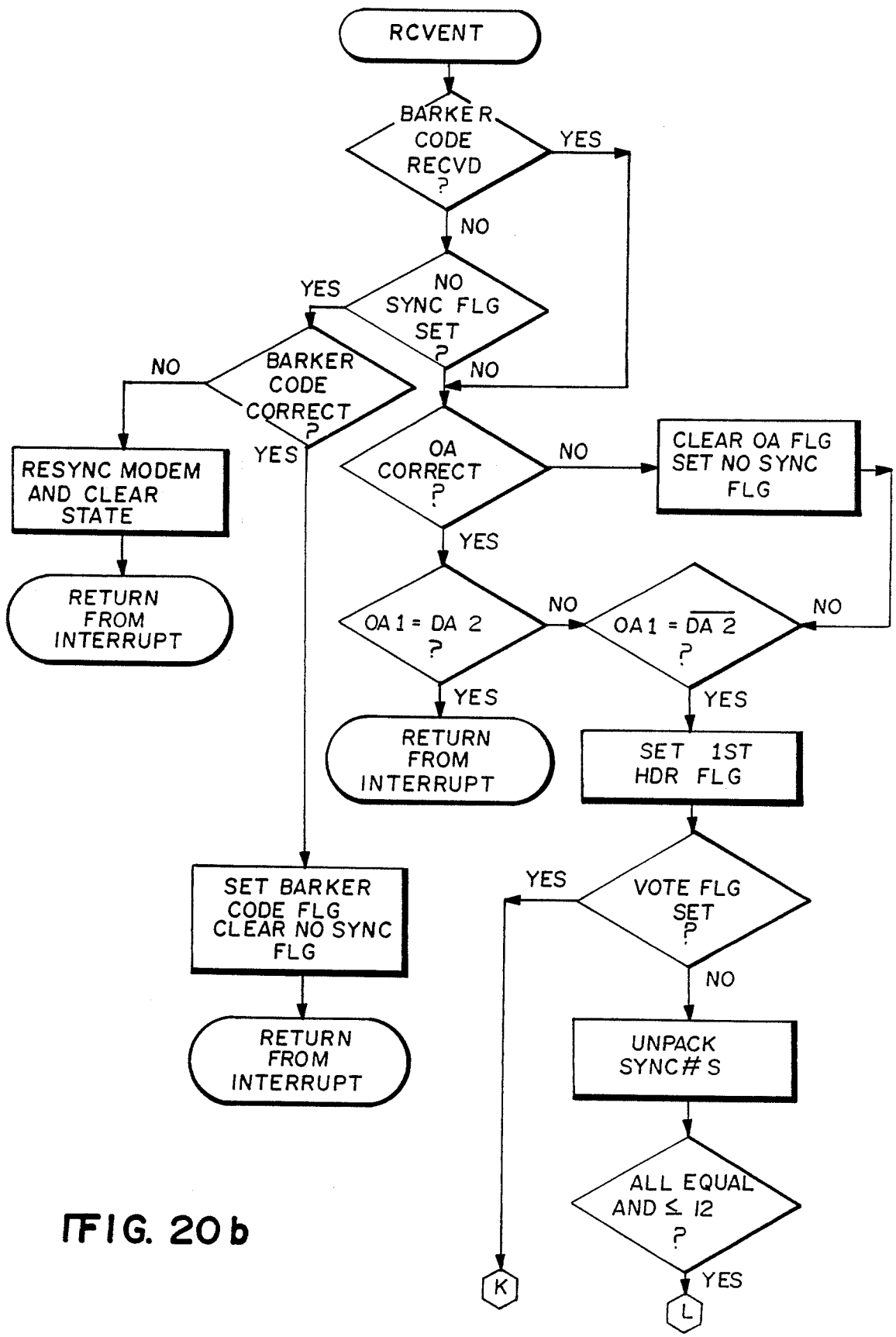
FIG. 20B is a flow chart of interrupt routine RCVENT.
Figure 20B:
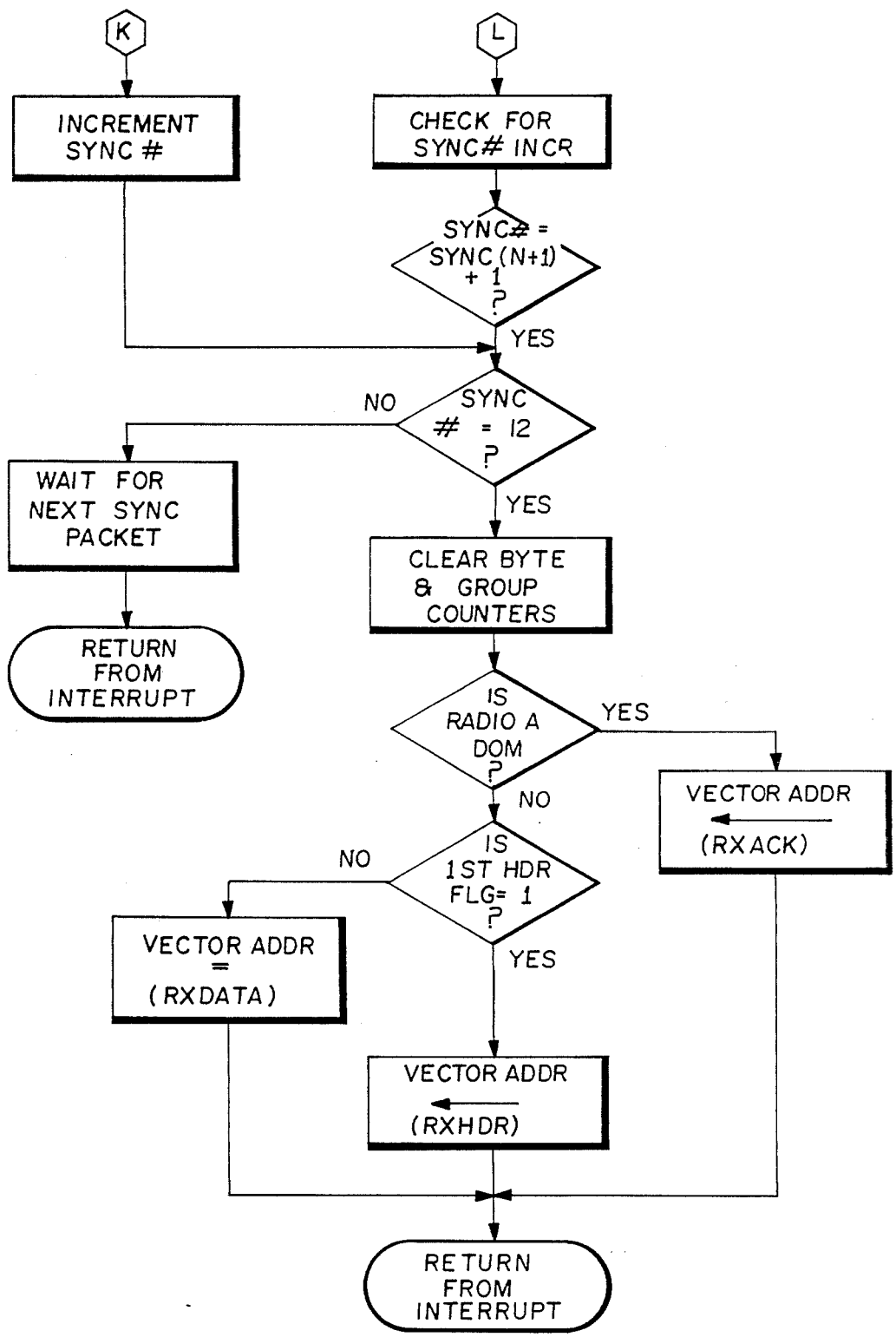

The routine modint (FIG. 20) is set up for receive (a default state) unless STRTTX (FIG. 20A) is called to start data transmission. Hence modem vector address is set to the routine RCVENT initially. (See flowchart of RCVENT in FIG. 20B).

Subroutine STRTTX (FIG. 20A) is not a part of the modem interrupts per se—instead it is called from main routines to start transmitting data. Subroutine STRTTX is called by the DOM from the XDOM routine block 524 to start transmitting the dotting of a data burst. STRTTX is also called by the DEM from the XDEM routine block 822 to start transmitting the dotting for an acknowledge message.

The STRTTX routine initializes transmit/receive interface 92 for the transmit mode and, the flag TXMODE is set to indicate that the transceiver is in the transmit mode. A byte of dotting (101010 . . . ) is transferred to transmit/receive interface 92 and a byte counter value is initialized to 1 (this byte counter simply counts the number of bytes transferred to transmit/receive interface 92). Next, the microprocessor modem vector address is set to the starting address of the routine TXDOT (which effects transmission of the dotting portion 162 shown in FIG. 5) and command returns to the calling routine.

Figure 24:
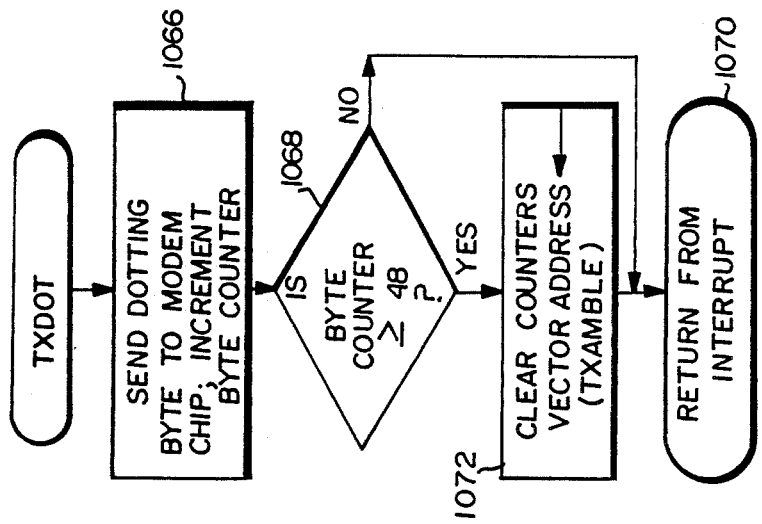
FIG. 24 (set forth on the same sheet of drawings as FIG. 9) is a schematic flow chart of exemplary program control steps of a routine TXDOT used to effect transmission of a dotting pattern.

The modem interrupt handler vectors to TXDOT when dotting is being transmitted, the FIG. 24 routine TXDOT sends a byte of dotting to interface 92 (block 1066) and increments the byte counter. Next, the value of the byte counter is tested to determine if it is equal to 48 (decision block 1068)—since if it is, 384 bits of dotting have been transmitted and the dotting pattern transmission has been completed. Extra dotting is sent to allow the transmitter to turnover. If decision block 1068 determines more dotting needs to be transmitted, it simply returns from the modem interrupt (block 1070). On the other hand, if the dotting pattern transmission is over, the byte counter is cleared and the microprocessor 74 modem vector address is set to the routine called TXAMBLE which effects transmission of the preamble 158 (block 1072) or the subpreamble 160. Then it returns from the modem interrupt.

Figure 25:
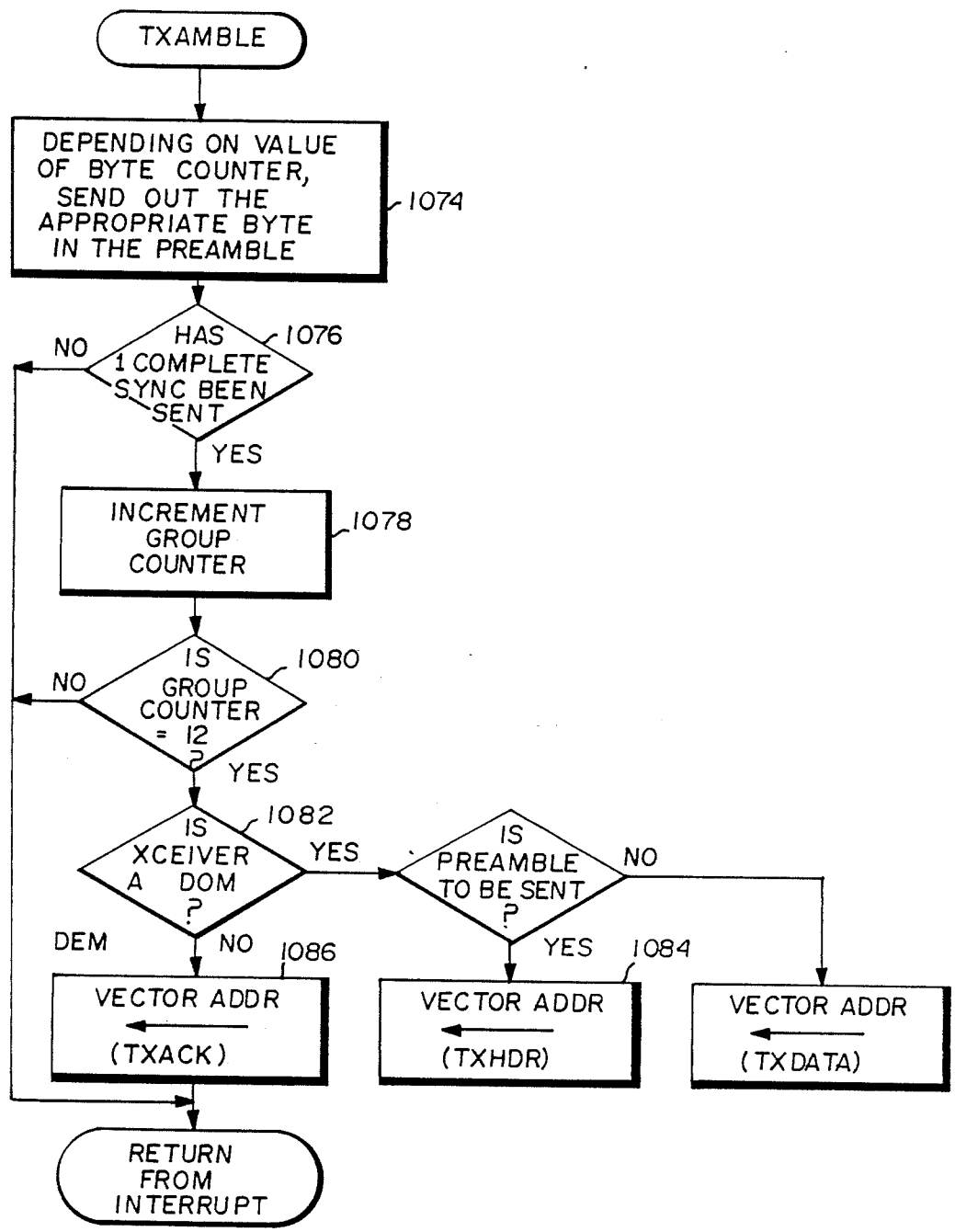
FIG. 25 is a schematic flow chart of exemplary program control steps of a routine TXAMBLE used to effect transmission of a preamble portion.

The modem interrupt handler vectors to TXAMBLE when the preamble or subpreamble is being transmitted. The routine TXAMBLE is shown in FIG. 25. In the preferred embodiment, the format for preamble 158 or subpreamble 160 is stored inTXPREAMBUFF 308. The FIG. 25 TXAMBLE routine simply reads out stored preamble/subpreamble pattern, one byte at a time from TXPREAMBUFF, and transfers those patterns to transmit/receive interface 92 (block 1074). Once a complete synchronization sequence 158 has been transmitted (as tested for by decision block 1076), a GROUP COUNTER which keeps track of the number of synchronization sequences 158 already transmitted is incremented (block 1078) and decision block 1080 tests whether 12 repeats of synchronization sequence 158 have been transmitted. If less than 12 synchronizations sequence repeats have been transmitted, a return from interrupt is performed to give transmit/receive interface 92 time to process the byte communicated to it by block 1074. If all 12 repeats of synchronization sequence 158 have transmitted, then decision block 1082 tests whether the transceiver is acting as a DOM 52. If radio is DOM, TXHDR is sent only if the first data burst is sent. If not first data burst data packets are sent immediately after the subpreamble. If the transceiver is acting as a DOM, then the next step is to transmit IV/SS sequence 166 in the next modem interface interrupt, so block 1084 causes the microprocessor 74 modem vector address to be set to a routine called TXHDR (see FIG. 26) which transmits the IV/SS sequence 166. On the other hand, if the transceiver is acting as DEM 58, the preamble just transmitted preceded an acknowledge message 170, and the microprocessor modem vector address is set to the beginning address of the routine TXACK (see FIG. 27) which transmits the rest of acknowledge message 170 (block 1086). A return from interrupt then occurs.

Figure 26:
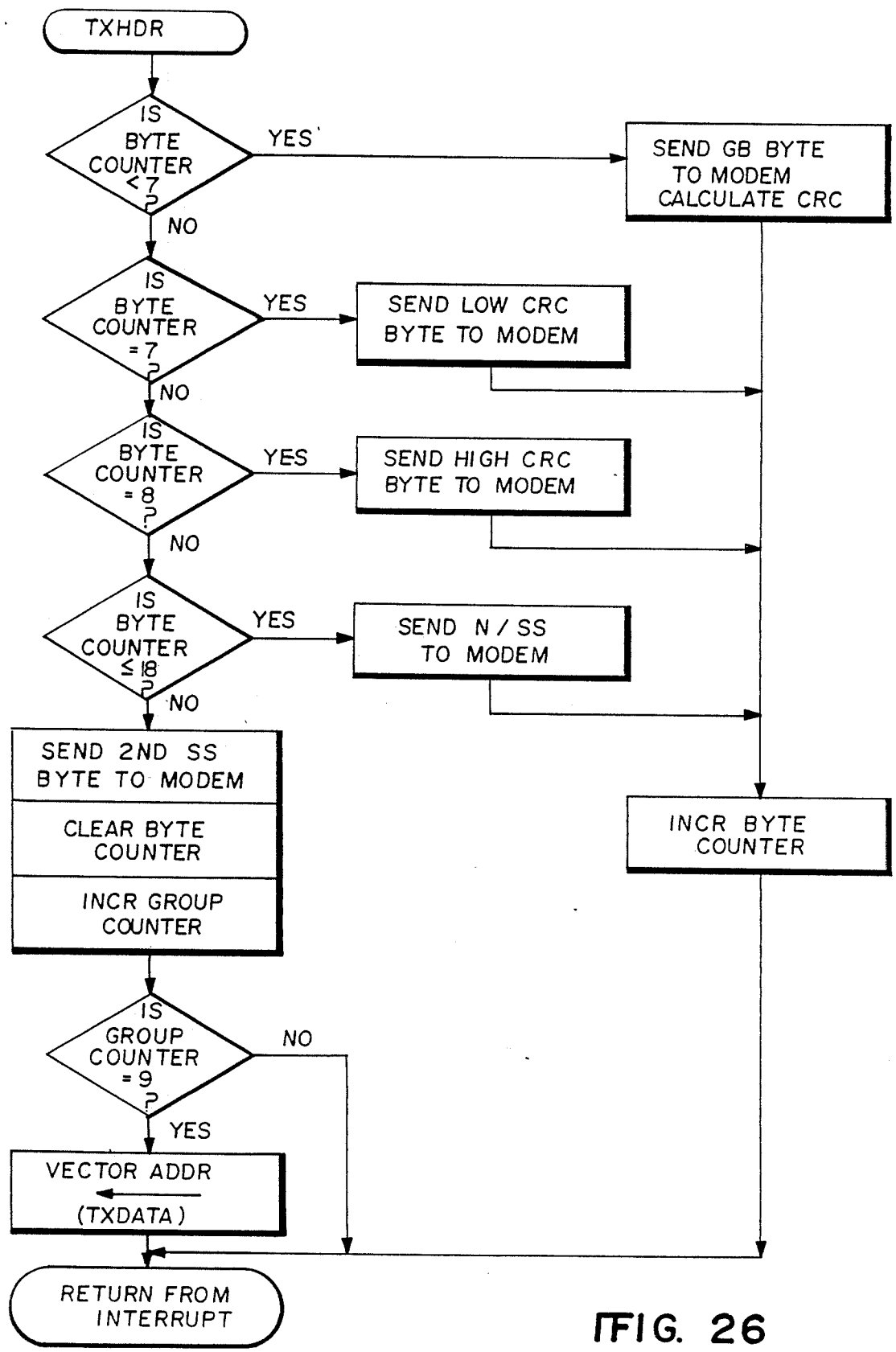
FIG. 26 is a schematic flow chart of exemplary program control steps of a routine TXHDR, which is used to transmit the header shown in FIG. 4.

The routine TXHDR shown in FIG. 26 is responsible for effecting transmission of IV/SS sequence 166. Block 1088 effects transmission of the guardband, initialization vector and selective signalling fields of IV/SS sequence 166. Decision block 1090 tests (based on the value of the byte counter used to keep track of the number of bytes already transmitted) whether an entire repetition of the guardband, initialization vector and selective signalling words have already been transmitted (blocks 1090, 1092). Blocks 1094, 1096 effect transmission of the CRC field within the guardband. In addition, block 1096 clears the value contained in the byte counter after each repetition of the IV/SS sequence 166 has been transmitted, and increments a GROUP COUNTER used to keep track of the number of repetitions of the IV/SS sequence which have been transmitted. Decision block 1098 determines whether all 9 repeats of the IV/SS sequence have already been transmitted, and if they have been, block 1100 stores the beginning address of routine TXDATA into the microprocessor 74 vector address.

Figure 28:
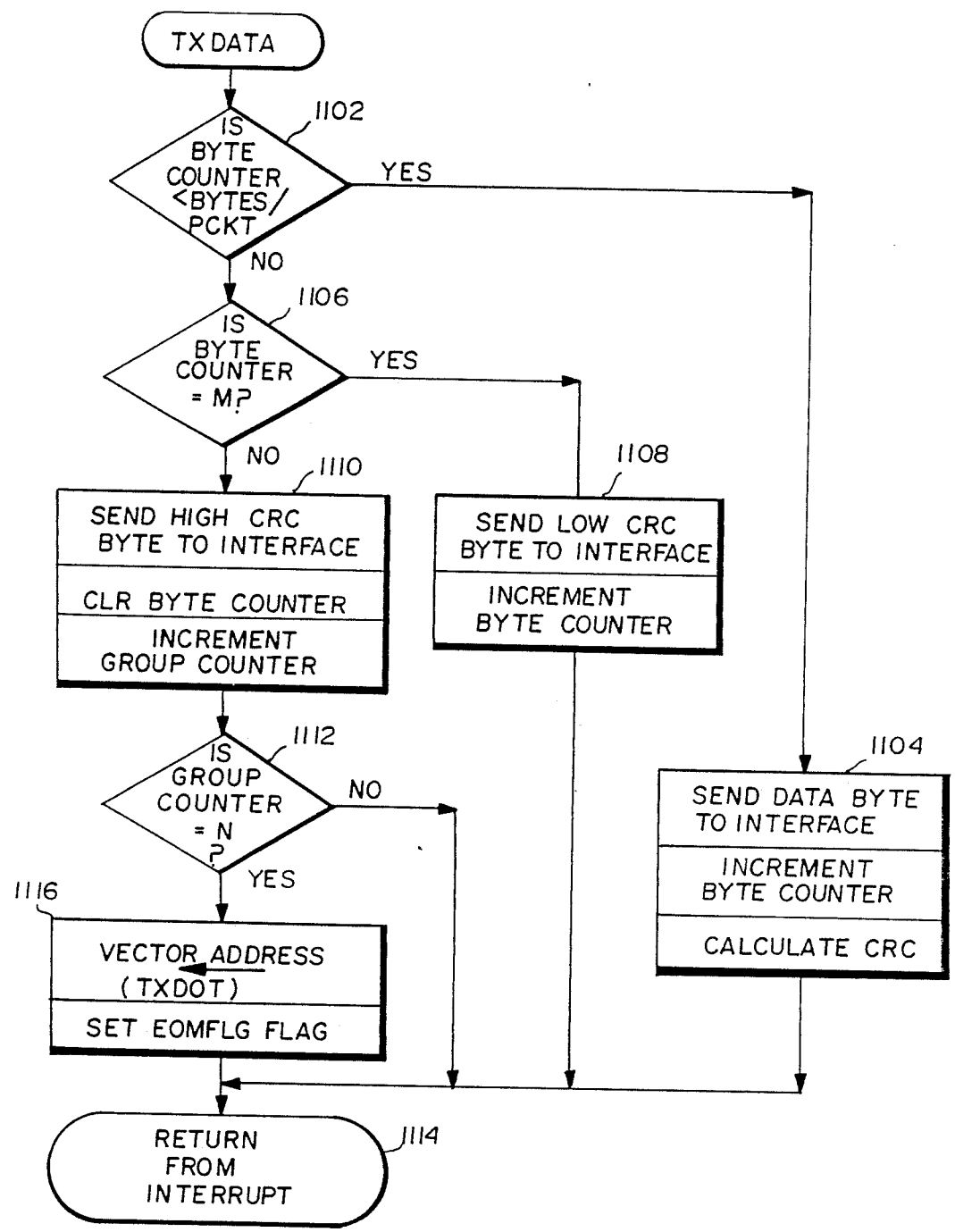
FIG. 28 is a schematic flow chart of exemplary program control steps of a routine TXDATA, which transmits data.

The routine TXDATA shown in FIG. 28 effects transmission of data packet collection 154 by DOM 52. The FIG. 28 TXDATA routine is executed after header portion 152 has been transmitted.

Decision block 1102 shown in FIG. 24 tests whether the byte counter (which keeps track of the number of bytes of the data packet being transmitted) is less than the number of bytes per packet (i.e., the value M). If the byte counter is less then M, a byte of data is transferred from TXDATABUFF 306 to transmit/receive interface 92, and the byte counter is incremented (block 1104). Also, CRC is calculated (see FIG. 28). If the byte counter is not less than M, then decision block 1106 checks whether the byte counter is equal to M (indicating that the byte is the last byte in the currently-transmitted data packet). Block 1104 checks whether the byte counter is less than M. If the byte counter is equal to M, the low byte of the CRC field at the end of each data packet is transmitted by block 1108, and the byte counter is incremented.

On the next pass of the TXDATA routine, the byte counter will exceed by 1 the value of M, and block 1110 is executed to transmit the high byte of the CRC field, clear the byte counter and increment the GROUP COUNTER (in this routine the GROUP COUNTER is used to keep track of the number of data packets which have been transmitted).

Next, decision block 1112 determines whether the GROUP COUNTER is equal to N (the number of data packets in each data burst). If the value of the GROUP COUNTER is less than N, more data packets are to be transmitted in the current data burst and a return from interrupt occurs (block 1114). If the value of the GROUP COUNTER is equal to N, the microprocessor modem vector address is set to the beginning address of the routine TXDOT (to start to transmit the end of message field 166) and an end of message flag is also set (block 1116). EOM field is started in modem interrupt, EOM is transmitted "directly" by XDOM or XDEM routine.

Figure 27:
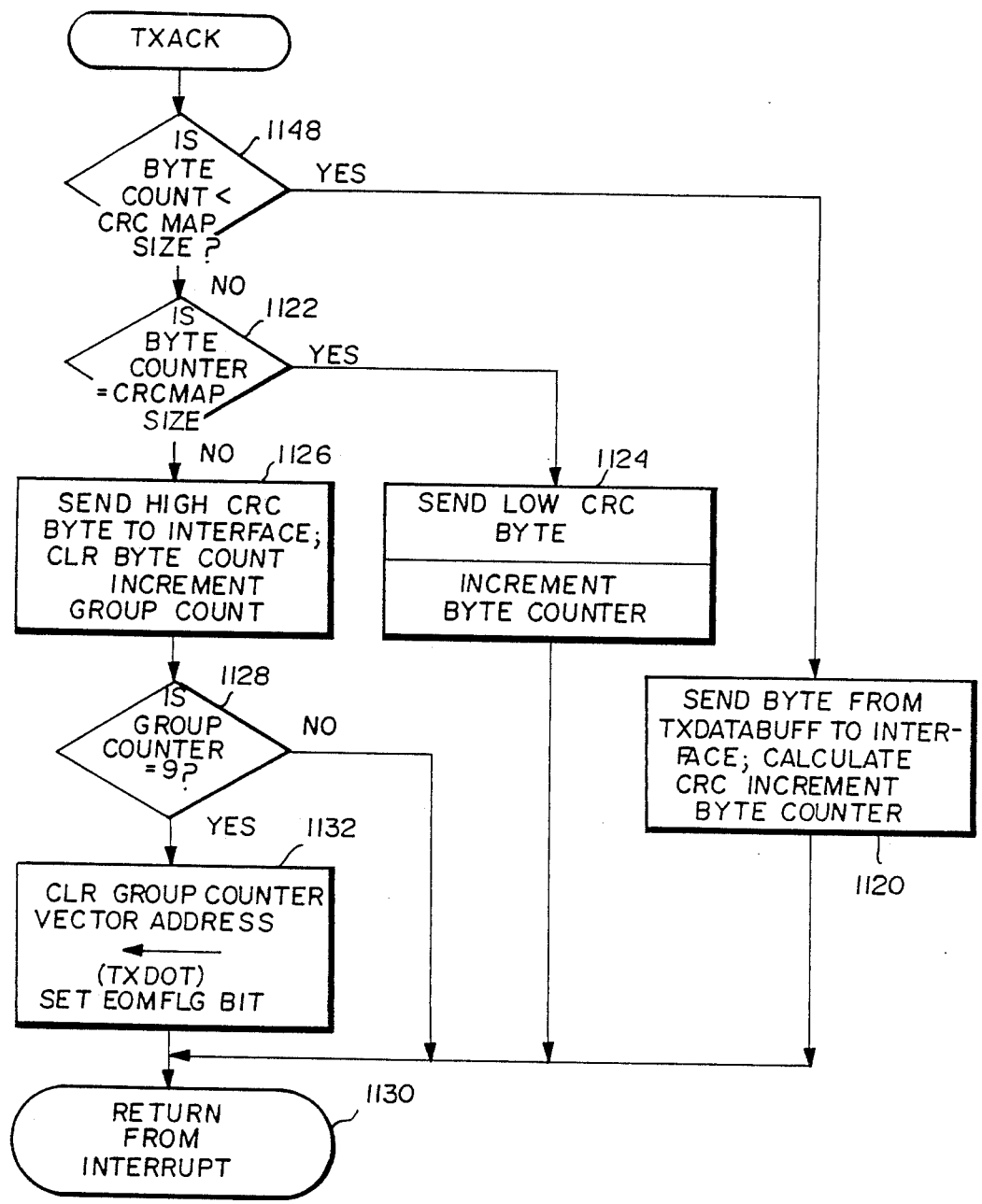
FIG. 27 is a schematic diagram of exemplary program control steps of a routine TXACK, which transmits an acknowledge signal.

Referring once again to FIG. 25, if decision block 1082 determines that the transceiver is a DEM, then the acknowledge message 170 shown in FIG. 8 must be transmitted, and the control microprocessor 74 vectors to the routine TXACK set forth in FIG. 27. Decision block 1118 tests the value of the byte counter to determine whether an entire repetition of the acknowledge field 174 has been transmitted. If the entire acknowledge field has not yet been transmitted, block 1120 transfers a byte of data from TXDATABUFF 306 to transmit/receive interface 92 (indicating, e.g., the packet receive status or a part of message field 178).

When a packet or a status field 176 and message field 178 have been completely transmitted (as tested for by block 1122), blocks 1124, 1126 transmit CRC field 180, clear the byte counter, and increment the GROUP COUNTER (in this routine, the GROUP COUNTER is used to count the number of repetitions of acknowledge field 174).

Decision block 1128 determines whether acknowledge field 174 has yet been transmitted 9 times. If the acknowledge field has not yet been transmitted 9 times, a return from interrupt occurs (block 1130) so that upon the occurrence of the next interrupt, the routine TXACK will be entered once again to transmit the rest of acknowledge fields 174. If 9 repetitions of acknowledge field 174 have already been transmitted, block 1132 clears the GROUP COUNTER, and sets the microprocessor 74 vector address to the beginning address of routine TXDOT (which starts to transmit the end of message field 156).

Figure 21:
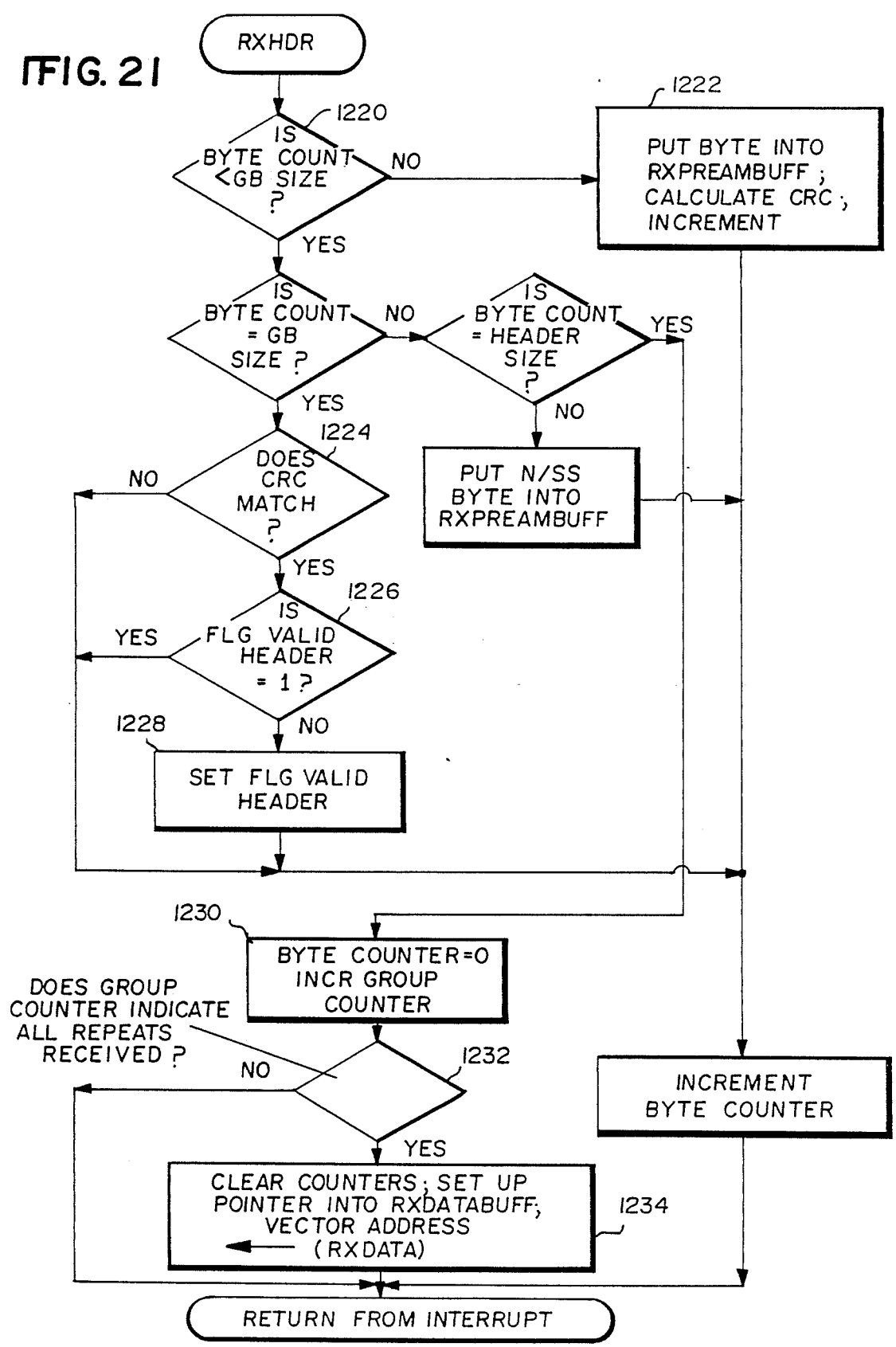
FIG. 21 is a schematic flow chart of exemplary program, control steps of a routine used to process the header portion of a received data burst.

FIG. 21 is a flow chart of the routine RXHDR, which performs the task of receiving header portion 152 when the transceiver acts as a DEM 58. Decision block 1220 keeps track of the number of bytes of the header 152 which have been received, and block 1222 performs the tasks of transferring information from transmit/receive interface 92 to RXPREAMBUFF 310; performing error checking functions on the received bytes; and incrementing the byte counter (thereby keeping track of the number of bytes of header which have been received). When an entire repetition of the header has been received (decision block 1220), then decision block 1224 determines whether the received data is free from errors. If the received data is free of errors, then it is determined whether a flag called valid header is already set (if it is, an error-free header has already been received for this message) (block 1226). If this is the first valid header which has been received in the current message, then block 1228 sets the valid header flag. Block 1230 clears the byte counter and increments the GROUP COUNTER in preparation of another repeat of the header. When all of the header repeats have been received (as tested for by block 1232), a pointer is initialized to point into RXDATABUFF 312 and the microprocessor 74 modem vector address is set to the beginning address of the routine RXDATA set forth in FIG. 22—both in preparation of receiving data packet collection 154 (block 1234).

Figure 22:
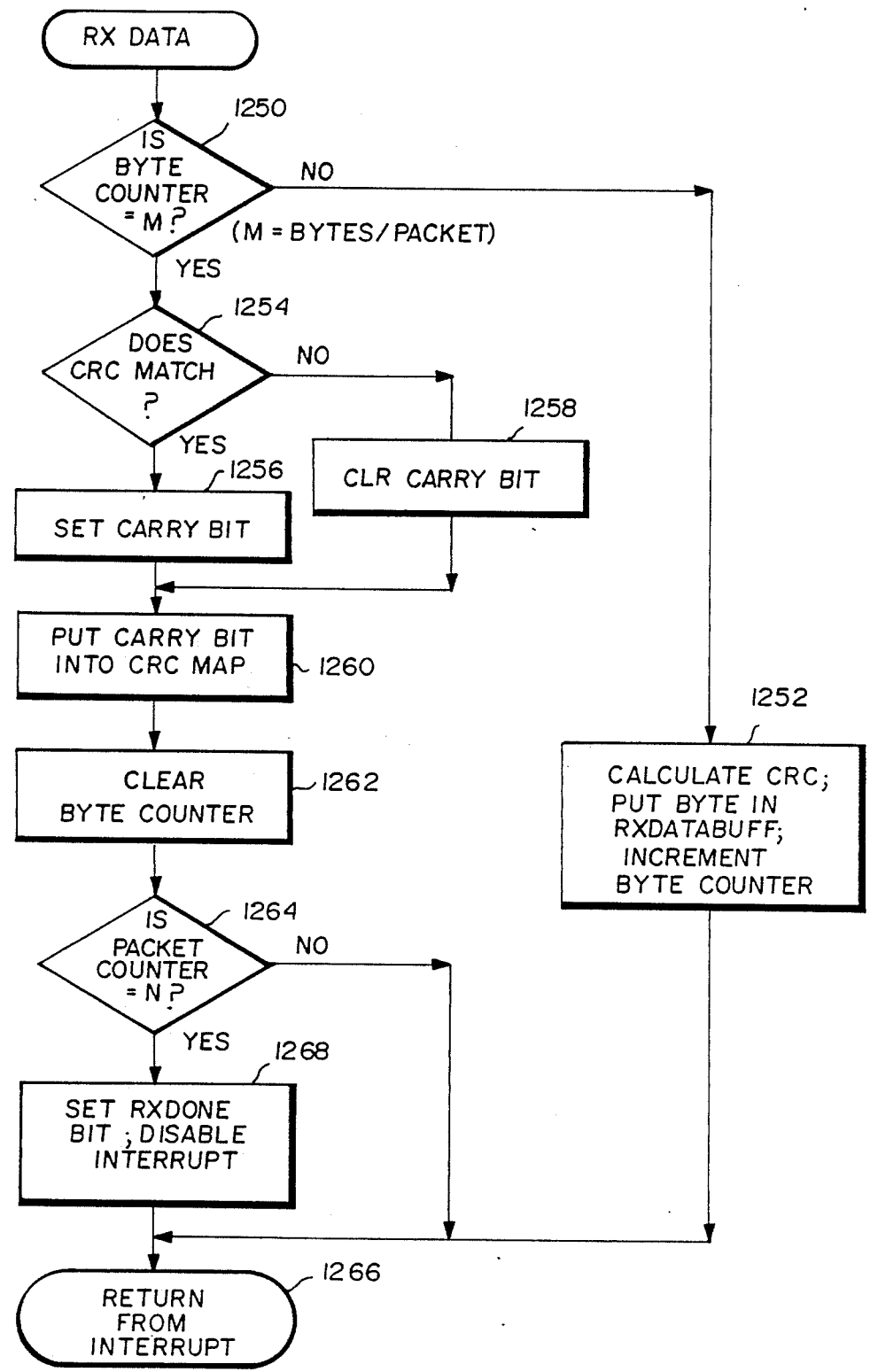
FIG. 22 is a schematic flow chart of exemplary program control steps a routine RXDATA used to process the data portion of a received data burst.

The routine RXDATA set forth in FIG. 22 transfers data packet collection 154 from transmit/receive interface 92 to RXDATABUFF 312. Decision block 1250 keeps track of the number of bytes of the data packet currently being received which have already been received, and block 1252 performs error checking on the received data bytes as they arrive and also transfers the received data bytes into RXDATABUFF 312. When decision block 1250 determines that an entire data packet has been received, decision block 1254 determines whether the data packet was received without error (based upon the results of the error checking performed by block 1252) and sets a bit accordingly (blocks 1256, 1258). Block 1260 then stores the error-indicating bit into the CRC map discussed earlier, and block 1262 clears the byte counter. Decision block 1264 then determines whether all N data packets of the current message have already been received. If the current message is not yet completed, a return from interrupt occurs (block 1266) so that the next time the routine RXDATA is entered, and an additional byte of the next data packet will be received. If all N data packets have been received, block 1268 sets a flag called RXDONE to indicate that the entire message has been received, and interrupts are disabled to prevent the routine MODINT from being called until after the acknowledge message has been transmitted.

Figure 23:
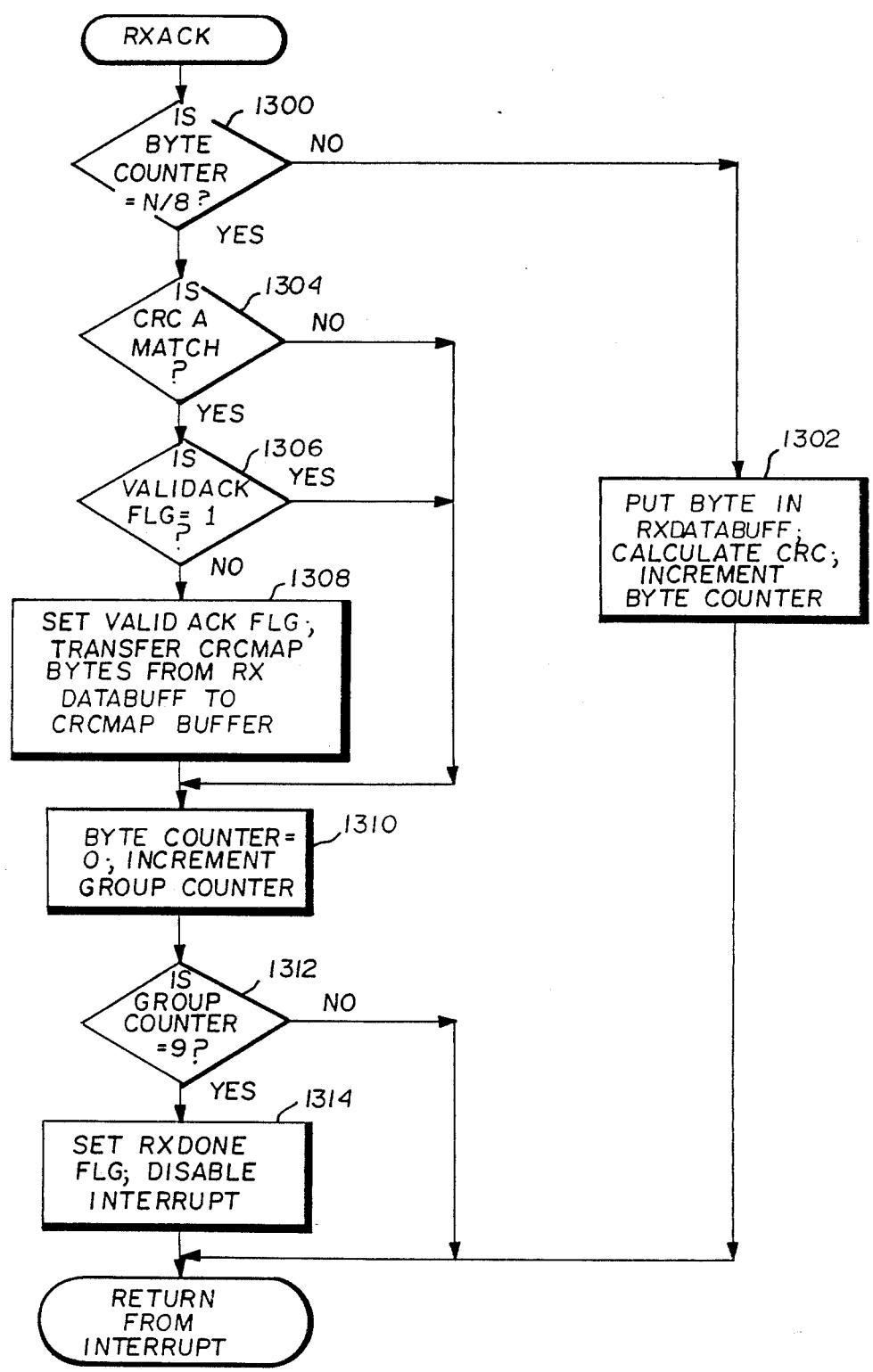
FIG. 23 is a schematic flow chart of exemplary program control steps of a routine RXACK used to process a received acknowledge message.

The routine RXACK set forth in FIG. 23 and used by the DOM performs the tasks of transferring received acknowledge messages 170 from transmit/receive interface 92 to RXDATABUFF 312. Decision block 1300 keeps track of the number of bytes of the acknowledge signal which have received, and block 1302 actually transfers acknowledge message bytes from interface 92 to RXDATABUFF 312 (as well as performing CRC error checking on each byte as it is received, and incrementing the byte counter). When decision block 1300 determines that an entire acknowledge field 174 has been received, decision block 1304 tests whether the received acknowledge field is error-free based on the CRC results calculated by block 1302. If the received acknowledge field is error-free and this is the first error-free acknowledge field which has been received in this message (as tested for by block 1306), a flag called VALIDACK is set and the contents of packet RX status field 176 from the correctly-received acknowledge field is loaded into the CRC map data structure (block 1308) (this CRC map data structure is used by DOM 58 to determine which data packets were incorrectly received by DEM 58 and have to be retransmitted). Block 1310 reinitializes the byte counter and GROUP COUNTER in preparation for receipt of the next repeat of acknowledge field 174, and decision 1312 determines whether all acknowledge field repeats have been received. When all acknowledge field repeats have been received, block 1314 sets a flag called RXDONE to indicate that the entire acknowledge message 170 has been received.

One important feature of this invention is that the CRCMAP is used to communicate the status of packets received by the DEM. No packet numbers are transmitted with the packets sent by the DOM. Nor are packet numbers sent by the DEM in the acknowledgement. The use of the CRCMAP reduces he overhead on the number of bits sent in either message (acknowledge or data). Thus helping to achieve the effective data rates earlier mentioned herein.

A digital radio transmitting and receiving signalling protocol and associated system has been described which has a very low error rate per bit, is adaptive to deleterious communications channel phenomena such as noise and fading, and is compatible with a prior protocol. While the present invention has been described with what is presently considered to be the most practical and preferred embodiments, it is to be understood that the appended claims are not to be limited to the disclosed embodiments but on the contrary, are intended to cover all modifications, variations and equivalent arrangements which retain any of the novel features and advantages of this invention. By way of non-limiting example, although the preferred embodiment of the present invention includes radio transceivers, the invention could be used with a transmitter, a receiver or other radio communications device.

What is claimed is:

1. A method for reliably and quickly exchanging bursts of digital data packets between a first site and a second site, said method comprising the steps of:
   (a) transmitting a plurality N digital data packets from said first site to said second site;
   (b) checking for the correct receipt of all N packets at said second site;
   (c) transmitting a binary coded N-bit map of digital data from said second site back to said first site identifying any data packets not yet correctly received at said second site;
   (d) retransmitting at least such identified data packets, if any, from said first site to said second site; and
   (e) repeating said steps (b)–(d) until all N-packets have been correctly received at said second site.

2. A method of transmitting digital signals from a data originating digital radio transceiver over a RF communication channel to a destination digital radio transceiver, said method comprising:
   (a) transmitting, from said data originating transceiver to said destination transceiver over said RF channel, a plurality N of successive data packets in a first data burst;
   (b) receiving said first data burst with said destination transceiver;
   (c) determining at said destination transceiver which of said N data packets were correctly received by said destination transceiver and which of said data packets were incorrectly received by said destination transceiver and transmitting a bit map from said destination transceiver to said source transceiver specifying at least said incorrectly received, packets; and
   (d) retransmitting, from said data originating transceiver to said destination transceiver, a further data burst including N successive data packets, said further data burst data packets including said incorrectly received data packets and no correctly received ones of said data packets of said first data burst.

3. A method as in claim 2 further including the step of transmitting an acknowledge message from said destination transceiver to said originating transceiver over said communication channel, said acknowledge message indicating which of said data packets within said first data burst were correctly received and which of said data packets within said first data burst were incorrectly received.

4. A method as in claim 2 wherein:
   said method further includes the step of transmitting an acknowledge message from said destination transceiver to said originating transceiver over said communication channel in response to receipt of said first data burst by said destination transceiver, said acknowledge message including the results of said determining step; and
   said retransmitting step includes the step of selecting data packets for retransmission in response to said acknowledge message.

5. A method of transmitting digital signals from a data originating digital radio transceiver over a RF communication channel to a destination digital radio transceiver, said method comprising:
   (a) transmitting, from said data originating transceiver to said destination transceiver over said RF channel, a plurality N of successive data packets in a first data burst;
   (b) receiving said first data burst with said destination transceiver;
   (c) determining at said destination transceiver which of said N data packets were correctly received by said destination transceiver and which of said data packets were incorrectly received by said destination transceiver and transmitting a bit map from said destination transceiver to said source transceiver specifying at least said incorrectly received packets; and
   (d) retransmitting from said data originating transceiver to said destination transceiver, a further data burst including N successive data packets, said further data burst data packets including said incorrectly received data packets and no correctly received ones of said first data burst data packets,
   wherein said retransmitting step includes retransmitting each of said incorrectly received data packets plural times, none of said incorrectly received data packets being retransmitted more than one time more than any other of said incorrectly received data packets is retransmitted.

6. A method of transmitting digital signals from a data originating digital radio transceiver over a RF communication channel to a destination digital radio transceiver, said method comprising:
   (a) transmitting, from said data originating transceiver to said destination transceiver over said RF channel, a plurality N of successive data packets in a first data burst;
   (b) receiving said first data burst with said destination transceiver;
   (c) determining at said destination transceiver which of said N data packets were correctly received by said destination transceiver and which of said data packets were incorrectly received by said destination transceiver and transmitting a bit map from said destination transceiver to said source transceiver specifying at least said incorrectly received packets; and
   (d) retransmitting, from said data originating transceiver to said destination transceiver, a further data burst including N successive data packets, said further data burst data packets including said incorrectly received data packets and no correctly received ones of said first data burst data packets, wherein:

said method further includes the step of transmitting an acknowledge message from said destination transceiver t aid originating transceiver over said communication channel in response to receipt of said first data burst by said destination transceiver, said acknowledge message including signals indicating the results of said determining step; and said retransmitting step includes the step of selecting data packets for retransmission in response to said acknowledge message and retransmitting each of said selected data packets multiple times x until N data packets have been transmitted in said further data burst, none of said selected data packets being transmitted more than x+1 times.

7. A method of transmitting digital signals from a data originating digital radio transceiver over a RF communication channel to a destination digital radio transceiver, said method comprising:
(a) transmitting, from said data originating transceiver to said destination transceiver over said RF channel, a plurality N of successive data packets P(1)—P(N) in a first data burst;
(b) receiving said first data burst with said destination transceiver;
(c) determining which of said data packets P(1)—P(N) were correctly received by said destination transceiver and which of said data packets were incorrectly received by said destination transceiver;
(d) storing said correctly received data packets into a buffer capable of storing a maximum of Q data packets;
(e) calculating the number X of new packets P(N+1) - P(Q) which can be stored in said buffer while reserving space in said buffer for said incorrectly received data packets;
(f) transmitting an acknowledge message from said destination transceiver to said data originating transceiver, said acknowledge message indicating the data packets which were incorrectly received by said destination transceiver and the number of new packets said buffer can store in addition to said incorrectly received data packets; and
(g) retransmitting, from said data originating transceiver to said destination transceiver, a further data burst including said incorrectly received data packets and said number X of new data packets, said incorrectly received data packets being repeated in sequence until the number of data packets in said further data burst totals N, none of said data packets within said further data burst being repeated more than one time more than any other data packet within said further data burst.

8. A transceiver for sending and receiving digital control and digital data signals over a communication channel, said transceiver comprising:
transmitter and receiver means for transmitting and- /or receiving a succession of digital signals; and
control means connected to said transmitter and receiver means and including a digital data microprocessor system programmed so as to control said transmitter and receiver means to process said digital signals occurring in substantially the following time sequence:
(a) a preamble portion having:
(1) an alternating 1,0 dotting pattern,
(2) twelve repeated sets of
(i) a 16 bit synchronization word S including a multiple bit Barker code,
(ii) a 16 bit outside address word OA including a multiple bit sequence repeated at least once, said outside address word indicating whether a later-processed string of digital data includes digitized voice signals or other types of digital signals,
(iii) a 16 bit sync number code (identifying which of 12 repeats is involved),
(3) nine repeated sets of
(i) a 64 bit guard band,
(ii) a 64 bit cryptographic initialization vector,
(iii) a 16 bit selective signalling code identifying the intended message recipient(s),
(b) a plurality of successive data packets each including a string of digital data, said data representing either digitized voice signals or other types of digital signals, an 8 bit repeat byte (indicating whether said successive data packets are repeats of previously-transmitted packets) separating some of said data packets, and
(c) an end-of-message word signifying the end of a given message.

9. A transceiver as in claim 8 wherein said control means processes said 64 bit guard band by processing digital signals in substantially the following sequence:
(a) a 4 bit command code indicating a task to be performed,
(b) a 1 bit NP code (indicating if said plurality of successive data packets are not present in a given message),
(c) a 1 bit mid command execution control bit,
(d) an 8 bit sub-group source code SUBGS (indicating the transceiver generating said message),
(e) an 8 bit sub-group destination code SUBGD (indicating, in conjunction with said selective signalling signals, the intended recipient of said message),
(f) a 6 bit BPP code indicating the number M of bytes of digital data in each of said plurality of data packets,
(g) a 6 bit PPB code indicating the number N of said plurality of successive data packets,
(h) 14 additional bits of digital signals, and
(i) 16 bits of error checking signals.

10. A method for reliably and quickly exchanging data bursts of digital data packets over an RF communications channel between a data transmitter and a data receiver, said method comprising the steps of:
(a) transmitting a plurality N of discrete digital data packets from said transmitter to said receiver without transmitting identifications for each of said discrete packets;
(b) checking for correct receipt of all of said N packets at said data receiver;
(c) transmitting a binary coded N-bit map of digital data from said data receiver back to said data transmitter, said map identifying which of said N packets have not yet been correctly received by said data receiver without expressly identifying said incorrectly received packets;
(d) retransmitting said identified packets from said transmitter to said receiver; and
(e) repeating said steps (b)–(d) until all of said N packets have been correctly received by said data receiver.

11. A method as in claim 10 wherein said transmitting step (c) includes transmitting said N bits of said map in a sequence corresponding to the sequence said transmitting step (a) transmits said N packets, each of said N bits corresponding to one of said packets.

12. An arrangement for reliably and quickly exchanging data bursts of digital data packets over an RF communications channel between a data transmitter and a data receiver, said arrangement comprising:
  means for transmitting a plurality N of discrete digital data packets from said transmitter to said receiver without transmitting identifications for each of said discrete packets;
  means at said receiver for checking for correct receipt of all of said N packets; and
  means connected to said checking means for transmitting a binary coded N-bit map of digital data from said data receiver back to said data transmitter, said map identifying which of said N packets have not yet been correctly received by said data receiver without expressly identifying said incorrectly received packets,
  wherein said first-mentioned transmitting means is also for retransmitting plural versions of said identified packets from said transmitter to said receiver plural lines and said checking means is also for checking for correct receipt of at least one of said plural retransmitted versions of each of said retransmitted packets until all of said N packets have been correctly received at least once by said data receiver.

13. An arrangement as in claim 12 wherein said bit map transmitting means includes means for transmitting said N bits of said map in a sequence corresponding to the sequence said packet transmitting means transmits said N packets, the positions of said N bits corresponding to and associated with said N packets.

14. A method for exchanging of data bursts of digital data packets over an RF communications channel, comprising the steps of:
  (a) transmitting a data burst from a source RF transceiver to a destination RF transceiver, said data burst comprising a number N of discrete digital data packets, N being greater than one;
  (b) testing for correct receipt of said N digital data packets at said destination transceiver;
  (c) in response to said testing step, transmitting an acknowledgement message from said destination transceiver to said source transceiver, said acknowledgement message identifying at least which of said N packets were incorrectly received; and
  (d) in response to said acknowledgement message, transmitting a further data burst from said source transceiver to said destination transceiver, said burst comprising said number N of discrete digital data packets, including the step of repeating each of said incorrectly received data packets a sufficient number of times in sequence to provide N packets.

15. A method as in claim 14 wherein said transmitting step (c) comprises transmitting a binary coded bit map comprising N bits corresponding to said N packets, a one-to-one correspondence existing between said N bits of said bit map and said N packets in the last transmitted data burst.

16. A method for reliably and quickly exchanging bursts of digital data packets between a first site and a second site over an RF communications channel, said method comprising the steps of:
  (a) transmitting a plurality N digital data packets from said first site to said second site;
  (b) checking for the correct receipt of all N packets at said second site;
  (c) transmitting a binary coded N-bit map of digital data from said second site back to said first site identifying which data packets were correctly received at said second site;
  (d) retransmitting the data packets, if any, not correctly received at said second site from said first site to said second site in response to receipt of said map; and
  (e) repeating said steps (b)–(d) until all N packets have been correctly received at said second site.

17. A method as in claim 1 wherein said transmitting step (c) comprises transmitting a binary coded bit map comprising N bits corresponding to said N packets, a one-to-one correspondence existing between said N bits of said bit map and said N packets in the last transmitted data burst.

18. A method as in claim 2 wherein said step (c) includes transmitting a binary coded bit map comprising N bits corresponding to said N packets, a one-to-one correspondence existing between said N bits of said bit map and said N packets in the last transmitted data burst.

19. A method as in claim 5 wherein said step (c) includes transmitting a binary coded bit map comprising N bits corresponding to said N packets, a one-to-one correspondence existing between said N bits of said bit map and said N packets in the last transmitted data burst.

20. A method as in claim 6 wherein said step (c) includes transmitting a binary coded bit map comprising N bits corresponding to said N packets, a one-to-one correspondence existing between said N bits of said bit map and said N packets in the last transmitted data burst.

* * * * *